United States Patent
Horii et al.

(10) Patent No.: US 7,590,331 B2
(45) Date of Patent: Sep. 15, 2009

(54) BROADCAST RECORDING APPARATUS

(75) Inventors: Yuki Horii, Lawrenceville, NJ (US); Takaaki Suzuki, Lawrenceville, NJ (US)

(73) Assignee: Panasonic Corporation, Osaka (JP)

( * ) Notice: Subject to any disclaimer, the term of this patent is extended or adjusted under 35 U.S.C. 154(b) by 686 days.

(21) Appl. No.: 11/349,955

(22) Filed: Feb. 9, 2006

(65) Prior Publication Data

US 2006/0193597 A1    Aug. 31, 2006

Related U.S. Application Data

(60) Provisional application No. 60/651,231, filed on Feb. 10, 2005.

(30) Foreign Application Priority Data

Feb. 10, 2005    (JP)    ............................. 2005-034786

(51) Int. Cl.
    *H04N 5/783*    (2006.01)
(52) U.S. Cl. ...................................................... 386/95
(58) Field of Classification Search ................ 348/725, 348/553; 386/95, 86, 68
    See application file for complete search history.

(56) References Cited

U.S. PATENT DOCUMENTS

| | | | | |
|---|---|---|---|---|
| 5,686,954 | A * | 11/1997 | Yoshinobu et al. | ............. 725/43 |
| 6,304,716 | B1 * | 10/2001 | Hanai et al. | .................... 386/95 |
| 6,327,417 | B1 * | 12/2001 | Hanai et al. | .................... 386/46 |
| 6,993,248 | B1 * | 1/2006 | Kato | ............................ 386/69 |
| 2002/0059645 | A1 | 5/2002 | Soepenberg et al. | |
| 2002/0176512 | A1 | 11/2002 | Tanaka et al. | |
| 2003/0028706 | A1* | 2/2003 | Okada | ........................ 711/100 |
| 2004/0210949 | A1 | 10/2004 | Sugiura et al. | |
| 2005/0100321 | A1 | 5/2005 | Koudo et al. | |
| 2006/0078296 | A1 | 4/2006 | Takao | |

FOREIGN PATENT DOCUMENTS

| | | |
|---|---|---|
| EP | 1206141 | 5/2002 |
| JP | 2001-008176 | 1/2001 |
| JP | 2004-502350 | 1/2004 |
| WO | 02/01852 | 1/2002 |

OTHER PUBLICATIONS

English Language Abstract of JP 2001-008176.
U.S. Appl. No. 11/295,651 to Kurotaki, filed on Dec. 7, 2005.

(Continued)

*Primary Examiner*—Paulos M Natnael
(74) *Attorney, Agent, or Firm*—Greenblum & Bernstein P.L.C.

(57) ABSTRACT

A broadcast recording apparatus according to the present invention includes: a JMF which records video/audio data into a recording area; a storage administration library which, in the case where an extracted Java program and AIT differ from an already-recorded Java program and AIT, attaches a timestamp to the extracted Java program and AIT and records the Java program and AIT in the recording area, as well as creating storage administration information which indicates a storage place of the Java program within the recording area; and a service manager and a Java VM which read out and execute the Java program from the storage place indicated by the storage administration information.

11 Claims, 48 Drawing Sheets

OTHER PUBLICATIONS

U.S. Appl. No. 60/685,379 to Horii, filed on May 31, 2005.
ETSI ES 201 812 v1.1.1 (Dec. 2003), Digital Video Broadcasting (DVB); Multimedia Home Platform (MHP) Specification 1.0.3, pp. 47-51, 61-103, 295-328 and 787.
U.S. Appl. No. 11/383,816 to Hashimoto et al., filed May 17, 2006.
U.S. Appl. No. 11/420,639 to Horii, filed May 26, 2006.
U.S. Appl. No. 11/421,146 to Horii, filed May 31, 2006.
U.S. Appl. No. 11/421,126 to Hashimoto et al., filed May 31, 2006.
U.S. Appl. No. 11/596,107 to Hashimoto et al., filed May 31, 2006.
U.S. Appl. No. 11/421,145 to Suzuki et al., filed May 31, 2006.
U.S. Appl. No. 11/425,727 to Horii et al., filed Jun. 22, 2006.
U.S. Appl. No. 11/420,982 to Kawakami et al., filed May 30, 2006.

* cited by examiner

FIG. 3

| Frequency Band | Application | Modulation Format |
|---|---|---|
| 5~130MHz | Out Of Band (OOB) Data conversion between head end and terminal | QPSK |
| 130~864MHz | In-band Normal TV broadcast including video/audio | QAM |

FIG. 4

| Frequency Band | Application |
|---|---|
| 70~74MHz | Sending data from head end 101 to terminal apparatus |
| 10.0~10.1MHz | Sending data from terminal apparatus A111 to head end 101 |
| 10.1~10.2MHz | Sending data from terminal apparatus B112 to head end 101 |
| 10.2~10.3MHz | Sending data from terminal apparatus C113 to head end 101 |

FIG. 5

| Frequency Band | Application |
|---|---|
| 150~156MHz | TV channel 1 |
| 156~162MHz | TV channel 2 |
| ⋮ | ⋮ |
| 310~311MHz | Radio Channel 1 |
| ⋮ | ⋮ |

| | PID | table_id | Content of data that sends MPEG-2 section |
|---|---|---|---|
| 1004 | 16 | 64 | Demodulation information of TS |
| 1005 | 18 | 66 | Information regarding service |
| 1006 | 20 | 95 | Information regarding TV show |

FIG. 12

| | | | | |
|---|---|---|---|---|
| Program Number | | | 101 | ~1100 |
| E S | Audio | 5011 | | ~1111 |
| | Video | 5012 | | ~1112 |
| | Data | 5013 | AIT | ~1113 |
| | Data | 5014 | DSMCC[1] | ~1114 |

| | | | |
|---|---|---|---|
| transport_stream_id | | 1000 | ~1200 |
| Program | 101 | 501 | ~1211 |
| | 102 | 502 | ~1212 |
| | 103 | 503 | ~1213 |

1201  1202

| Java Program Identifier 2601 | Control Information 2602 | DSMCC Identifier 2603 | Program Name 2604 |
|---|---|---|---|
| 301 | autostart | 1 | /a/TopXlet |
| 302 | present | 1 | /b/GameXlet |

2611 → row 1
2612 → row 2

FIG. 41

| | | | | |
|---|---|---|---|---|
| Program Number | | | 101 | 1100 |
| E S | Audio | 5011 | | 1111 |
| | Video | 5012 | | 1112 |
| | Data | 5013 | AIT | 1113 |
| | Data | 5014 | DSMCC[1] | 1114 |
| | Data | 5015 | DSMCC[2] | 1115 |
| | 1101 | 1102 | 1103 | |

FIG. 42

| Java Program Identifier 2601 | Control Information 2602 | DSMCC Identifier 2603 | Program Name 2604 |
|---|---|---|---|
| 301 | autostart | 1 | /a/TopXlet |
| 302 | present | 1 | /b/GameXlet |
| 303 | kill | 2 | /z/StudyXlet |
| 304 | destroy | 1 | /b/MisicXlet |

4111, 4112, 4113, 4114

FIG. 43
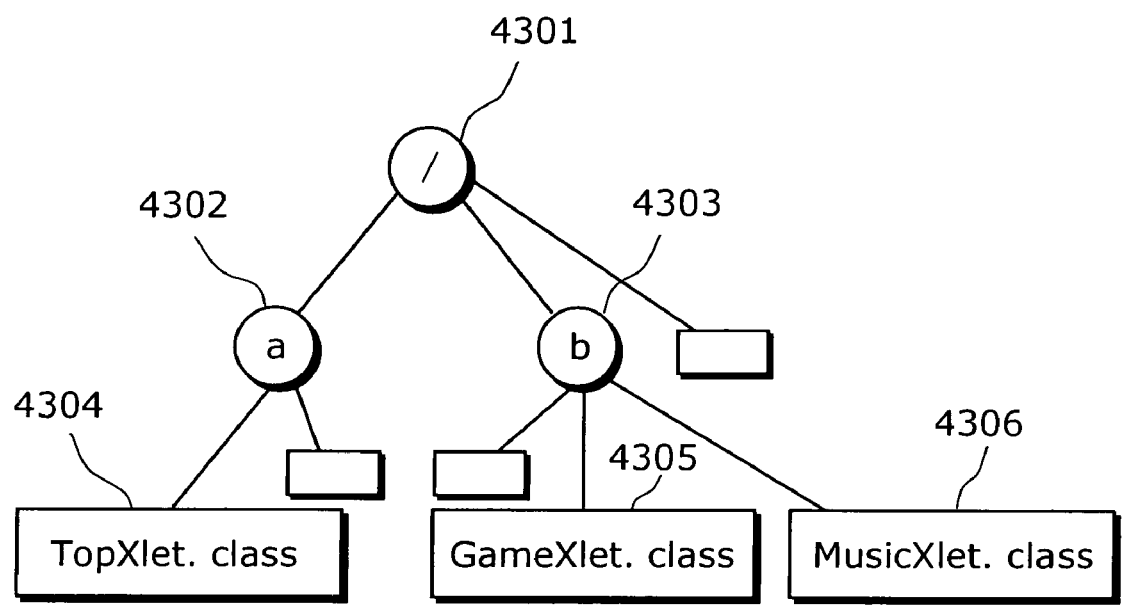
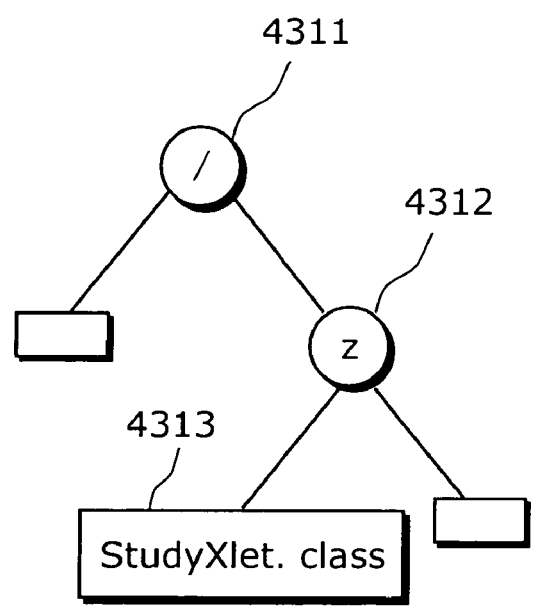

BROADCAST RECORDING APPARATUS

CROSS REFERENCE TO RELATED APPLICATION

This application claims the benefit of U.S. Provisional Application No. 60/651,231, filed Feb. 10, 2005, the contents of which are herein incorporated by reference in its entirety.

BACKGROUND OF THE INVENTION (1) Field of the Invention

The present invention relates to a broadcast recording apparatus which accumulates and reproduces a broadcast wave. In particular, the present invention relates to a mechanism which accumulates data of an application program included in a broadcast wave sent repeatedly as well as video/audio data sent synchronized with this data, and which reproduces this in synchronization with the video audio data.

(2) Description of the Related Art

Various data is included in a broadcast wave sent from a broadcasting station. In that data, there is data that is sent in time sequence, such as video/audio, and data that is sent repeatedly at a set interval. In terms of data that is sent repeatedly at a set interval, there exists, for example, data such as data broadcast represented by BML, and application programs (hereafter, referred to as applications) sent in a broadcast wave together with the video/audio, and so on. While it is not possible to re-acquire data sent in time sequence when acquisition fails once, with data sent repeatedly at a set interval, the same data is repeatedly sent, and therefore it is possible to re-acquire data even when acquisition has failed once.

Presently, the specifications regarding an environment, in which a broadcast wave that includes this type of video/audio and application is received and the application and video/audio are executed in synchronization, have been developed and are in operation. For example, a specification called Digital Video Broadcasting-Multimedia Home Platform (DVB-MHP) has been developed in Europe, and operations according to the specification are already commencing. In addition, a specification supporting a cable broadcast environment, called Open Cable Application Platform (OCAP), is being developed in the United States, and operations are planned to commence in 2005.

Furthermore, OCAP-DVR, which adds a function where a user of the OCAP specification can record and reproduce a selected service, is recently under development. Here, a service includes video/audio and an application related to the video/audio. Therefore, a function which accumulates video/audio as well as an application, and a function which executes the application in synchronization with the accumulated video/audio, are in demand.

Note that it is mentioned earlier that there is data in a broadcast wave that is repeatedly sent. However, in the aforementioned MHP/OCAP/OCAP-DVR specifications, a table which expresses the structure of a television program in the broadcast wave, a table which expresses control information of the application, and so on, in addition to carousel-form data of the application, exist as the data repeatedly sent in the broadcast wave.

In MHP/OCAP/OCAP-DVR, a method is provided in which same applications are started and terminated in accordance with control information denoted in Application Control Information (AIT); in OCAP-DVR, when a recorded broadcast wave is reproduced, the application is acquired and accumulated from the broadcast wave each time the application is started and terminated, which is a wasteful use of filter resources and a recording area.

The broadcast recording apparatus is, for example, a DVD or HDD installed as the recording area, but in general, these recording areas are limited. Additionally, in the abovementioned MHP/OCAP/OCAP-DVR specifications, when acquiring each kind of abovementioned table from a broadcast wave received from a broadcast station or a broadcast wave stored in the recording area, filter resources for extracting each table from the broadcast wave are required on a per-table basis. Also, during "trick play" (high-speed reproduction, skip reproduction, and so on) as prescribed in the OCAP-DVR specifications, it is difficult to extract the tables from the broadcast wave stored in the recording area in real-time. In particular, regarding acquisition during skip reproduction of a table which has position information of a skip destination (NPT coefficient), it is necessary to acquire a table in which that position information is multiplexed with a previous/next time which differs from the time of reproduction of the video/audio; however, depending on general filter resources, it is not possible to acquire such a table in which the time of reproduction of the video/audio is multiplexed with the different previous/next time. Because of this, it is preferable to accumulate each table extracted during accumulation in a form different from the broadcast wave, thus reducing the table extraction processing during reproduction. Therefore, when accumulating/reproducing data such as applications and various tables repeatedly sent in the broadcast wave, a device which accumulates/reproduces efficiently without wasteful consumption of resources, such as filter resources for extracting each kind of table from the recording area, broadcast wave, and so on, is necessary.

In Patent Reference 1 (Japanese Laid-Open Patent No. 2001-8176) (FIG. 1), when accumulating carousel-form data sent repeatedly, a version check is executed on the acquired data, and reduction of a recording area is realized by recording only data of a new version and not recording data of an identical version. In addition, the data of each version is recorded associated with a period of validity, and it is possible to realize a version change of the data during reproduction by creating a stream which synchronizes video/audio with the data during reproduction. Here, data of an identical version refers to when the present data sent repeatedly does not differ from the previous data, and data of a new version refers to when the present data sent repeatedly does differ from the previous data.

In Patent Reference 2 (Japanese Laid-Open Patent No. 2004-502350), reduction of a recording area is realized by recording repeatedly-sent carousel-form data in a module unit as prescribed in the Digital Storage Media—Command & Control (DSMCC), without recording the data as a stream. In addition, it is possible to realize a version change of the module during reproduction by recording each version of the module associated with a period of validity.

In the technologies of Patent References 1 and 2, it is possible to realize reduction of the recording area by recording each version of the data with a period of validity, and to realize a version change of the data during reproduction, without the repeatedly-sent carousel-form data overlapping.

The application data which is the carousel-form data prescribed in the abovementioned MHP/OCAP/OCAP-DVR specifications is formed in an object unit prescribed by DSMCC specifications. However, between Patent References 1 and 2, reduction of the recording area through recording without overlapping, in the module unit prescribed by the DSMCC specifications, is described, but data recording in object units as prescribed by the DSMCC specifications is not described. In actuality, because object unit data is a more detailed data which has eliminated unnecessary data from the module unit data, object unit data leaves more room for improvement in terms of improving wasteful consumption of recording areas by data recording in module units.

In addition, as mentioned earlier, in the MHP/OCAP/OCAP-DVR specifications, a table which expresses the structure of a television program in the broadcast wave, a table which expresses control information of the application, and so on, exist, in addition to carousel-form data of the application, as the data repeatedly sent in the broadcast wave. However, Patent Reference 1 and 2 are technologies regarding only efficient recording of carousel-form data. In the conventional technology, these tables are considered to be parts of the stream, and there is no concept for extracting these tables from the stream and recording the tables; there is no technology regarding the recording of these tables.

In addition, as mentioned earlier, in the MHP/OCAP/OCAP-DVR specifications, when acquiring the table which represents the application control information included in the broadcast wave, filter resources which extract each table are necessary. However, there is no improvement on the wasteful consumption of filter resources during reproduction of a broadcast wave stored in a recording area.

In addition, particularly during "trick play" (high-speed reproduction, skip reproduction), it is difficult to use these filter resources to extract the table in real-time from the broadcast wave stored in a recording area. In particular, regarding acquisition during skip reproduction of a table which has position information of a skip destination (NPT coefficient), it is necessary to acquire a table in which that position information is multiplexed with a previous/next time which differs from the time of reproduction of the video/audio; however, depending on general filter resources, it is not possible to acquire such a table in which the time of reproduction of the video/audio is multiplexed with the different previous/next time. Because of this, it is preferable to accumulate each table extracted during accumulation in a form different from the broadcast wave, thus reducing the table extraction processing during reproduction. However, Patent Reference 1 does not improve upon the following problem: when reproducing a broadcast wave that is stored in a recording area, a format is taken in which the broadcast wave re-formed from the stored data is reproduced, and during reproduction through this format, processing of extracting each table from the broadcast wave is necessary; therefore, table extraction during "trick play" is difficult.

SUMMARY OF THE INVENTION

Accordingly, a first object of the present invention is: to reduce the usage of a recording area and data filter resources needed when accumulating and reproducing data sent repeatedly in a broadcast wave.

In addition, a second object of the present invention is to record, at the time of recording, an object carousel that makes up an application only once and without duplication, and, at the time of reproduction, start/terminate an application from the recorded corresponding object carousel, in accordance with control information denoted by Application Control Information (AIT); through this, even in the case where the application is repeatedly started/terminated, the object carousel does not need to be acquired each time, which reduces the recording area.

Furthermore, a third object of the present invention is to reduce data extraction processing which uses filter resources during reproduction from a recording area through accumulating necessary tables and so on, which are extracted from the broadcast wave using filter resources, in a recording area in a form differing from the broadcast wave at the time of accumulation; and to provide, to a user, viewing of a broadcast coordinated with the reproduction time of a broadcast wave received from a broadcast station, even during reproduction with a high load, such as "trick play" from a recording area.

To achieve the abovementioned objects, a broadcast recording apparatus according to the present invention is a broadcast recording apparatus that records and reproduces a broadcast wave, and includes: a receiving unit which receives the broadcast wave; a viewing data extraction unit which extracts, from the broadcast wave received by the receiving unit, viewing data which indicates a content to be viewed; a repeat data extraction unit which extracts, from the broadcast wave received by the receiving unit, an application program and a program table which are repeatedly included in the broadcast wave, the program table indicating a list of application programs present in the broadcast wave; a recording medium having an area for recording the viewing data, the application program, and the program table; a viewing data recording administration unit which records the viewing data extracted by the viewing data extraction unit in the recording medium; a program recording administration unit which attaches a timestamp to the extracted application program by the repeat data extraction unit in the case where the application program extracted is different from the application program already recorded in the recording medium, and records the application program attached with the timestamp into the recording medium; a table recording administration unit which attaches a timestamp to the extracted program table extracted by the repeat data extraction unit in the case where the program table is different from the program table already recorded in the recording medium, and records the program table attached with the timestamp in the recording medium; an information creation unit which creates storage administration information indicating a recording place for the application program in the recording medium each time the program recording administration unit records the application program into the recording medium; a viewing data reproduction unit which reproduces the viewing data recorded in the recording medium; and a program execution unit which reads out, from the recording place indicated by the storage administration information, and executes the application program with a timestamp corresponding to a reproduction time of the viewing data, the application program being indicated by the program table with a timestamp corresponding to the reproduction time. For example, the program table indicates an application program to be controlled at a time the program table is received by the receiving unit, and a control content for the application program. Or, the program table indicates all application programs included in a service of the broadcast wave.

Through this, when the program table, such as AIT and PMT, and the application program repeatedly included in the broadcast wave are each identical to data already recorded in the recording medium, they are not further recorded in that recording medium, and therefore it is possible to reduce the area of the recording medium that is used. Furthermore, by recording the application program and program table repeatedly included in the broadcast wave in the recording medium in a different form than the form in the broadcast wave, using filter resources and extracting the application program and the program table from the recording medium during reproduction is unnecessary, and filtering processing can be omitted.

In addition, the information creation unit may associate the storage administration information with the application program, and store the storage administration information in the program table recorded in the recording medium, each time said program recording administration unit records the application program in said recording medium; and the program execution unit may read out the application program with the timestamp corresponding to the reproduction time from the storage place indicated by the storage administration information stored in the program table, and execute the application program.

Through this, the recording place of the application program recorded in the recording medium is recorded in the program table, and therefore the program execution unit can easily find the recording place of that application program from the program table when executing the application program indicated in the program table, and thus the processing load can be lightened.

In addition, the repeat data extraction unit may extract, from the broadcast wave received by the receiving unit, the application program associated with a control content required for reproduction from among the application programs indicated in the program table; and the program execution unit may read out, from a recording position indicated by the storage administration information, the application program associated with the control content required for reproduction from among the application programs with a timestamp corresponding to the reproduction time, and execute the application program.

Through this, only the application program required for reproduction is extracted from the broadcast wave, and only the application program required for reproduction is read out from the recording medium and executed, and therefore it is possible to reduce the area of the recording medium that is used, and possible to lighten the processing load.

In addition, the repeat data extraction unit may further extract, from the broadcast wave received by the receiving unit, reproduction position information that indicates a reproduction position of the viewing data and is repeatedly included in the broadcast wave; the broadcast recording apparatus may further include a reproduction position recording administration unit which attaches a timestamp to the extracted reproduction position information and records the reproduction position information that has been attached with the timestamp into the recording medium, in the case where the recording position information extracted by the repeat data extraction unit differs from reproduction position information already recorded in the recording medium; and the viewing data reproduction unit may, when a reproduction start time is indicated by the viewing data, isolate the reproduction position corresponding to the indicated reproduction start time based on the reproduction position information attached with the timestamp, and start reproduction of the viewing data from the indicated reproduction position.

Through this, when the reproduction position information repeatedly included in the broadcast wave, the information being, for example, an NPT coefficient, is identical to data already recorded in the recording medium, that information is not further recorded in the recording medium, and therefore it is possible to further reduce the area of the recording medium that is used. In addition, because the reproduction position information attached with the timestamp is recorded into the recording medium, when the reproduction start point is indicated, it is possible to immediately start reproduction of the viewing data from the appropriate reproduction position.

Incidentally, Patent References 1 and 2, which are conventional technology, are technologies regarding only the effective recording of carousel-form data. In a conventional broadcast system (for example, BS digital broadcast), by recording carousel-form data separately, an effect of reducing the recording volume is obtained. However, in the conventional broadcast system, it is not necessary to separately record other data, aside from the carousel-form data, that is within the broadcast wave. It is thought that this is because there is no service that realizes a close link between data of a recorded broadcast wave and an application.

However, in OCAP-DVR, 1) an application uses the data recorded in the broadcast wave, or 2) the application is controlled in accordance with the data recorded in the broadcast wave, and thus it is possible to implement a service that realizes a close link between the data of the broadcast wave and the application. Therefore, in OCAP-DVR, a variety of effects can be obtained by separately recording other data aside from the carousel-form data.

For example, regarding the abovementioned 1), in OCAP-DVR, a skip function that uses position information (NPT coefficient) of a skip destination is provided as a function for viewing the recorded broadcast wave as package media. In the case where the position information of the skip destination is multiplexed within the broadcast wave, it is necessary to extract the position information of the skip destination from the broadcast wave at the time of reproduction, and thus instantaneous skip reproduction, and highly-responsive viewing, cannot be realized. By attaching a timestamp and recording the position information of the skip destination separately, it is possible to provide highly-responsive viewing of the recorded broadcast wave.

In addition, regarding the abovementioned 2), in OCAP-DVR, an application control information table (AIT) is sent at a 30-second send interval. By attaching a timestamp to the application control information table and recording the table separately, in the case where skip reproduction is carried out, it is possible to eliminate the timing in which the send interval, which is 30 seconds, must be waited for.

In addition, according to the present invention, a broadcast recording apparatus records and reproduces a broadcast wave configured of a plurality of data and includes: a unit which receives the broadcast wave; an extraction unit which extracts data from the broadcast wave; a recording administration unit which records the data extracted by the extraction unit in a recording area and fetches the data recorded in the recording area; and a reproduction unit which reproduces the data fetched by the recording administration unit. Through this, a plurality of data contained in a broadcast wave can be recorded and reproduced.

In addition, the plurality of data included in the broadcast wave includes a plurality of program data repeatedly sent in a fixed interval, the extraction unit repeatedly extracts, in a fixed interval, the program data repeatedly sent in a fixed interval; the recording administration unit may not record, in the recording area, the program data extracted by the extraction unit in the case of judging that the program data extracted by the extraction unit is the same as program data extracted by the extraction unit before the fixed interval, and may record, in the recording area, the program data extracted by the extraction unit in the case of judging that the program data extracted by the extraction unit is different from the program data extracted by the extraction unit before the fixed interval; and the reproduction unit carries out execution of the program data fetched by the recording administration unit from the recording area. Through this, storage area of the program within the broadcast wave is reduced, and extraction processing is not necessary during reproduction.

In addition, the program data repeatedly sent in the fixed interval is the program data that includes an identifier and a version, and the recording administration unit judges that the program data extracted by the extraction unit is the same as the program data extracted by the extraction unit before the fixed interval, in the case where an identifier of the program data extracted by the extraction unit is the same as an identifier of the program data extracted by the extraction unit before the fixed interval and a version of the program data extracted by the extraction unit is the same as a version of the program data extracted by the extraction unit before the fixed interval. Through this, storage area of the program within the broadcast wave is reduced, and extraction processing is not necessary during reproduction.

In addition, the plurality of data included in the broadcast wave further includes video/audio data sent without being repeated in synchronization with the program data, the extraction unit further extracts the video/audio data; the recording administration unit further records the video/audio data extracted by the extraction unit into the recording area; and the reproduction unit reproduces video/audio fetched by the recording administration unit and executes a program fetched by the recording administration unit. Through this, video/audio can be recorded and reproduced along with a program.

In addition, the recording administration unit, when recording the program data into the recording area, further adds, to the program data, a period of validity indicating a time from when a program data the same as the program data is first extracted until when a program data the same as the program data is last extracted, and records the program data; and, when the reproduction unit executes the program data, fetches, from the recording area, program data with a reproduction time within the period of validity; and the reproduction unit synchronizes and carries out reproduction of video/audio fetched by the recording administration unit and execution of program data fetched by the recording administration unit. Through this, it is possible to synchronize and reproduce the program and the video/audio.

In addition, the plurality of data included in the broadcast wave further includes a plurality of program control tables, each of which is repeatedly sent in a fixed interval and which has control information of the program data, and furthermore, the plurality of data included in the broadcast wave is grouped in a plurality of units called services, wherein each service has the video/audio data, the program data, and one of the plurality of program control tables; the program control table is the program control table, which denotes a plurality of program data included in the same service that includes that program control table, as well as includes a version; the extraction unit further repeatedly extracts, in a fixed interval, one of the program control tables held by the service prescribed as record, and repeatedly extracts, in a fixed interval, all program data denoted in the extracted program control table; the recording unit does not record the program control table extracted by the extraction unit in the case of judging that a version of the program control table extracted by the extraction unit is the same as a version of the program control table extracted by the extraction unit before the fixed interval, and records the program control table extracted by the extraction unit in the case of judging that a version of the program data extracted by the extraction unit is different from a version of the program data extracted by the extraction unit before the fixed interval, and furthermore, when recording the program control table into the recording area, adds, to the program control table, a period of validity indicating a time from when a version of a program control table the same as the program control table is first extracted to when a version of a program data the same as the program control table is last extracted, and records the program control table, and in addition, when said reproduction unit executes the program data in accordance with a service that prescribes reproduction, fetches, from the recording area, all program data denoted in the program control table that have that reproduction time within the period of validity; and the reproduction unit further carries out execution of the program data that the recording administration unit fetched, in accordance to information of the program control table fetched by the recording administration unit according to the service that prescribes reproduction. Through this, it is possible to reduce the recording area of the program control table within the broadcast wave, and extraction of AIT during reproduction is unnecessary.

In addition, the program control table further denotes whether or not to use each program data included in a same service which includes the program control table, in a period in which that service is prescribed as recording or reproduction; the extraction unit repeatedly extracts, in a fixed interval, the program control table held by a service in which record is prescribed, and repeatedly extracts, in a fixed interval, program data denoted in the extracted program control table as well denoted to be used in a period prescribed as reproduction of the service; and when the reproduction unit executes the program data in accordance with the service prescribed as reproduction, the recording unit furthermore fetches, from the recording area, the program data denoted in the program control table in which the reproduction time is within a table period of validity as well as denoted to be used in the period prescribed as reproduction of the service. Through this, the recording area of the program can be efficiently reduced.

As described above, reduction of the usage of resources such as filter resources and the recording area, and efficient accumulation reproduction, can be realized by accumulating repeatedly-sent data which has synchronization information with the video/audio, without overlapping.

FURTHER INFORMATION ABOUT TECHNICAL BACKGROUND TO THIS APPLICATION

The disclosure of Japanese Patent Application No. 2005-034786 filed on Feb. 10, 2005 including specification, drawings and claims, and U.S. Provisional Application No. 60/651,231 filed on Feb. 10, 2005, including specification, drawings and claims, are incorporated herein by reference in their entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 3 is one example of how to use a frequency band used in communications between a system on the broadcast system side and a terminal apparatus, in a cable television system according to the present invention;

FIG. 4 is one example of how to use a frequency band used in communications between a system on the broadcast system side and a terminal apparatus, in a cable television system according to the present invention;

FIG. 5 is one example of how to use a frequency band used in communications between a system on the broadcast system side and a terminal apparatus, in a cable television system according to the present invention;

FIG. 12 is an example of use of a PMT predefined by MPEG-2 specifications;

FIG. 13 is an example of use of a PAT predefined by MPEG-2 specifications;

FIG. 16 is a determination sequence for encryption using EMM, ECM, and the like;

FIG. 41 is a diagram indicating an example of a PMT;

FIG. 42 is a chart schematically showing one example of collected AIT information;

FIG. 43 is a diagram indicating one example of a file system encoded in a transport stream in DSMCC format;

DESCRIPTION OF THE PREFERRED EMBODIMENT(S)

First Embodiment

The present invention assumes three types of operation forms, which are a satellite system, a ground wave system, and a cable system, as the target broadcast system. The satellite system is a form in which a broadcast signal is transmitted to a broadcast receiving apparatus using a satellite; the ground wave system is a form in which a broadcast signal is transmitted to a broadcast receiving terminal using a ground wave signal transmission apparatus; and the cable system is a form in which a broadcast signal is transmitted to a broadcast receiving apparatus using a cable head-end. As the present invention has no direct relationship with the differences between each broadcast system, the present invention can be applied regardless of the broadcast system.

Figure 1:
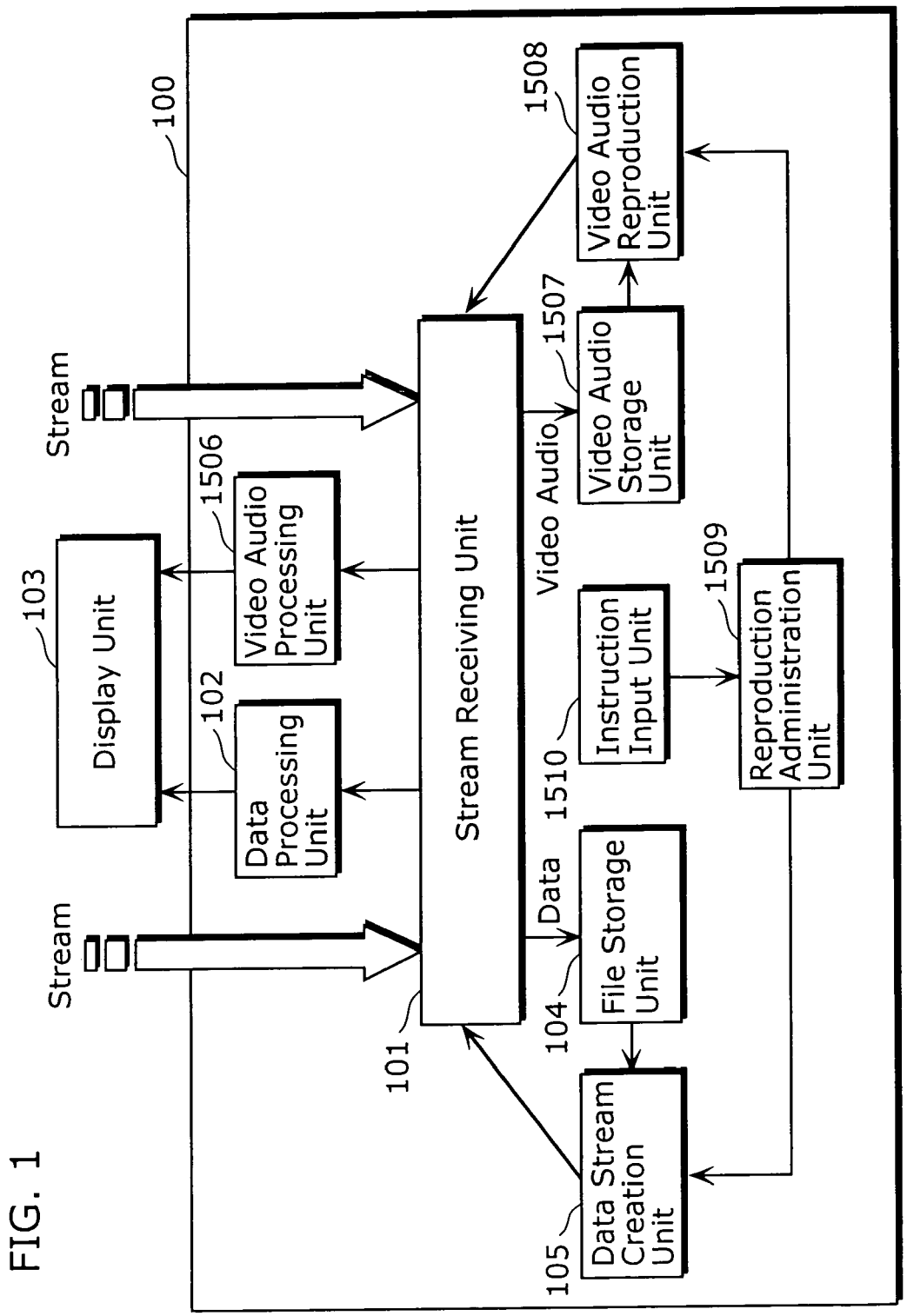
FIG. 1 is an explanatory diagram of conventional technology.
Figure 2:
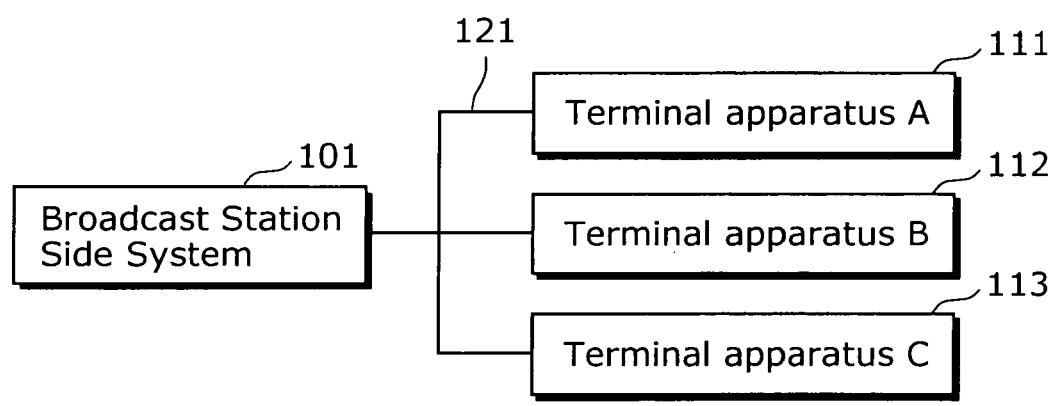
FIG. 2 is a configuration diagram of a broadcast system according to the present invention.

The embodiment of a broadcast system according to the present invention is described with reference to the diagrams. FIG. 2 is a block diagram showing the relationship between apparatuses that make up the broadcast system, and is configured of a broadcast station side system 101 and three terminal apparatuses, a terminal apparatus A111, a terminal apparatus B112, and a terminal apparatus C113. In regards to a coupling 121 between the broadcast station side system and each terminal apparatus, both wired and wireless cases exist. For example, in the cable system, the broadcast station side system and each terminal apparatus are connected with wires. On the other hand, in the satellite/ground wave systems, no wired coupling exists in an outbound direction (from the broadcast station side system to each terminal apparatus), and the broadcast signal is transmitted using radio waves. In regards to an inbound direction (from each terminal apparatus to the broadcast station side system), there is both a wired connection, using a telephone line, wired internet, and the like, as well as a wireless connection, using wireless communications. Each terminal apparatus sends information such as user input to the broadcast station side system. In the present embodiment, three terminal apparatuses are connected to one broadcast station side system, but the present invention can be applied even with an arbitrary number of terminal apparatuses connected to the broadcast station side system.

The broadcast station side system 101 sends information such as video/audio/data for data broadcast in a broadcast signal to a plurality of terminal apparatuses. The broadcast signal is sent using an operational default of the broadcast system, a frequency within a frequency band set by the laws of a region/country in which the broadcast system is operated, and so on.

An example of a broadcast signal transmission default in relation to a cable system is given. In the cable system shown in the present example, the frequency band used in broadcast signal transmission is divided into the data content and transmission direction (inbound, outbound) and used. FIG. 3 is a chart indicating one example of a division of the frequency band. The frequency band is roughly divided into two types: Out Of Band (abbr. OOB) and In-Band. 5 MHz to 130 MHz is assigned as OOB, and is mainly used in data exchange between the broadcast station side system 110 and the terminal apparatus A111, the terminal apparatus B112, and the terminal apparatus C113. 130 MHz to 864 MHz is assigned as In-Band, and is mainly used in a broadcast channel including video/audio. QPSK modulation type is used is OOB, and QAM64 or QAM256 modulation type is used in In-Band. Modulation type technology is generally known and of little concern to the present invention, and therefore detailed descriptions are omitted. FIG. 4 is one example of further detailed use of the OOB frequency band. 70 MHz to 74 MHz is used in data sending from the broadcast station side system 101, and each of the terminal apparatus A111, the terminal apparatus B112, and the terminal apparatus C113 receive the same data from the broadcast station side system 101. On the other hand, 10.0 MHz to 10.1 MHz is used in data sending from the terminal apparatus A111 to the broadcast station side system 101; 10.1 MHz to 10.2 MHz is used in data sending from the terminal apparatus B112 to the broadcast station side system 101; and 10.2 MHz to 10.3 MHz is used in data sending from the terminal apparatus C113 to the broadcast station side system 101. Through this, it is possible to send unique data from each terminal apparatus A111, B112, and C113 to the broadcast station side system 101. FIG. 5 in one example of use of an In-Band frequency band. 150 MHz to 156 MHz and 156 MHz to 162 MHz are assigned to a TV channel 1 and a TV channel 2 respectively, and thereafter, TV channels are assigned in 6 MHz intervals. Radio channels are assigned in 1 MHz units from 310 MHz on. Each of these channels may be used as analog broadcast or as digital broadcast. Digital broadcast is sent in TS packet format based the on MPEG-2 specifications, and it is also possible to send data for each kind of data broadcast and TV show composition information for configuring EPG in addition to audio and video.

The broadcast station side system 101 uses these frequency bands to send an appropriate broadcast signal to the terminal apparatuses, and therefore has a QPSK modulation unit, a QAM modulation unit, and so on. In addition, the broadcast station side system has a QPSK demodulator for receiving data from the terminal apparatuses. In addition, the broadcast station side system can be thought of as having various devices related to the modulation units and demodulation unit. However, the present invention relates mainly to the terminal apparatuses, and therefore detailed descriptions are omitted.

The terminal apparatuses A111, B112, and C113 receive and reproduce a broadcast signal from the broadcast station side system 101. In addition, each terminal apparatus sends unique data to the broadcast station system side 101. The three terminal apparatuses have the same configuration in the present embodiment.

Note that the present example introduces the details of one example regarding cable system operation, but it is also possible to apply the present invention to a satellite system, a ground wave system, and a different kind of cable system as well. As mentioned earlier, both wired/wireless cases exist as a connection between the broadcast station side system and each terminal apparatus in the satellite and ground wave systems, and furthermore, the frequency band, frequency interval, modulation system, configuration of the broadcast station side system, and so on differ depending on the type and operation of the broadcast system. However, those have no relation to the present invention, and the present invention is applicable regardless of how those are pre-set.

The broadcast station side system 101 modulates an MPEG-2 transport stream and transmits the stream included in the broadcast signal. A broadcast receiving apparatus receives the broadcast signal, demodulates and reproduces the MPEG-2 transport stream, and from the stream, extracts and uses necessary information. In order to describe a device function and connection structure existing in a digital broadcast receiving apparatus, the structure of the MPEG-2 transport stream is first described in a simple manner.

Figure 6:
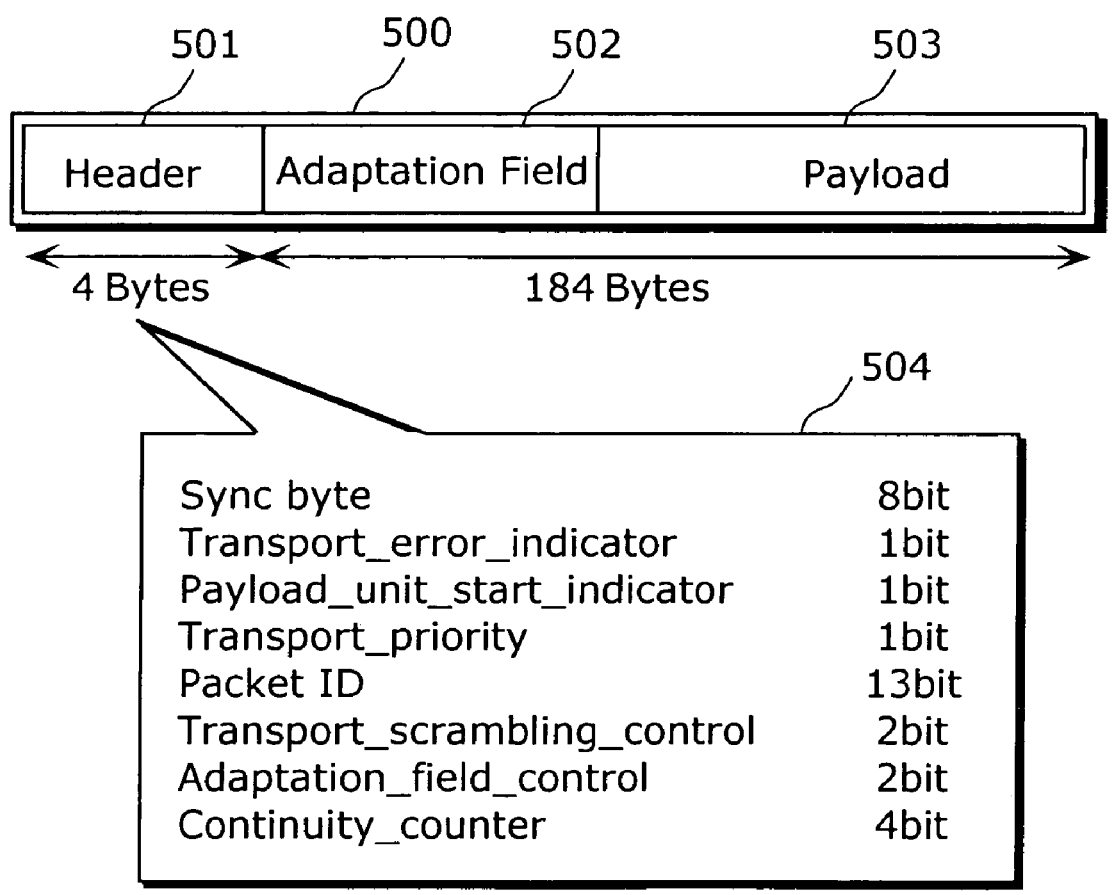
FIG. 6 is a configuration diagram of a TS packet predefined by MPEG-2 specifications.

FIG. 6 is a diagram showing the structure of a TS packet. A TS packet 500 has a length of 188 bytes, and is composed of a header 501, an adaptation field 502, and a payload 503. The header 501 holds control information of the TS packet, has a length of 4 bytes, and has the structure shown in 504. In the header 501 there is a field denoted as "Packet ID" (hereafter, PID), and identification of the TS packet is carried out through the value of this PID. The adaptation field 502 holds additional information such as time information. Existence of the adaptation field 502 is not mandatory, and there are cases where the adaptation field 502 does not exist. The payload 503 holds information transmitted by the TS packet, such as video, audio, and data broadcast data.

Figure 7:
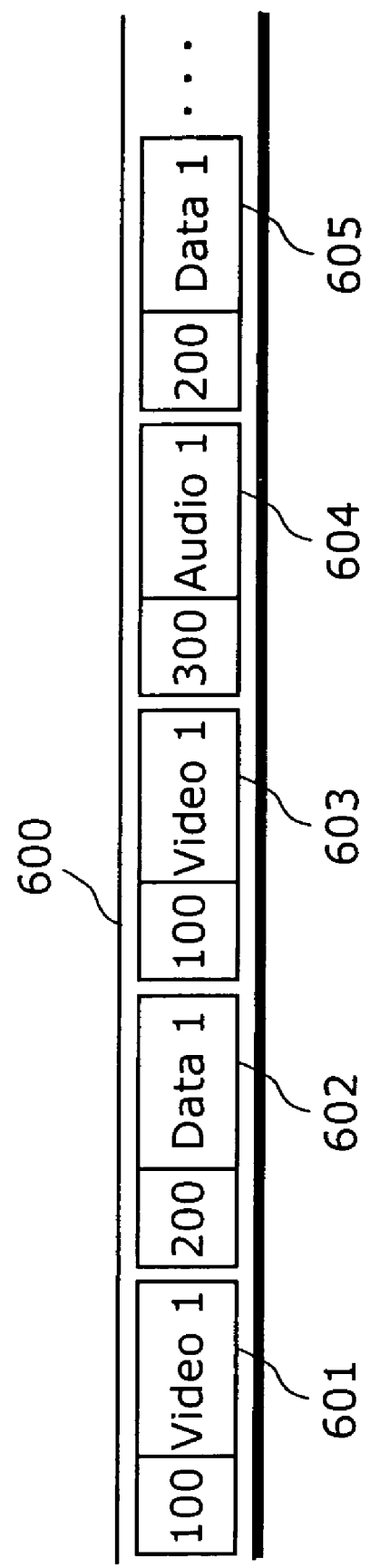
FIG. 7 is a schematic diagram of an MPEG-2 transport stream.

FIG. 7 is a schematic diagram of the MPEG-2 transport stream. A TS packet 601 and a TS packet 603 hold a PID 100 in a header, and hold information regarding a video 1 in a payload. A TS packet 602 and a TS packet 605 hold a PID 200 in a header, and hold information regarding data 1 in a payload. A TS packet 604 holds a PID 300 in a header, and holds information regarding an audio 1 in a payload.

An MPEG-2 transport stream 600 is configured of sequential TS packets, such as the TS packets 601 to 605. The TS packets hold various information, such as video, audio, and data broadcast data, in the payload. The broadcast receiving apparatus receives the TS packets, and by extracting the information held by each TS packet, reproduces video/audio, and uses data such as TV show composition information. At this time, TS packets which have identical PIDs hold identical kinds of information. Also in FIG. 7, the TS packet 601 and the TS packet 603 each transmit information regarding the video 1, and the TS packet 603 and the TS packet 605 each transmit information regarding the data 1.

Figure 8:
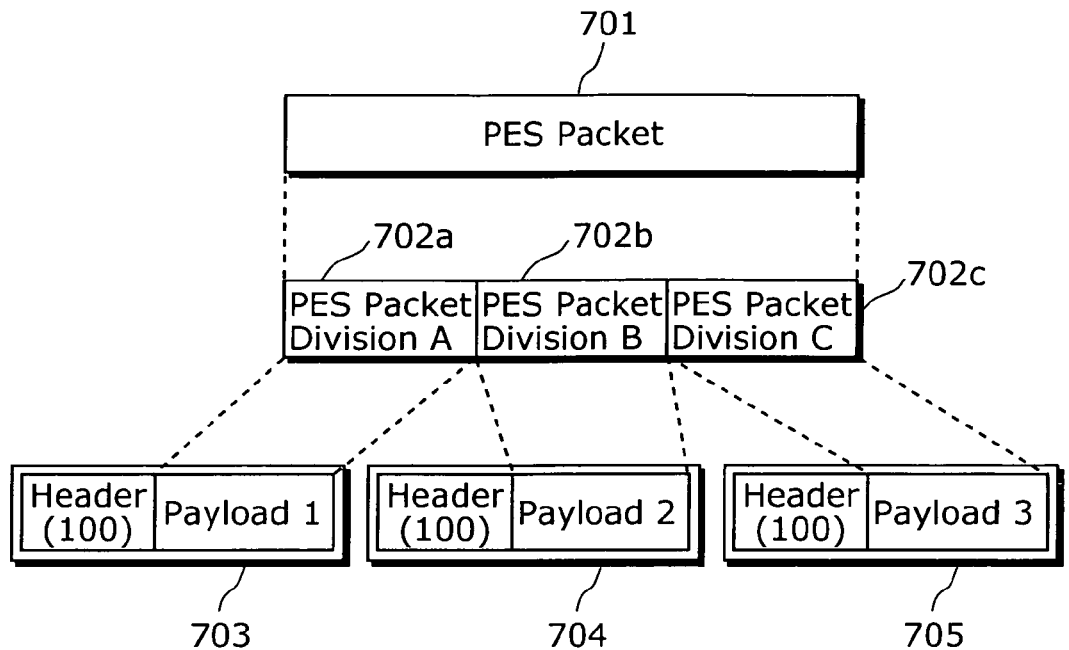
FIG. 8 is an example of division when a PES packet predefined by MPEG-2 specifications is transmitted using a TS packet.

Video and audio are represented by a format called a Packetized Elementary Stream (PES) packet. The PES packet includes video information and audio information of a certain time period, and by receiving the PES packet, the broadcast receiving system can output the video/audio information included in that PES packet in a screen/speaker. The broadcast station transmits the PES packets without pause, and therefore it is possible for the broadcast receiving apparatus to continuously reproduce the video/audio without pause. When the PES packet is actually transmitted, the PES packet is divided and stored in the payloads of a plurality of TS packets in the case where the PES packet has a size bigger than the payload of one TS packet. FIG. 8 shows an example of division when a PES packet is transmitted. As a PES packet 701 is too large to be stored and transmitted in a payload of a single TS packet, the PES packet 701 is divided into a PES packet division A 702a, a PES packet division B 702b, and a PES packet division C 702c, and is transmitted by three TS packets 703 to 705 which have identical PIDs. Note that the PES packet may, depending on operations, transmit not only video/audio, but also caption data called subtitles.

Figure 9:
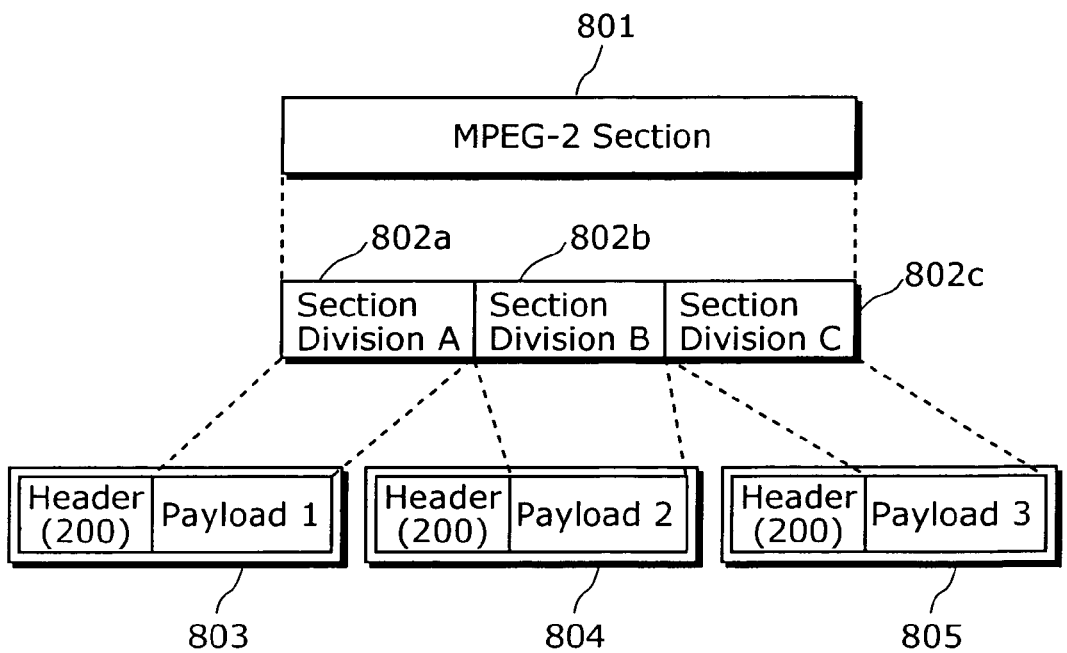
FIG. 9 is an example of division when an MPEG-2 section predefined by MPEG-2 specifications is transmitted using a TS packet.

Information such as the TV show composition information and data broadcast data is expressed using a format called MPEG-2 section. When the MPEG-2 section is actually transmitted, the MPEG-2 section is divided and stored in the payloads of a plurality of TS packets in the case where the MPEG-2 section has a size bigger than the payload of one TS packet. FIG. 9 shows an example of division when the MPEG-2 section is transmitted. As an MPEG-2 section 801 is too large to be stored and transmitted in a payload of a single TS packet, the MPEG-2 section 801 is divided into a section division A 802a, a section division B 802b, and a section division C 802c, and is transmitted by three TS packets 803 to 805 which have identical PIDs.

Figures 10, 11:
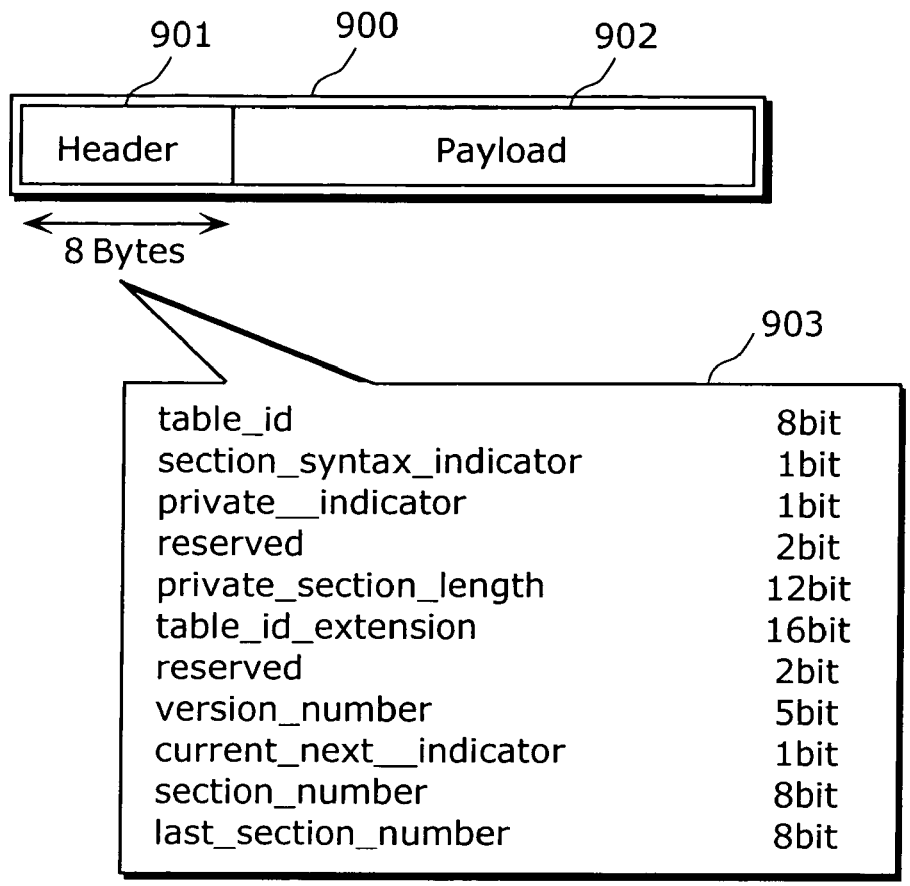
FIG. 10 is a configuration diagram of an MPEG-2 section predefined by MPEG-2 specifications.
FIG. 11 is an example of use of an MPEG-2 section predefined by MPEG-2 specifications.

FIG. 10 expresses a structure of the MPEG-2 section. An MPEG-2 section 900 is configured of a header 901 and a payload 902. The header 901 holds control information of the MPEG-2 section. That structure is expressed by a header structure 903. The payload 902 holds data transmitted by the MPEG-2 section 900. A table_id existing in the header structure 903 expresses the type of the MPEG-2 section, and a table_id_extension is an extension identifier used when further distinguishing between MPEG-2 sections with an equal table_id. The case where the TV show composition information is transmitted, as in FIG. 11, can be given as an example of use of the MPEG-2 section. In this example, as denoted in row 1004, information necessary for demodulating the broadcast signal is denoted in the MPEG-2 section which has a table_id of 64 in the header structure 903, and this MPEG-2 section is further transmitted by a TS packet with a PID of 16 assigned.

Among the TS packet lines existing in the MPEG-2 transport stream, extracted part TS packet lines, which are only those identified through identical PIDs, are called an elementary stream (ES). For example, in FIG. 8, the TS packets 703 to 705, in which the PES packet 701 is divided and transmitted, all are identified with the PID of 100. It can be said that this is an ES which transmits the PES packet 701. In the same manner, in FIG. 9, the TS packets 803 to 805, in which the MPEG-2 section 801 is divided and transmitted, all are identified with the PID of 200. It can be said that this is an ES which transmits the MPEG-2 section 801.

A concept called a program further exists in MPEG-2 transport stream. The program is expressed as a collection of ESs, is used in the case where one wants to handle a plurality of ESs all together. When the program is used, it is possible to handle video/audio, as well as accompanying data broadcast data, all together. For example, in the case where video/audio to be reproduced simultaneously are handled all together, by gathering the ES which transmits a PES packet that includes video and the ES which transmits a PES packet that includes audio, the broadcast receiving device simultaneously reproduces the two ESs.

To express the program, two tables, called a Program Map Table (PMT) and a Program Association Table (PAT) are used in MPEG-2. Detailed descriptions can be found in the specifications of ISO/EC13818-1, "MPEG-2 Systems." The PMT and the PAT are described hereafter in simple terms.

The PMT is a table which includes only the number of programs in the MPEG-2 transport stream. The PMT is configured as an MPEG-2 section, and has a table_id of 2. The PMT holds a program number used in identifying the program and additional information of the program, as well as information regarding an ES belonging to the program. An example of the PMT is given in FIG. 12. 1100 is a program number. The program number is assigned uniquely to programs in the same transport stream, and is used in identifying the PMT. Rows 1111 to 1114 express information regarding individual ESs. Column 1101 is a type of ES, in which "video," "audio," "data," and so on are prescribed. Column 1102 is the PIDs of the TS packets the ES is configured from. Column 1103 is additional information regarding the ES. For example, the ES shown in row 1111 is an ES which transmits an audio PES packet, and is configured of TS packets with a PID of 5011.

The PAT is a table existing in the MPEG-2 transport stream. The PAT is configured as an MPEG-2 section, has a table_id of 0, and is transmitted by a TS packet with a PID of 0. The PAT holds a transport_stream_id used in identifying the MPEG-2 transport stream, and information regarding all PMTs that represent a program existing in the MPEG-2 transport stream. An example of the PAT is given in FIG. 13. 1200 is a transport_stream_id. The transport_stream_id is used in identifying the MPEG-2 transport stream. Rows 1211 to 1213 express information regarding the program. Column 1201 is the program number. Column 1202 is the PID of the TS packet which sends the PMT corresponding to the program. For example, the PMT of the program shown in row 1211 has a program number of 101, and the corresponding PMT is sent by the TS packet with a PID of 501.

In the broadcast receiving system, in the case where a user gives an instruction to reproduce video/audio belonging to a program, reproduction of the prescribed video/audio is executed using the PAT and PMT. For example, in regards to the MPEG-2 transport stream that transmits the PAT in FIG. 13 and the PMT in FIG. 12, the following procedure is taken in the case where reproduction of video/audio belonging to the program with a program number of 101 is executed. First, a transmitted PAT is acquired as an MPEG-2 section with a table_id of "0" from a TS packet with a PID of "0." The PAT is searched for a program with the program number "101", and row 1211 is obtained. From row 1211, the PID "501" of the TS packet which transmits the PMT of the program with a program number "101" is obtained. Next, from the TS packet with the PID of "501," the PMT transmitted as the MPEG-2 section with a table_id of "2" is acquired. Row 1111, which is ES information of voice, and row 1112, which is ES information of video, are obtained from the PMT. From row 1111, a PID "5011" of the TS packet which makes up an ES transmitted by an audio PES packet is obtained. In addition, from row 1112, a PID "5012" of the TS packet which makes up an ES transmitted by a video PES packet is obtained. Next, the audio PES packet is acquired from the TS packet with a PID "5011," and the video PES packet is acquired from the TS packet with a PID of "5012." Through this, it is possible to isolate the video/audio PES packets to be reproduced, and the video/audio transmitted by these packets can be reproduced.

The present invention relates to access control for encrypted information transmitted by an MPEG-2 transport stream. A format of encryption for information included in the MPEG-2 transport stream is described here.

General encryption refers to reversibly modifying data using an encryption algorithm, masking the content of the original data. With encrypted data, it is possible to return to the original data by using a cryptograph removal algorithm. In broadcasting, encryption/cryptograph removal algorithms using a bit string called a "key" are used. The broadcast station reversibly modifies a data to encrypt according to an encryption algorithm that uses an "encryption key," and transmits a "cryptograph removal key" corresponding to the "encryption key" along with the encrypted data. The broadcast receiving apparatus reconstitutes the encrypted data using the cryptograph removal algorithm that uses the "cryptograph removal key," and thus obtains the original data. The present invention has no relationship to the encryption/cryptograph removal algorithms themselves, and it is possible to apply the present invention regardless of what kind of algorithm is used.

As mentioned earlier, the information transmitted in the MPEG-2 transport stream is in the PES packet or MPEG-2 section format, which is divided and transmitted in TS packets. At this time, the encryption processing carried out at the broadcast station is carried out in PES packet and MPEG-2 section units, and the encrypted PES packets and encrypted MPEG-2 section are divided and transmitted by the TS packets. For example, in the case where access control for video/audio information is carried out, encryption processing is carried out on the PES packets which transmit the video/audio information.

Figure 14:
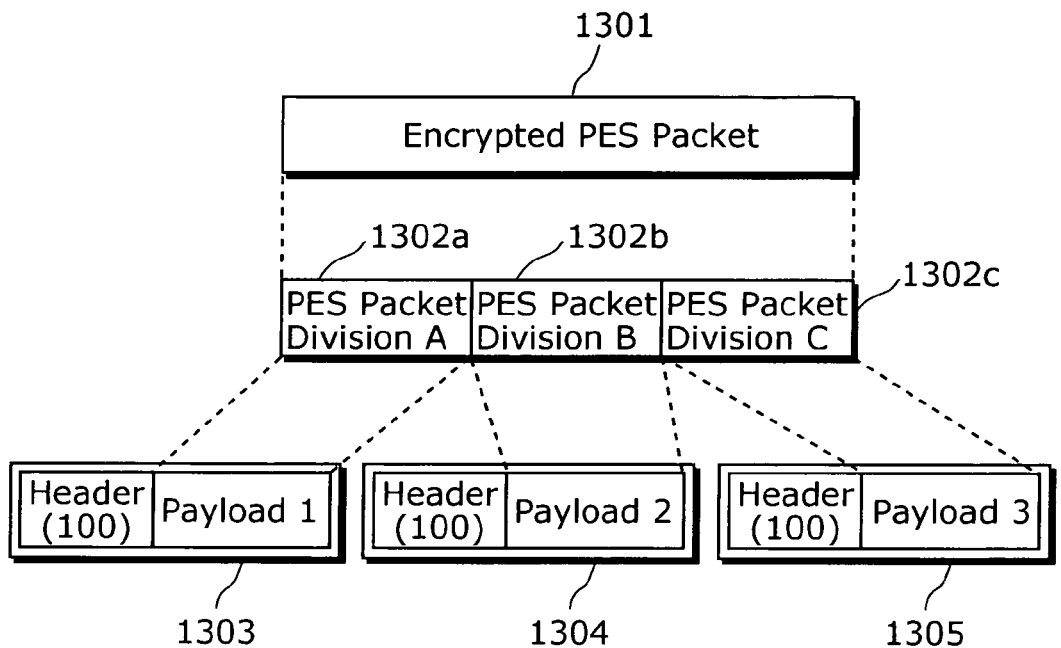
FIG. 14 is an example of the case where a PES packet predefined by MPEG-2 specifications is encrypted.

FIG. 14 shows a status in which an encrypted PES packet is transmitted. A PES packet 1301 is encrypted, and as it is too large to be stored and transmitted inside a payload of one TS packet, the PES packet 1301 is divided into a PES packet division A 1302a, a PES packet division B 1302b, and a PES packet division C 1302c, and is sent by three TS packets 1303 to 1305 which have an identical PID. As a result, payload portions of the TS packets 1303 to 1305 take on encrypted form.

Figure 15:
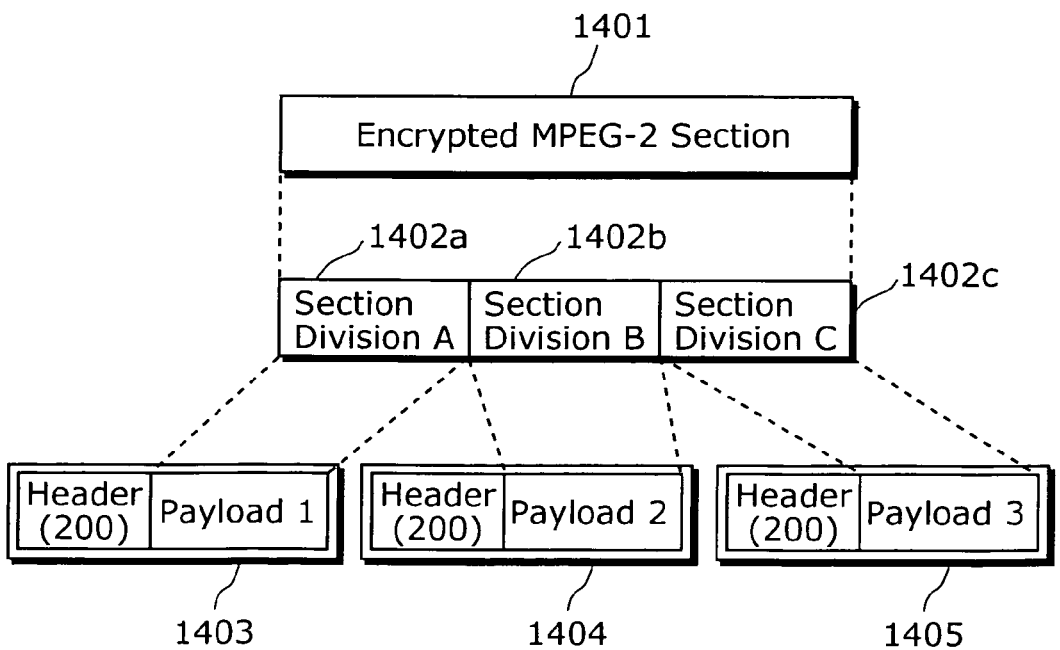
FIG. 15 is an example of the case where an MPEG-2 section predefined by MPEG-2 specifications is encrypted.

FIG. 15 shows a status in which an encrypted MPEG-2 section is transmitted. An MPEG-2 section 1401 is encrypted, and as it is too large to be stored and transmitted inside a payload of one TS packet, the MPEG" section 1401 is divided into a section division A 1402a, a section division B 1402b, and a section division C 1402c, and is sent by three TS packets 1403 to 1405 which have an identical PID. As a result, payload portions of the TS packets 1403 to 1405 take on encrypted form.

The broadcast receiving apparatus executes cryptography removal using a device called a descrambler in order to use the encrypted information. It is possible for one descrambler to execute cryptography removal for one ES. It is possible for the broadcast receiving apparatus to know whether or not the PES packet or MPEG-2 section included in the payload of the transmitted TS packets is encrypted, by using a value set by a transport_scrambling_control held in a TS packet header structure 504 of the TS packets. The PES packet or MPEG-2 section transmitted by the respective payloads are transmitted to the descrambler, and cryptograph removal is executed, if they are encrypted.

Two types of information are necessary for the broadcast receiving apparatus to execute cryptograph removal: "cryptograph removal information, such as a cryptograph removal key" and "contract information for each person contracted." In general, the former is a format called Entitlement Control Message (ECM), and the latter is a format called Entitlement Management Message (EMM), which are included and transmitted in the MPEG-2 transport stream. The ECM transmits keys necessary for cryptograph removal, which are set in the descrambler, and cryptograph removal is executed. The EMM transmits the contract information for each person contracted, which is used in judging whether or not cryptograph removal is contractually allowed for the information which is to have cryptograph removal processing executed. Both are in the PES packet or MPEG-2 section format, and are transmittable, and determination of which is used as well as how to execute transmission is carried out depending on the operation regulations. For the broadcast receiving apparatus to acquire the ECM and the EMM, the PID of the TS packet which transmits the ECM and the EMM is required. In order to realize this, a Conditional Access (CA) descriptor and a Conditional Access Table (CAT) are prescribed in the MPEG-2 specifications. The CA descriptor holds the PID of the TS packet which transmits the ECM and EMM. The CAT is a table that transmits the information regarding cryptograph removal, and is configured of an MPEG-2 section with a table_id of "1," and is sent by a TS packet with a PID of "1." The CAT holds the CA descriptor, and the TS packet identified by the PID held by that CA descriptor is transmitted by the EMM. In addition, the PMT can also hold the CA descriptor, and the TS packet identified by the PID held in the CA descriptor which exists in the PMT is transmitted by the ECM.

The EMM sends the contract information, and is information regarding the broadcast receiving apparatus itself. In the case where the broadcast receiving apparatus receives the EMM, first, the CAT, which is the table_id "1," is acquired from the TS packet with a PID of "1," and the PID of the TS packet sent by the EMM is acquired from the CA descriptor registered in the CAT. The EMM is acquired from the TS packet identified by that PID. The EMM is used when the broadcast receiving apparatus accesses encrypted information, to judge whether or not access is contractually allowed.

The ECM transmits the key for executing cryptograph removal on the information to be accessed, and is information which depends on the program and the ES. In the case where the broadcast receiving device accesses encrypted information, the ES that transmits the encrypted information using the PAT and PMT is specified. In the PMT registered with the information regarding that ES, there is inevitably a CA descriptor registered in accordance. The TS packet identified by the PID registered in that CA descriptor transmits the ECM, and includes the cryptograph removal key necessary to execute cryptograph removal on the information transmitted by that ES. The cryptograph removal key registered in the ECM is set in the descrambler and is used in cryptograph removal.

Figure 16:
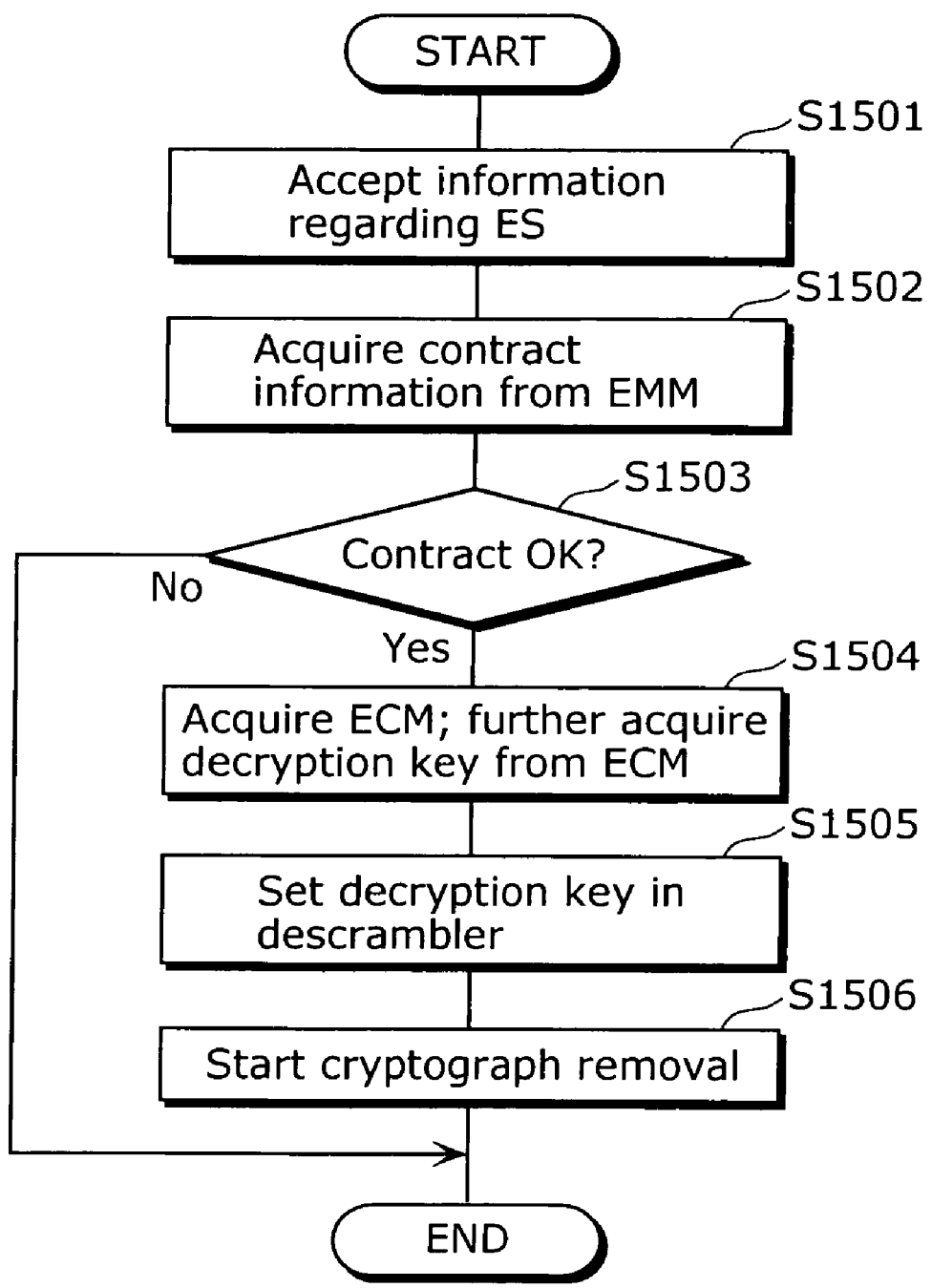

An operation sequence regarding the EMM and ECM during cryptograph removal processing is shown in FIG. 16. First, the broadcast receiving apparatus acquires the PMT from the a prescribed identifier, and isolates the ES for cryptograph removal (S1501). This identifier generally prescribes the program or the ES, but what type of identifier to use is determined depending on the operation. The simplest example is the PID of the TS packet which configures the program number, the ES, and so on. Next, the contract information is obtained from the EMM (S1502). Whether or not it is contractually possible to remove the cryptograph from the information sent by the ES isolated in S1501 is judged from the obtained contract information (S1503). When it is possible to remove the cryptograph, the ECM is acquired (S1504), the cryptograph removal key registered in the ECM is set in the descrambler (S1505), and cryptograph removal begins (S1506).

Note that the MPEG-2 specifications do not prescribe details or a mode of use for the ECM and EMM; the details and mode of use are determined by operation regulations in accordance with each environment. Specifically, in each environment, the following information is not regulated by the MPEG-2 specifications, and is determined based on operations: the form of the ECM and EMM (PES packet or MPEG-2 section); the format of the ECM and EMM; the length and number of cryptograph removal keys registered in the ECM; the length of refresh interval time of the cryptograph removal keys; the content of the contract information registered in the EMM; the send interval of the ECM and EMM; and so on. In each environment, the ECM and EMM transmit the information necessary for cryptograph removal, so the present invention of course relates to cryptograph removal. However, the present invention relates to "timing for beginning cryptograph removal" and "cryptograph removal targets," and relates to pre-processing executed before the actual cryptograph removal processing. The present invention has little relation to the cryptograph removal processing itself, but is applicable in how the ECM and EMM are managed. The sequence in FIG. 16 also relates to the beginning of cryptograph removal in the present invention, but as the present invention has no relationship to how FIG. 16 is realized, the present invention is applicable no matter how the sequence in FIG. 16 is actually realized.

Thus far, simple descriptions have been given regarding MPEG-2 specifications, and here, detailed definitions of terms are given. In the present invention, there exist two types of the term "program." One is a "program" which appears in the MPEG-2 specifications, and the other is a "program" referring to an assemblage of code executed by a CPU. As the former is synonymous with the term "service" used in the operation regulations, hereafter, to avoid confusion, the former is called "service" and the latter is called simply "program." Furthermore, concerning the latter, a "program" particularly written in the Java™ language is called a "Java program."

Description has been given regarding several kinds of information specified in the MPEG-2 specifications according to the present invention. Hereafter, a hardware configuration prerequisite to the embodiments of the present invention is described.

Figure 17:
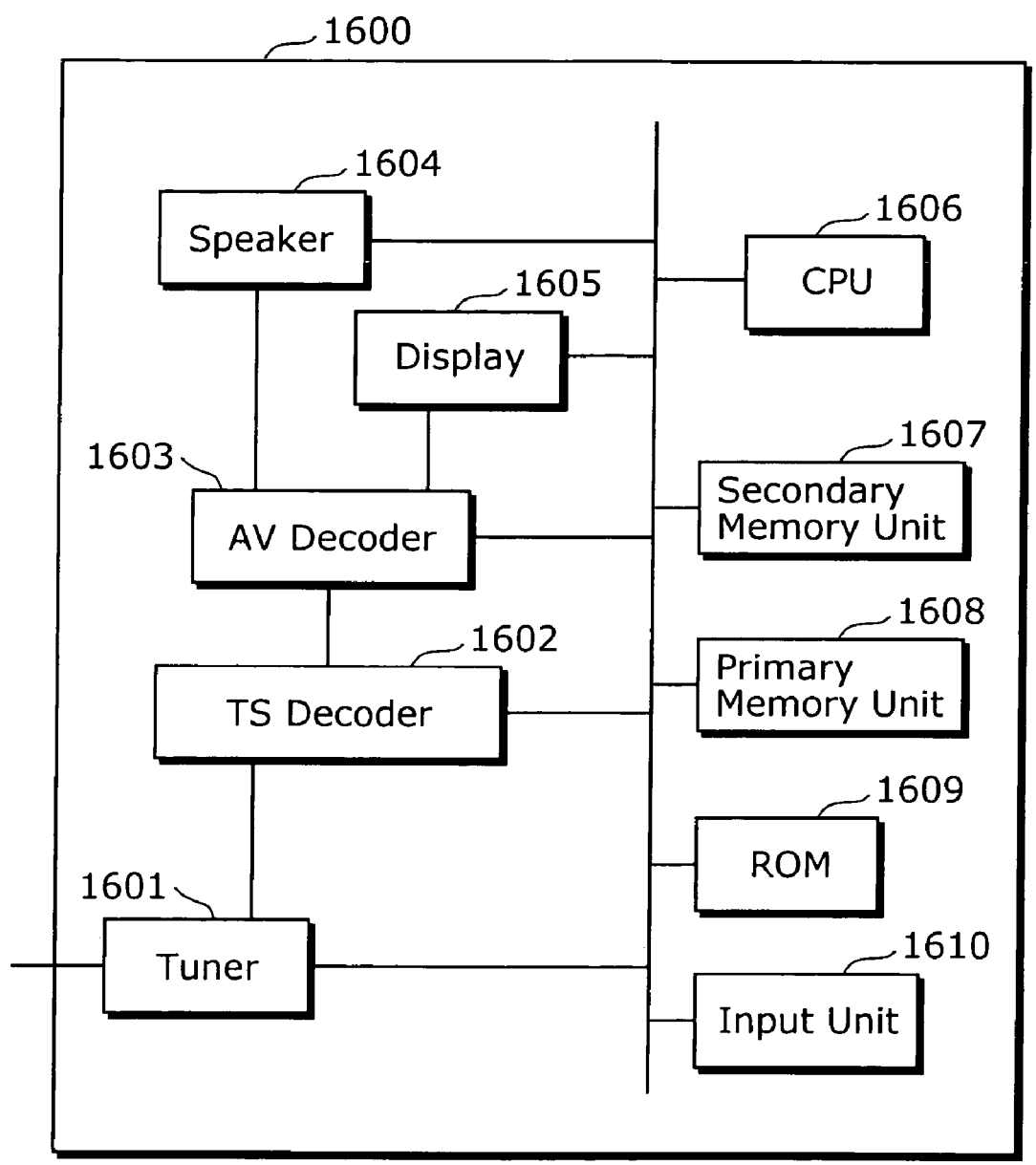
FIG. 17 is a configuration example of a hardware configuration of a broadcast receiving apparatus according to the present invention.

A block diagram showing a general hardware configuration of a digital broadcast receiving apparatus is indicated in FIG. 17. 1600 is a terminal apparatus, which is configured of: a tuner 1601; a TS decoder (TS demultiplexer) 1602; an AV decoder 1603; a speaker 1604; a display 1605; a CPU 1606; a secondary memory unit 1607; a primary memory unit 1608; a ROM 1609; and an input unit 1610.

The tuner 1601 is a device which demodulates a broadcast signal modulated in the broadcast station side system 101 and transmitted, in accordance with tuning information including a frequency prescribed by the CPU 1606. An MPEG-2 transport stream, obtained after demodulation by the tuner 1601, is sent to the TS decoder 1602.

The TS decoder 1602 is a device which has a function to segregate PES packets and MPEG-2 sections which comply with regulation conditions from the MPEG-2 transport stream, based on an instruction of a PID, a section filter condition, and so on prescribed by the CPU 1606. The PES packet segregated by the TS decoder 1602 is transferred to the AV decoder 1603. In addition, the MPEG-2 section segregated by the TS decoder 1602 is transferred to a Direct Memory Access (DMA) of the primary memory unit 1608, and is used by the program which the CPU 1606 executes. In addition, inside the TS decoder 1602, there is a descrambler, which carries out cryptograph removal on the encrypted PES packet and MPEG-2 section.

The AV decoder 1603 is a device with a function to decode encoded video and audio. An audio signal and a video signal obtained from decoding by the AV decoder 1603 are sent to the speaker 1604 and the display 1605. Note that there are cases where the AV decoder 1603 cannot decode the video and audio simultaneously. The AV decoder 1603 may exist as a video decoder unit and an audio decoder unit. Note that there are cases where the AV decoder 1603 has a decode function for subtitle data. In addition, the AV decoder 1603 cannot decode video/audio information transmitted by an encrypted PES packet. Because of this, in the case where cryptograph removal for the PES packet is not carried out by the descrambler in the TS decoder 1602, it is impossible for a user to view and hear video/audio transmitted by that PES packet.

The speaker 1604 and display 1605 are respective devices with functions for outputting audio and video sent from the AV decoder 1603.

The CPU 1606 executes the program operated in the broadcast receiving apparatus. There are cases where the program executed by the CPU 1606 is i) included in the ROM 1609; ii) downloaded from a broadcast signal, a network, and so on and held in the primary memory unit 1608; iii) downloaded from a broadcast signal, a network, and so on and held in the secondary memory unit 1607; and so on. The tuner 1601, TS decoder 1602, AV decoder 1603, speaker 1604, display 1605, secondary memory unit 1607, primary memory unit 1608, ROM 1609, and input unit 1610 are controlled in accordance with the directions of the executed program.

The secondary memory unit 1607 is a non-volatile memory such as a FLASH-ROM, a rewriteable media such as a Hard Disk Drive (HDD), a CD-R, a DVD-R, and so on, and is configured of a device which does not delete information even when the power to the terminal apparatus 1600 is turned off. The secondary memory unit 1607 saves information depending on instructions from the CPU 1606, and is used to save data whose deletion from the terminal apparatus 1600 being turned off would be problematic.

The primary memory unit 1608 is configured of a RAM and so on, and is a device with a function for temporarily saving information in accordance with the CPU 1606, a DMA-accessible device, and so on. The information held in the primary memory unit 1608 is deleted when power to the terminal apparatus is turned off.

The ROM 1609 is a rewritable memory device, and, to be more specific, is configured of a ROM, a CD-ROM, a DVD, and so on. The program executed by the CPU 1606 is stored in the ROM 1609.

Figure 18:
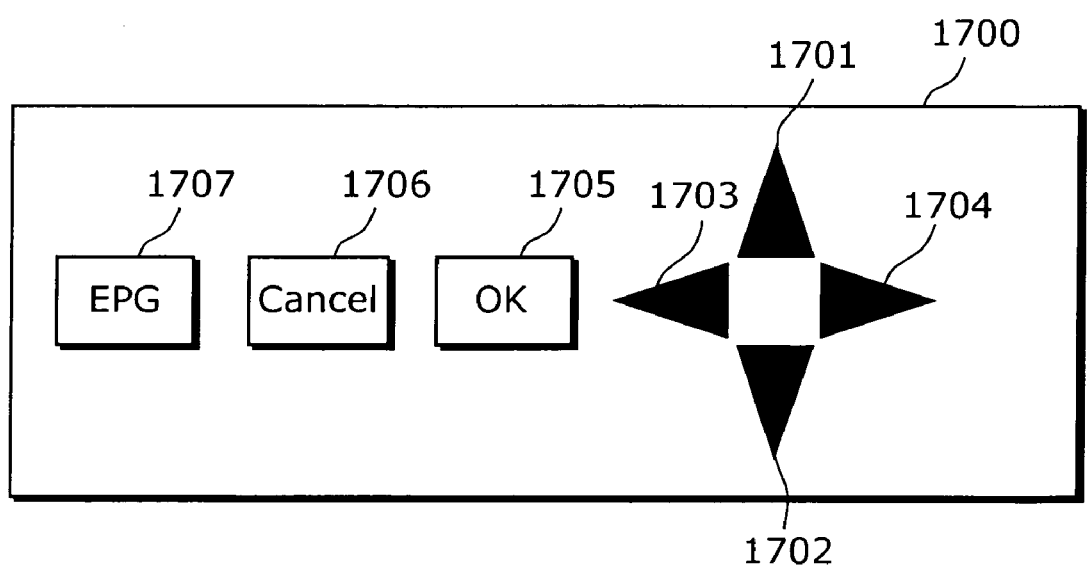
FIG. 18 is an example of a front panel of an input unit 1610 in a hardware configuration of a terminal apparatus 1200 according to the present invention.

The input unit 1610 is, to be more specific, configured of a front panel or a remote control, and accepts input from the user. FIG. 18 is one example of a case where the input unit 1610 is configured of the front panel. A front panel 1700 has seven buttons: an up cursor button 1701, a down cursor button 1702, a left cursor button 1703, a right cursor button 1704, an OK button 1705, a cancel button 1706, and an EPG button 1707. When the user presses a button, an identifier of the pressed button is notified to the CPU 1606.

Note that in FIG. 17, the display 1605 and the speaker 1604 are represented as being contained within the broadcast receiving apparatus, but there also exists a type in which the audio signal and video signal are outputted to the exterior, without the display 1605 and the speaker 1604 being contained in the broadcast receiving apparatus. The placement of the display 1605 and the speaker 1604 has no relationship to the present invention, which is applicable regardless of which type is used. In addition, in FIG. 17, only one each of the tuner 1601 and the AV decoder 1603 exist within the terminal apparatus 1600, but there is a hardware configuration in which a plurality of these devices exist, and the present invention is applicable even in such a case.

Figure 19:
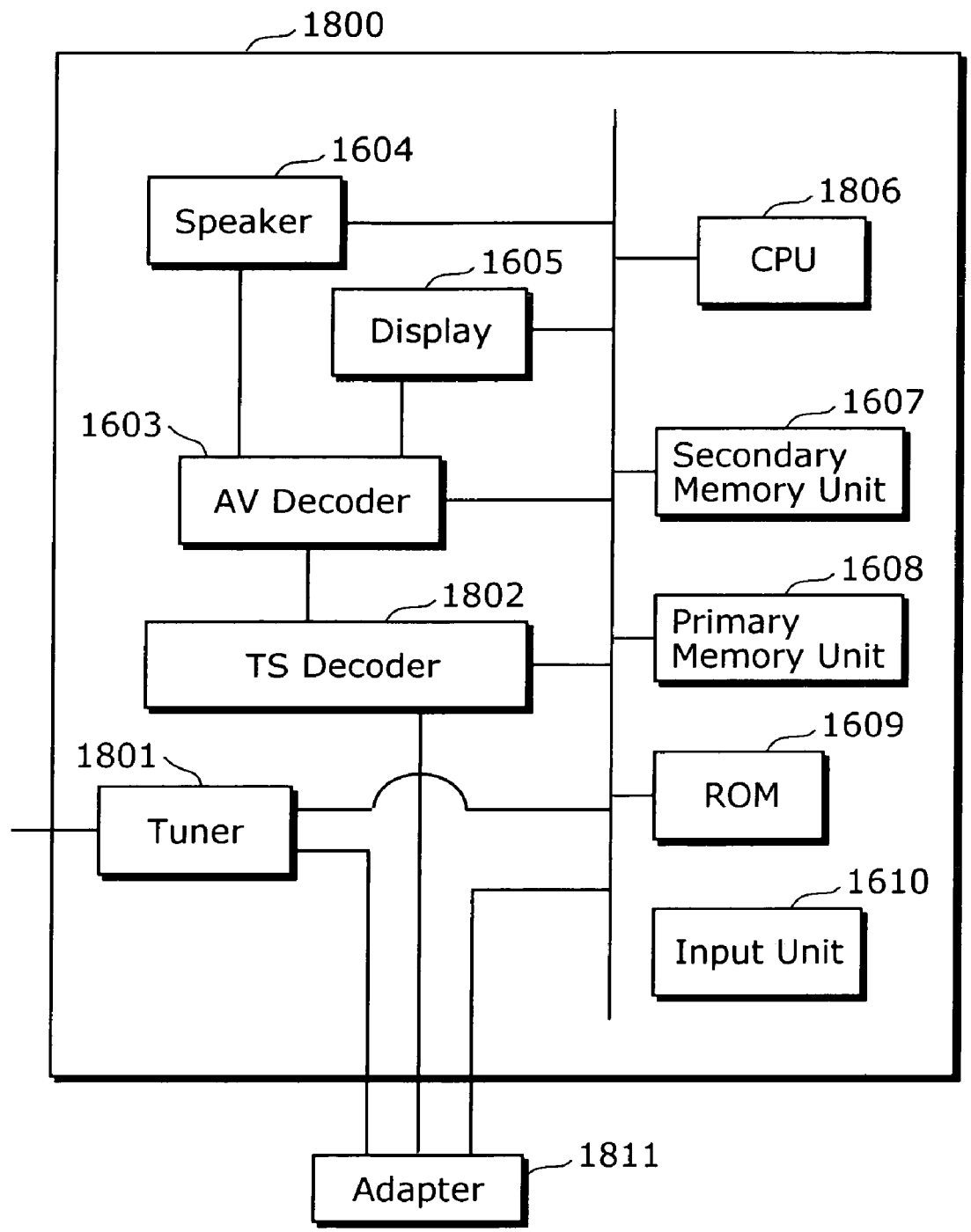
FIG. 19 is a configuration example of a hardware configuration of a broadcast receiving apparatus according to the present invention.

In the hardware configuration shown in FIG. 17, as a default, each device is contained in the terminal apparatus when shipped. However, there are cases in which an adapter for mounting a device one wishes to add is attached to the terminal apparatus, in order to add a device not mounted in the terminal apparatus, and in order to improve the function of the devices mounted in the terminal apparatus. For example, in FIG. 17, the descrambler is, as a default, contained in the TS decoder 1602 of the terminal apparatus 1600 when shipped, but there exists a hardware configuration in which an external adapter that includes a descrambler is physically connected, and the descrambler in the external adapter is used to execute cryptograph removal. An example of such a hardware configuration is shown in FIG. 19. 1800 is a terminal apparatus, and is configured of: a tuner 1801; a TS decoder 1802; an AV decoder 1603; a speaker 1604; a display 1605; a CPU 1806; a secondary memory 1207; a primary memory 1208; a ROM 1609; and an input unit 1610. As the devices mounted in the terminal apparatus 1800 and identified by the same numbers as in FIG. 17 have the same functions as shown in FIG. 17, descriptions are omitted. An adapter 1811 is given to the terminal apparatus 1800.

The adapter 1811 has a descrambler. An MPEG-2 transport stream is an input in the adapter shown in the hardware configuration example in FIG. 19. Regarding a TS packet included in the inputted MPEG-2 transport stream, the adapter 1811 holds at least one descrambler which executes cryptograph removal on a PES packet or MPEG-2 section transmitted by the TS packet with a PID as prescribed by the CPU 1806. It is necessary for the MPEG-2 transport stream demodulated by the tuner 1801 to be inputted into the adapter 1811 in order to cause the descrambler held by the adapter 1811 to be operated. Therefore, the tuner 1801 inputs the demodulated MPEG-2 transport stream into the adapter 1811. After cryptograph removal on the MPEG-2 section or PES packet transmitted by the TS packet prescribed by the CPU 1806 and inside the inputted MPEG-2 transport stream, the adapter 1811 sends the MPEG-2 transport stream to the TS decoder 1802. It is possible for the TS decoder 1802 to carry out processing on the MPEG-2 transport stream inputted from the adapter 1811, just as it is possible for the TS decoder 1602 to carry out processing on the MPEG-2 transport stream inputted from the tuner 1601, as shown in FIG. 17. The CPU 1806 is not simply a device that exists inside the terminal apparatus 1800, but can also communicate with or control devices inside the adapter 1811.

Note that in the hardware configuration shown in FIG. 19, the adapter 1811 has a descrambler, but the present invention is applicable regardless of the number and type of devices held by the adapter 1811. Furthermore, in the hardware configuration shown in FIG. 19, the adapter 1811 takes on a configuration in which the MPEG-2 transport stream is inputted from the tuner 1801, and the MPEG-2 transport stream is sent to the TS decoder 1802. However, the present invention is applicable regardless of in what part for processing a broadcast signal the device mounted in the adapter 1811 is inserted. For example, the present invention is applicable even when the adapter 1811 has an AV decoder and takes on a configuration in which a PES packet is inputted from the TS decoder 1802 and outputs the audio and video signal to the display 1205 and the speaker 1204. In addition, PCMCIA is common as an interface between the terminal apparatus 1800 and the adapter 1811, but the present invention has no relationship to the format of that interface and is thus applicable regardless of the interface. In addition, as the terminal apparatus 1800 does not depend on the number of adapters physically connectable at the same time, the present invention is applicable even when a plurality of adapters are physically connectable.

In addition, note that the adapter 1811 can be realized in various forms, such as a removable card-shaped device used when connected to a card connection terminal in the terminal apparatus 1800, a box-shaped device used when connected to a connection terminal like a USB terminal or an Institute of Electrical and Electronics Engineers (IEEE) 1394 terminal, and so on; however, the present invention is applicable independent of the device form of the adapter 1811, the method of connection to the terminal apparatus, and so on. In addition, as the terminal apparatus 1800 does not depend on the number of adapters physically connectable at the same time, the present invention is applicable even when a plurality of adapters are physically connectable. In addition, in the hardware configuration example in FIG. 19, the MPEG-2 transport stream is inputted directly to the adapter 1811 from the tuner 1801, but a hardware configuration in which the MPEG-2 transport stream outputted from the tuner 1801 passes through the TS decoder 1802 once and is then inputted into the adapter 1811 can also be considered. In such a case, the TS decoder 1802 has a function to interrupt the MPEG-2 transport stream to the adapter 1811, and uses this function to output the MPEG-2 transport stream inputted from the tuner 1801 to the adapter 1811. In addition, one each of the tuner 1801 and the AV decoder 1803 exists in the hardware configuration example shown in FIG. 19, but there are cases of hardware configurations in which a plurality of these exists; the present invention is also applicable in such a case.

A DVB-Common Interface (CI) card used in Europe is given as a first example of an adapter. The DVB-CI specification is shown in "ETSIEN50221." Here, a simple description of the DVB-CI specification is given. The DVB-CI specification is an interface specification for giving an adapter to the terminal apparatus, and connects the terminal apparatus and the adapter using a Personal Computer Memory Card International Association (PCMCIA) interface. The DVB-CI card contains a descrambler internally, and is used in a configuration similar to the hardware configuration example in FIG. 19. In the hardware configuration example shown in FIG. 17, it is necessary for the terminal apparatus 1600 to execute the entire sequence in FIG. 16, but with DVB-CI, a CPU mounted in the DVB-CI card executes the sequence in FIG. 16. As the CPU 1806 inside the terminal apparatus 1800 sends a PMT (CA-PMT) registered in the ES information and the CA descriptor to the DVB-CI card in binary form, the DVB-CI carries out EMM and ECM operations, and automatically begins cryptograph removal. CA-PMT is described later.

Figure 20:
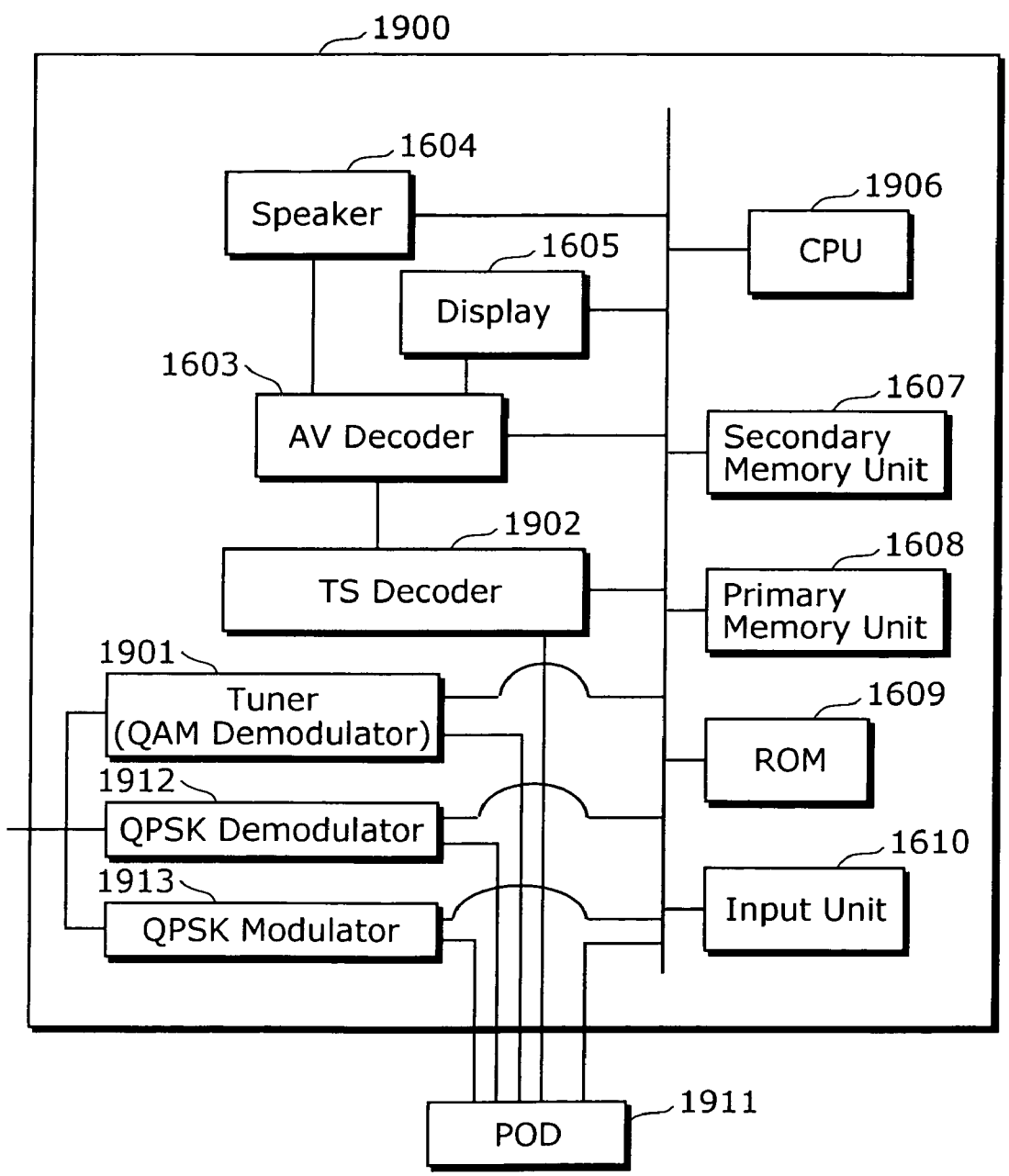
FIG. 20 is a hardware configuration example of a broadcast receiving apparatus which uses CableCARD according to the present invention.

A CableCARD (formerly Point of Deployment, or POD) used in United States cable systems is given as a second example of an adapter. The CableCARD specification is shown in an "OC-SP-CC-IF" specification. Here, a simple description of the CableCARD is given. Both the CableCARD and DVB-CI are in a similar card form, and are connected to the terminal apparatus using the PCMCIA interface. FIG. 20 shows a hardware configuration in which a CableCARD 1911 is given to the terminal apparatus. Regarding devices that exist inside a terminal apparatus 1900, devices identified by the same numbers in FIG. 17 or FIG. 19 have the same functions as in FIG. 17 and FIG. 19. The CableCARD 1911 has a descrambler mounted, and, in the same manner as the adapter 1811 in FIG. 18, is inputted with an MPEG-2 transport stream from a tuner 1901, and outputs the MPEG-2 transport stream with cryptograph removal complete to a TS decoder 1902. In addition, in the United States cable system, various information is transmitted in incoming and outgoing directions using frequency bands called OOB, as shown in FIG. 3 and FIG. 4. At this time, because the format of the information which the broadcast station side system 101 sends to the terminal apparatus differs from the format of information readable by the terminal apparatus 1900, information transfer is impossible as-is. The CableCARD 1911 includes a device which carries out format conversion on incoming and outgoing information transmitted by these OOB. The information transmitted by the OOB is modulated in the QPSK modulation method. As this modulation method is a generally-known technology, detailed descriptions are omitted. The terminal apparatus includes a QPSK demodulator 1912 and a QPSK modulator 1913. A CPU 1906 is not simply a device inside the terminal apparatus 1900, but can control a device inside the CableCARD 1911.

Regarding incoming-direction information receiving of the terminal apparatus 1900, first, the QPSK demodulator 1912 demodulates an incoming signal sent from the broadcast station side system 101 in the OOB, and inputs the generated bit stream into the CableCARD 1911. The CableCARD 1911 extracts information prescribed by the CPU 1906 from the various information included in the bit stream, converts the information into a format readable by a program operated in the CPU 1906, and presents the information to the CPU 1906.

Regarding outgoing-direction information sending of the terminal apparatus 1900, first, the CPU 1906 sends, to the CableCARD 1911, information to be sent to the broadcast station side system 101. The CableCARD 1911 converts the information inputted from the CPU 1906 to be readable by the broadcast station side system 101, and sends the information to the QPSK modulator 1913. The QPSK modulator 1913 QPSK-modulates the information inputted from the CableCARD 1911, and sends the information to the broadcast station side system 101.

Note that the CableCARD 1911 and DVB-CI both have CPUs, and the CPU inside the CableCARD 1911 executes the sequence in FIG. 16. Through the terminal apparatus 1900 sending a PMT (CA-PMT), registered with a CA descriptor, in binary form to the CableCARD 1911, the CableCARD 1911 carries out operations regarding EMM and ECM, and automatically begins cryptograph removal. CA-PMT is described later. In addition, in an environment in which the CableCARD 1911 is used, there are cases where the EMM and ECM are transmitted In-Band, as well as cases in which the EMM and ECM are transmitted by OOB, but the acquisition method of the EMM and ECM is of no relation to the present invention, which is applicable regardless of how the EMM and ACM are transmitted. In addition, FIG. 20 shows, in the same manner as FIG. 19, a configuration in which the MPEG-2 transport stream is inputted directly to the CableCARD 1911 fro the tuner 1901, but a configuration in which the MPEG-2 transport stream is inputted into the CableCARD 1911 after passing through the TS decoder 1902 once is also acceptable. In such a case, the TS decoder 1902 has a function for interrupting the MPEG-2 transport stream inputted from the tuner 1901 from the CableCARD 1911. In addition, the terminal apparatus holds only one of each device, such as a tuner, an AV decoder, and so on, but as the present invention does not depend on the number of each device, the present invention is applicable even there is a plurality of each device. However, in the case where a plurality of tuners exists, and the MPEG-2 transport streams received by the respective tuners have cryptographs removed using the descrambler in the CableCARD 1911, it is necessary for the CableCARD 1911 to have a configuration which allows a plurality of MPEG-2 transport streams to be inputted. Furthermore, it is necessary for the terminal apparatus 1900 to have a function for inputting a plurality of MPEG-2 transport streams into the CableCARD 1911, and for receiving a plurality of MPEG-2 transport streams from the CableCARD 1911.

Here, a simple description is given regarding the difference in cryptograph removal processing between the case where the descrambler exists inside the terminal apparatus 1600 and the case where the descrambler exists inside an external adapter.

In the hardware configuration shown in FIG. 17, the descrambler exists inside the terminal apparatus 1600. In order to carry out cryptograph removal, it is necessary to assign a cryptograph removal key and a PID to the descrambler. Therefore, in this hardware configuration, the terminal apparatus 1600 itself acquires the ECM, and further acquires the cryptograph removal key from the ECM, and sets those values in the descrambler.

In the hardware configuration shown in FIG. 19, the descrambler exists outside of the terminal apparatus 1800. As mentioned above, DVB-CI and CableCARD are representative examples of this. In the case where the descrambler exists outside of the terminal apparatus 1800, as in the external adapter 1811, it is necessary for the terminal apparatus 1800 to pass ES information for starting and stopping cryptograph removal to the external adapter 1811. To that end, a message called CA-PMT is used in the case of DVB-CI and Cable-CARD. The CA-PMT takes on the same structure as the PMT, and contains ES information. The CA-PMT deletes "information aside from information regarding cryptograph removal" from the PMT, and furthermore is provided with a cryptograph removal control plug that shows whether to start or stop cryptograph removal. The DVB-CI and CableCARD start cryptograph removal of the ES registered in the CA-PMT upon receiving the CA-PMT with a cryptograph removal control plug of "start" from the terminal apparatus 1800. The DVB-CI and CableCARD do not only hold the descrambler internally, but also hold a CPU, a ROM registered with a cryptograph removal program, a primary memory, and a device to acquire the EMM/ECM. Operations such as acquisition of the EMM and the ECM, judgment of the contract based on the EMM information, a descrambler setting from the cryptograph removal key registered in the ECM, and a descrambler setting from the PID, are executed by programs in the DVB-CI and the CableCARD. In addition, the DVB-CI and CableCARD stop cryptograph removal of the ES registered in the CA-PMT upon receiving the CA-PMT with a cryptograph removal control plug of "stop" from the terminal apparatus 1800. In addition, the DVB-CI and CableCARD judge whether or not cryptograph removal of the ES registered in the CA-PMT is possible, and notify the terminal apparatus 1800 of the judgment result, upon receiving the CA-PMT with a cryptograph removal control plug of "inquire" from the terminal apparatus 1800. By configuring a CA-PMT and setting that CA-PMT in the DVB-CI and CableCARD, it is possible for the terminal apparatus 1800 to notify instructions for starting/stopping cryptograph removal in the DVB-CI and CableCARD, and information regarding the ES, and it is therefore possible to carry out control of cryptograph removal. In addition, depending on the DVB-CI and CableCARD, when a CA-PMT with a cryptograph removal control plug of "start" is received from the terminal apparatus 1800 and a different cryptograph removal is already being executed, there are cases where cryptograph removal is started based on the received CA-PMT.

Figure 21:
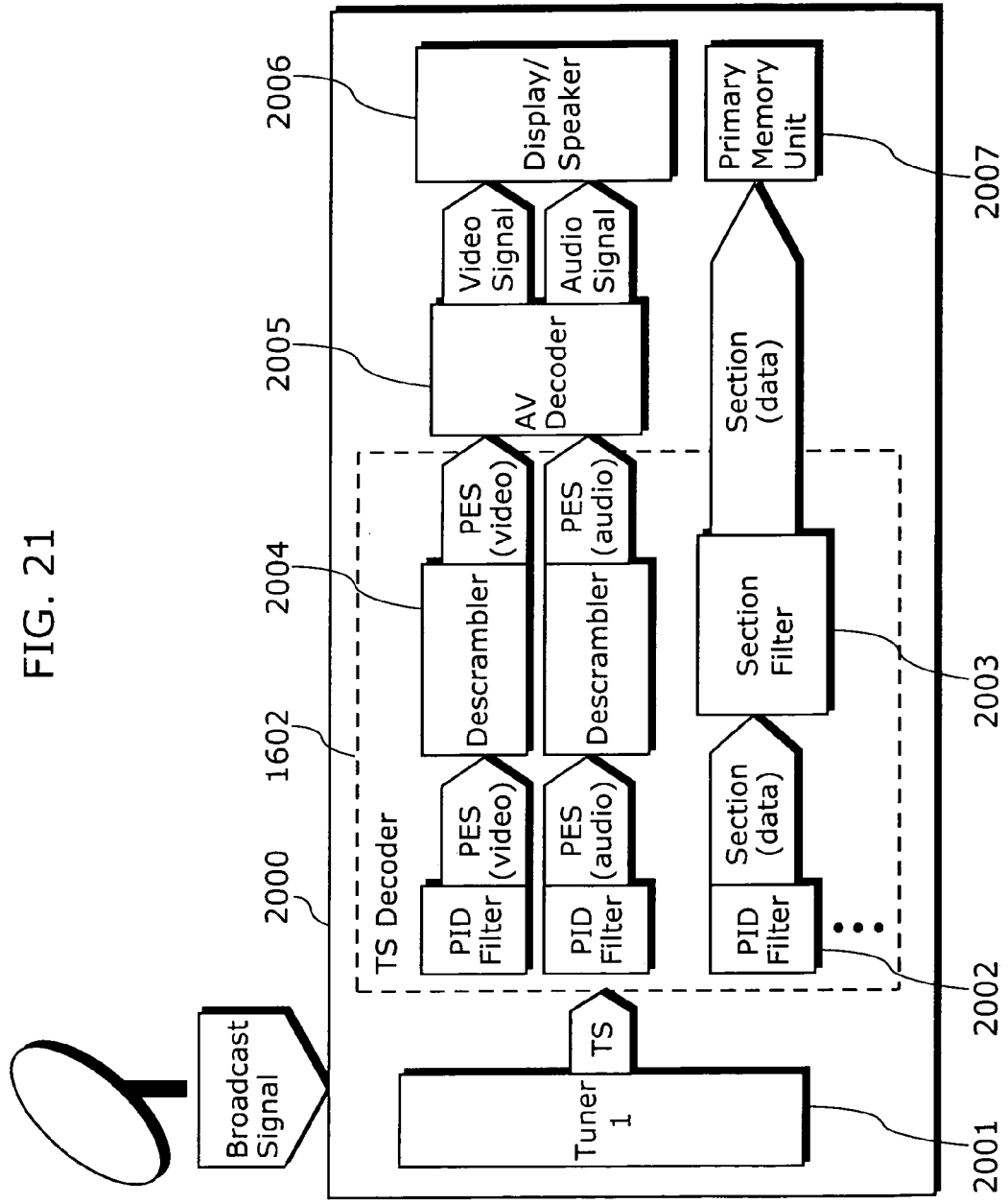
FIG. 21 is an example of device connection in a broadcast receiving apparatus according to the present invention.

Using each device that appears in FIGS. 17 to 20, the broadcast receiving apparatus realizes a function for outputting video/audio transmitted in the broadcast signal on a screen, and a function for extracting data that includes TV show composition information included in the broadcast signal and presenting that data to a user. In FIG. 21, a conceptual rendering which represents a physical connection sequence, processing content, and input/output data format, in shown. 2000 is a terminal apparatus, which has: a tuner 2001; a PID filter 2002; a section filter 2003; a descrambler 2004; an AV decoder 2005; a display/speaker 2006; and a primary memory unit 2007. The devices that appear in FIG. 21 correspond, 1-to-1 or 1-to-many, to the devices that appear in FIG. 17.

The tuner 2001 corresponds to the tuner 1601, and inputs a broadcast signal and outputs an MPEG-2 transport stream.

3 kinds of devices which carry out processing on the MPEG-2 transport stream exist inside the TS decoder 1602: the PID filter 2002; the section filter 2003; and the descrambler 2004. The functions of these are described in detail here.

The PID filter 2002 extracts the TS packet held by the PID prescribed by the CPU 1606 from the inputted MPEG-2 transport stream, and further extracts a PES packet and MPEG-2 section that exist in the payload of the TS packet. The case in which the PES packet is extracted in the situation shown in FIG. 8 can be given as an example. At first, the CPU 1606 sets a PID 100 in the PID filter, and issues a request for the PES packet to be extracted. Then, the PID filter extracts, from among the TS packets flowing in the MPEG-2 transport stream, the TS packets 703 to 705, which have a PID of 100, and further removes, from the payloads of the extracted TS packets 703 to 705, the PES packet division A 702a, the PES packet division B 702b, and the PES packet division C 702c, and constructs the PES packet 701. One or more of the PID filter 2002 exists in the TS decoder 1602.

The descrambler 2004 carries out cryptograph removal on the PES packet and MPEG-2 section outputted by the PID filter 2002. The PES packet and MPEG-2 section are, as in FIG. 8 and FIG. 9, divided and transmitted even when encrypted. The descrambler 2004 can, through the PID instruction of the CPU 1606, isolate the TS packet which transmits the encrypted PES packet and MPEG-2 section, and can then carry out cryptograph removal processing using a cryptograph removal key prescribed by the CPU 1606. The descrambler 2004 outputs the cryptograph removal-processed PES packet to the AV decoder 2005, and the cryptograph removal-processed MPEG-2 section to the section filter 2003, respectively. Cryptograph removal is a processing applied only on encrypted PES packets and MPEG-2 sections, and the descrambler 2004 is input with and carries out cryptograph removal processing on the PES packet and the MPEG-2 section from the PID filter only in necessary cases, as instructed by the CPU 1606. PES packets and MPEG-2 sections which are not scrambled are respectively outputted directly from the PID filter to the AV decoder 2005 and the section filter 2003. One or more descramblers exist inside the TS decoder 1602.

The section filter 2003 extracts, from among the inputted MPEG-2 sections, the MPEG-2 section that conforms with section filter conditions prescribed by the CPU 1606, and DMA-transfers the MPEG-2 section to the primary memory unit 2007. The MPEG-2 section held in the primary memory unit 2007 is read out by the CPU 1606 and used. The case where an MPEG-2 section that holds tuning information is acquired in FIG. 11 can be given as an example. The CPU 1606 first sets a PID 16 in the PID filter 2002, and issues a request for acquiring a section. The PID filter 2002 extracts the section from the TS packet with the PID 16, and submits the section to the section filter 2003. Next, the CPU 1606 requests the section filter 2003 to extract a section with a table_id of 64. The section filter 2003 extracts, from the MPEG-2 sections inputted by the PID filter 2002, the section with a table_id of 64, and DMA-transfers that section to the primary memory unit 2007. One or more of the section filter 2003 exists inside the TS decoder 1602.

The AV decoder 2005 corresponds to the AV decoder 1603, and inputs the PES packet, outputs the audio signal to the display 1605, and outputs the video signal to the display/speaker 2006. The display/speaker 2006 corresponds to the display 1605 and the speaker 1604, and outputs video in the display 1605 with the video signal as the input, and outputs audio to the speaker 1604 with the audio signal as the input.

The primary memory unit 2007 corresponds to the primary memory unit 1608, and, with the MPEG-2 section as the input, makes it possible to verify the content of the program executed by the CPU 1606.

An example of the process of outputting the video and the audio to the display and speaker respectively is shown using the expressions in FIG. 21. The broadcast signal inputted to the broadcast receiving apparatus is first demodulated into an MPEG-2 transport stream by the tuner 2001. Next, the TS packet with a PID prescribed by the CPU 1606 is transmitted and the video and audio information contained in the PES packet is extracted by the PID filter 2002. If necessary, the PES packet is sent to the descrambler 2004, where cryptograph removal processing is executed. After that, the PES packet is inputted to the AV decoder 2005, and the decoded audio signal and video signal are outputted. After that, the audio signal and video signal are inputted to the display and speaker 2006, and it is possible to carry out reproduction of the video and audio.

An example of the process of extracting data such as the TV show composition information from the broadcast signal is shown using the expressions in FIG. 21. The broadcast signal inputted to the broadcast receiving apparatus is first demodulated into an MPEG-2 transport stream by the tuner 2001. Next, the TS packet with a PID prescribed by the CPU 1606 is transmitted and the MPEG-2 section containing the data is extracted by the PID filter 2002. If necessary, the MPEG-2 section is sent to the descrambler 2004, where cryptograph removal processing is executed. Furthermore, the MPEG-2 section is inputted to the section filter 2003, and only the MPEG-2 section which conforms with the section filter conditions prescribed by the CPU 1606 is outputted. After that, the MPEG-2 section is inputted to the primary memory unit 2007 and submitted to the CPU 1606.

Note that in FIG. 21, as in FIG. 17, the broadcast receiving apparatus is conceptually rendered as having a display/speaker 2006, but there is also a type of the display/speaker 2006 which exists externally, rather than being contained by the broadcast receiving apparatus. The present invention is applicable regardless of which of those types is used. In addition, in the conceptual rendering shown in FIG. 21, the descrambler 2004 exists in the TS decoder 1602, but the TS decoder may exist externally, depending on the hardware configuration. The present invention is applicable is such a case as well.

Figure 22:
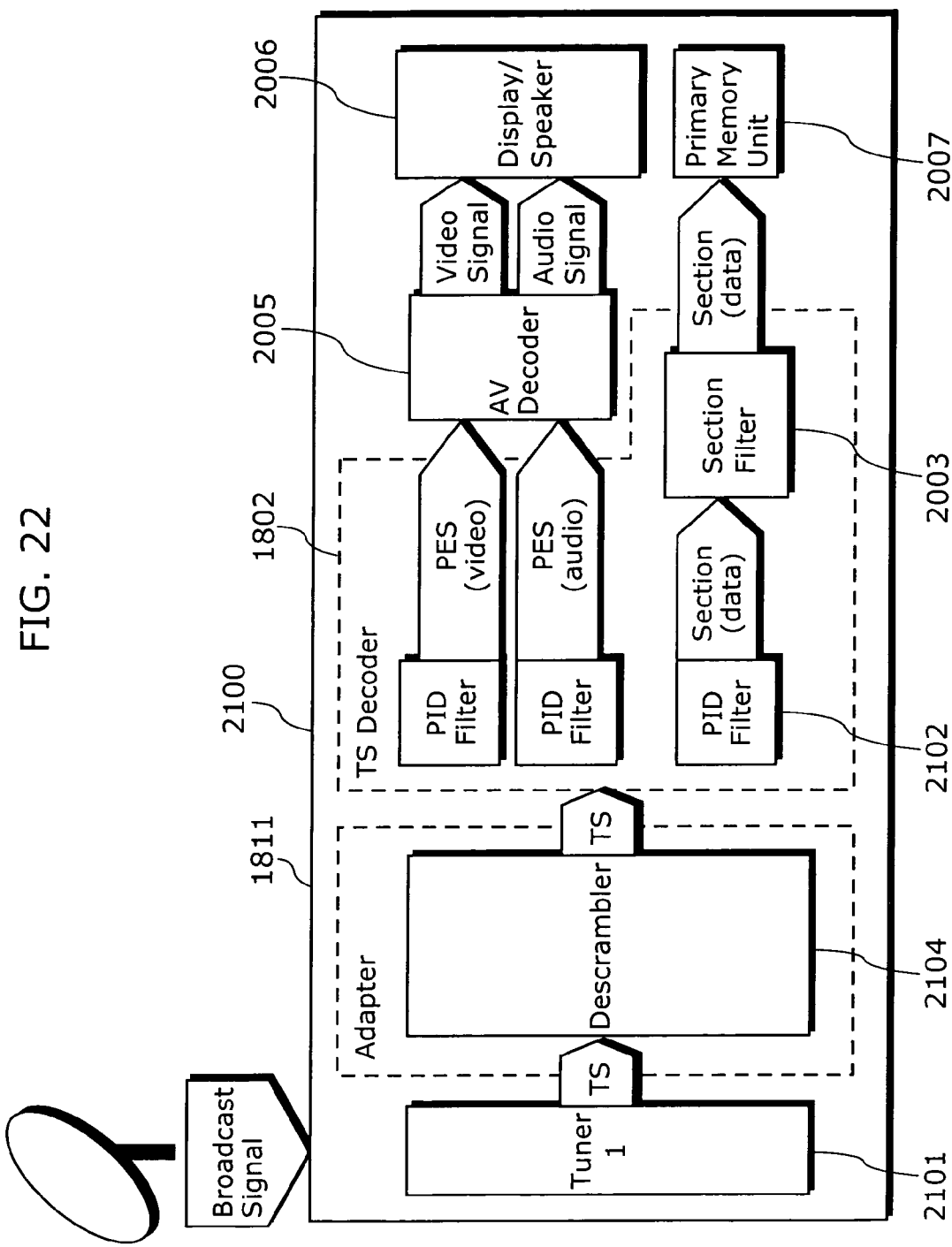
FIG. 22 is an example of device connection in a broadcast receiving apparatus according to the present invention.

Next, a conceptual rendering, which corresponds to the hardware configuration in which the adapter is physically connected shown in FIG. 19, is shown in FIG. 22. 2100 is a terminal apparatus, which includes a tuner 2101, a PID filter 2102, a section filter 2003, an AV decoder 2005, a display/speaker 2006, and a primary memory unit 2007. Furthermore, an adapter 1811 exists, as does a descrambler 2104. Devices identified by the same numbers as in FIG. 21 have the same functions as in FIG. 21, and therefore descriptions are omitted. The connection location and function of the descrambler are what differ from the terminal in FIG. 21. In FIG. 21, the descrambler exists inside the TS decoder, and using the cryptograph removal key prescribed by the CPU 1606, carries out cryptograph removal on the PES packet and MPEG-2 section outputted by the PID filter 2002. On the other hand, in FIG. 22, the descrambler 2104 is connected to the tuner 2101, and is inputted with an MPEG-2 transport stream demodulated by the tuner 2101. The descrambler 2104 extracts the TS packet with a PID prescribed by the CPU 1806, extracts, by itself, a key necessary for cryptograph removal from the MPEG-2 transport stream, and carries out cryptograph removal. The MPEG-2 transport stream on which the descrambler 2104 carried out cryptograph removal processing is inputted to the TS decoder, and thereafter, the processing flows in the same manner as in FIG. 20. It is possible for the PID filter 2102 to extract the TS packet and configure the PES packet and MPEG-2 section from the MPEG-2 transport stream inputted from the descrambler 2104.

As the hardware configuration in which CableCARD exists, as shown in FIG. 20, is the same as the processing of the signal transmitted In-Band, as shown in FIG. 22, descriptions are omitted.

Figure 23:
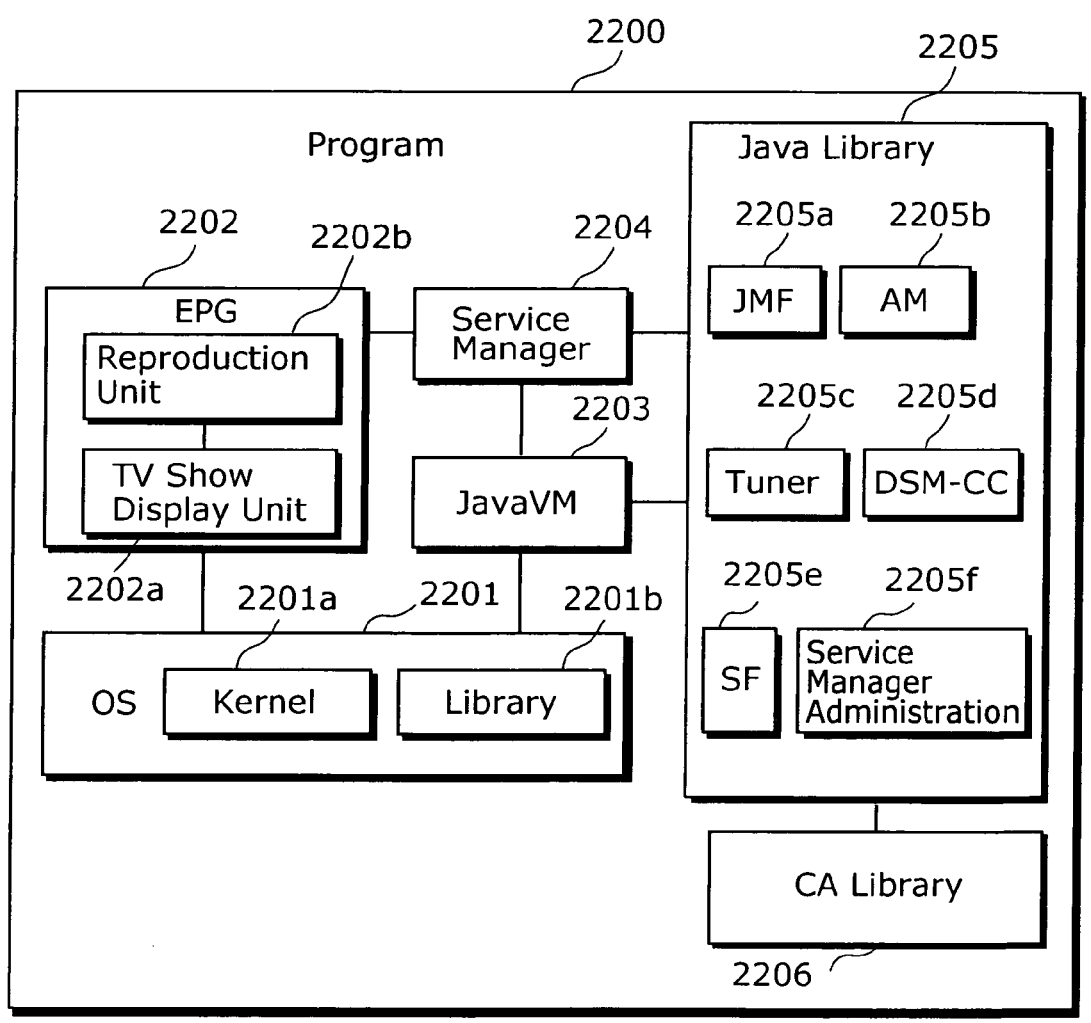
FIG. 23 is a configuration diagram of a program configuration which is saved by a terminal apparatus 1600 according to the present invention.

Thus far, descriptions have been given regarding hardware configuration examples of the present invention, but hereafter, descriptions regarding program operation processes in the terminal apparatus are given. FIG. 23 is one example of a configuration diagram of a program registered in the ROM 1609 and executed by the CPU 1606.

A program 2200 is configured of a plurality of sub-programs; more specifically, is configured of an OS 2201, an EPG 2202, a Java VM 2003, a service manager 2204, and a Java library 2205.

The OS 2201 is a sub-program which the CPU 1606 starts when power to the terminal apparatus 1600 is turned on. The OS of the OS 2201 is short for "operating system"; examples are Linux, Windows™, and so on. The OS 2201 is a generic, commonly-known technology configured of a kernel 2201a and a library 2201b which concurrently execute other programs, and therefore detailed descriptions are omitted. In the present embodiment, the kernel 2201a of the OS 2201 executes the EPG 2202 and the Java VM 2203 as sub-programs. In addition, the library 2201b supplies these sub-programs with a plurality of functions for controlling a structure element held in the terminal apparatus 1600.

A tuning function can be introduced as one example of these functions. The tuning function accepts tuning information, including a frequency, from other sub-programs, and transfers that information to the tuner 1601. The tuner 1601 carries out demodulation processing based on the supplied tuning information, and can provide the demodulated MPEG-2 stream to the TS decoder 1602. As a result, other programs can control the tuner 1601 through the library 2201c.

Figure 24A:
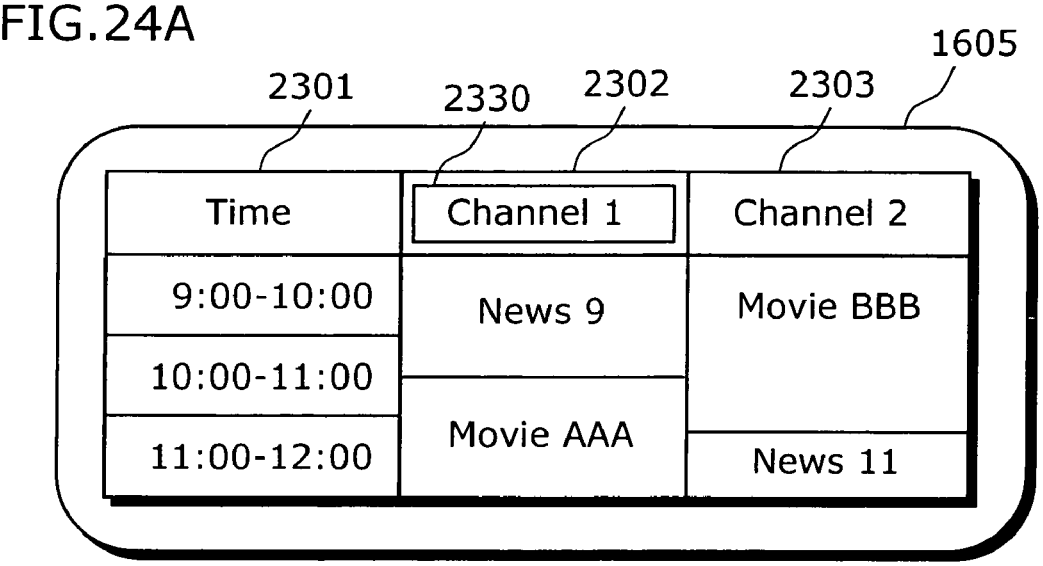
FIGS. 24A and 24B are examples of an EPG executed by a terminal apparatus 1600 according to the present invention.
Figure 24B:
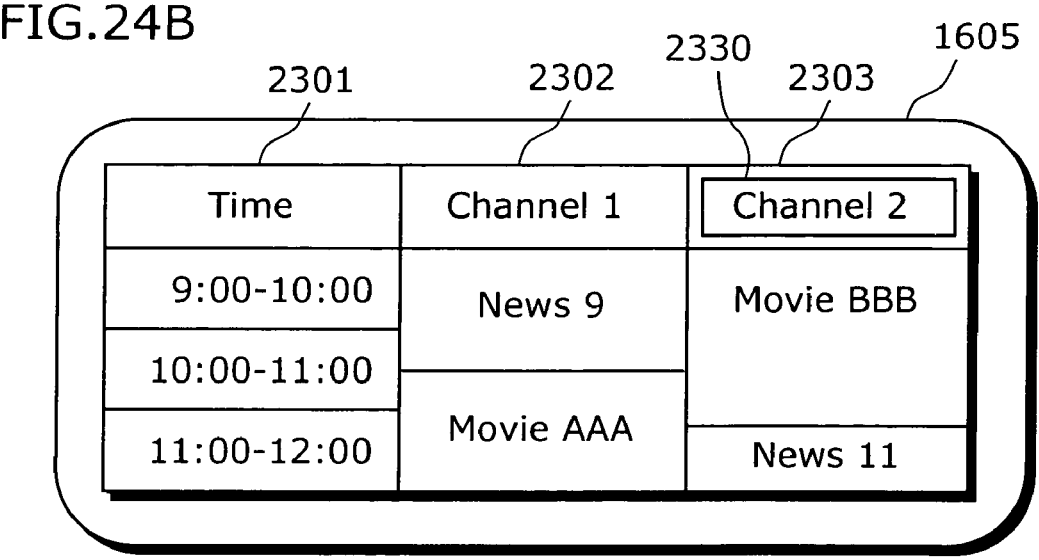

The EPG 2202 is configured of a TV show display unit 2202a, which displays a TV show list to a user and accepts input from the user, and a reproduction unit 2202b, which carries out channel selection. Here, EPG stands for Electric Program Guide. The EPG 2202 is started by the kernel 2201a when power to the terminal apparatus 1600 is turned on; inside the started EPG 2202, the TV show display unit 2202a awaits input from the user through the input unit 1610 of the terminal apparatus 1600. Here, in the case where the input unit 1610 is configured of the front panel shown in FIG. 18, when the user presses an EPG button 1707 of the input unit 1610, an identifier of the EPG button is notified to the CPU 1606. The TV show display unit 2202a of the EPG 2202, which is a sub-program operated by the CPU 1606, accepts this identifier, and displays TV show information in the display 1605. FIGS. 24A and 24B are examples of TV show charts displayed in the display 1605. Referring to FIG. 24A, the TV show information is displayed in a grid in the display 1605. Time information is displayed in column 2301. A channel name "channel 1" and a TV show shown during a time period corresponding to the time in column 2301 is displayed in column 2302. "Channel 1" shows that a TV show "News 9" is shown from 9:00 to 10:30, and "Movie AAA" is shown from 10:30 to 12:00. In the same manner as column 2302, "channel 2" and a TV show shown during a time period corresponding to the time in column 2301 is displayed in column 2303. A TV show "Movie BBB" is shown from 9:00 to 11:00, and "News 11" is shown from 11:00 to 12:00. 2330 is a cursor. The cursor 2330 moves when the left cursor 1703 and the right cursor 1704 on the front panel 1700 are pressed. In the state shown in FIG. 24A, the cursor 2330 moves to the right when the right cursor 1704 is pressed, and the diagram is as shown in FIG. 24B. In addition, in the state shown in FIG. 24B, the cursor 2330 moves to the left when the left cursor 1703 is pressed, and the diagram is as shown in FIG. 24A.

In the state shown in FIG. 24A, when the OK button 1705 of the front panel 1700 is pressed, the TV show display unit 2202a notifies the reproduction unit 2202b of a channel identifier for "channel 1." In the state shown in FIG. 24B, when the OK button 1705 of the front panel 1700 is pressed, the TV show display unit 2202a notifies the reproduction unit 2202b of a channel identifier for "channel 2." Here, the channel identifier is an identifier which uniquely identifies one channel, and generally shows one service. A relationship between the channel identifier and the service is mentioned later.

In addition, the TV show display unit 2202a periodically stores, from the broadcast station side system 101 to the primary memory unit 1608 or the secondary memory unit 1607, the TV show information to be displayed. Generally, it takes time to acquire the TV show information from the broadcast station side system. When the EPG button 1707 of the input unit 1610 is pressed, the TV show information pre-saved in the primary memory unit 1608 or the secondary memory unit 1607 is displayed, and therefore it is possible to display the TV show chart quickly.

Figure 25:
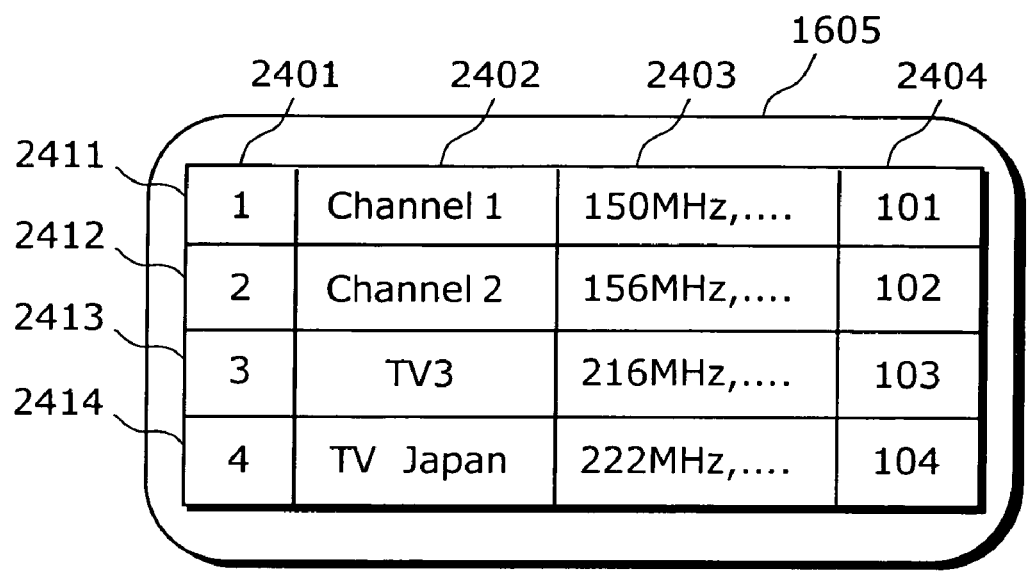
FIG. 25 is one example of information saved by a secondary memory unit 1607 according to the present invention.

The reproduction unit 2202b uses the accepted channel identifier and reproduces the channel. The relationship between the channel identifier and the channel is pre-stored in the secondary memory unit as channel information. FIG. 25 is one example of the channel information stored in the secondary memory unit 1607. The channel information is stored in tabular format. Column 2401 is the channel identifier. Column 2402 is the channel name. Column 2403 is tuning information. Here, the tuning information includes frequency, transmission rate, encoding rate, and so on, and is a value given to the tuner 1601. Column 2404 is a program number. Each of rows 2411 to 2414 is a group that includes the respective channel identifier, channel name, and tuning information. Row 2411 is a group that includes a channel identifier "1," a channel name "channel 1," a frequency of "150 MHz" as the tuning information, and a program number of "101." In order to carry out reproduction of the channel, the reproduction unit 2202b provides the accepted channel identifier as-is to a service manager.

Figure 26A:
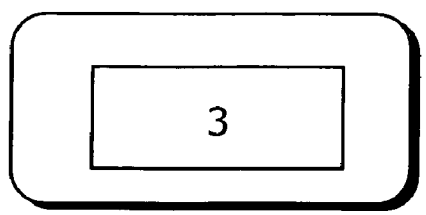
FIGS. 26A to 26C are an example of information saved by a primary memory unit 1608 according to the present invention.
Figure 26B:
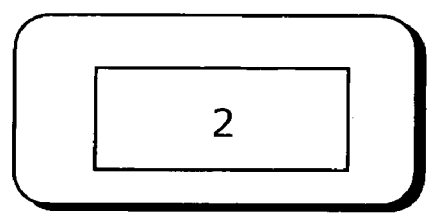
Figure 26C:
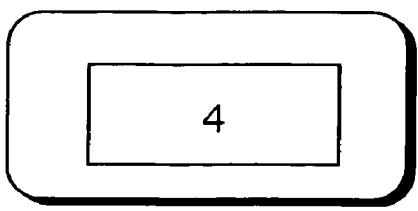

In addition, when the user presses the up cursor 1701 and the down cursor 1702 of the front panel 1700 during reproduction, the reproduction unit 2202b accepts, from the input unit 1610 and via the CPU 1606, a notification that the cursor was pressed, and changes the channel being reproduced. First, the reproduction unit 2202b stores the channel identifier of the channel currently being reproduced in the primary memory unit 1608. FIGS. 26A to 26C are examples of channel identifiers saved in the primary memory. In FIG. 26A, a channel identifier "3" is stored, and referring to FIG. 25, this indicates that the channel with a channel name of "TV 3" is being reproduced. In the state shown in FIG. 26A, the reproduction unit 2202b refers to the channel information in FIG. 24 when the user presses the up cursor 1701, and in order to switch to "channel 2," which is the channel previous to the currently-displayed channel, provides a channel identifier "2" for the channel named "channel 2" to the service manager. At the same time, the channel identifier stored in the primary memory unit 1608 is re-written as "2." FIG. 26B shows the state in which the channel identifier has been re-written. In addition, in the state shown in FIG. 26A, the reproduction unit 2202b refers to the channel information in FIG. 25 when the user presses the down cursor 1702, and in order to switch to "TV Japan," which is the channel after the currently-displayed channel, provides a channel identifier "4" for the channel named "TV Japan" to the service manager. At the same time, the channel identifier stored in the primary memory unit 1608 is re-written as "4." FIG. 25C shows the state in which the channel identifier has been re-written.

The Java VM 2203 is a Java Virtual Machine which sequentially analyzes and executes programs written in the Java™ language. Programs written in the Java language are compiled of intermediate code which does not depend on the hardware, called bytecode. The Java Virtual Machine is an interpreter which executes this bytecode. In addition, some Java Virtual Machines translate bytecode into an execution format understandable by the CPU 1606, pass the code to the CPU, and execute a program. The Java VM 2203 is identified as the Java program to execute by the kernel 2201a, and is started. In the present embodiment, the kernel 2201a prescribes a service manager 2204 as the Java program to execute. Details of the Java language are explained in many publications, such as "Java Language Specification" (ISBN 0-201-63451-1). Here, those details are omitted. In addition, detailed operations of the Java VM itself are explained in many publications, such as "Java Virtual Machine Specification" (ISBN 0-201-63451-X). Here, those details are omitted.

The service manager 2204 is a Java program written in the Java language, and is sequentially executed by the Java VM 1603. The service manager 2204 calls, or is able to call, other programs not written in the Java language through a Java Native Interface (JNI). JNI is described in many publications, such as "Java Native Interface." Here, those details are omitted.

The service manager 2204 accepts the channel identifier from the reproduction unit 2202b through the JNI.

The service manager 2204 supplies a tuner 2205c initially in a Java library 2205 with the channel identifier, and requests tuning. The tuner 2205c refers to the channel information stored in the secondary memory unit 1607 and obtains tuning information. At this time, when the service manager 2204 supplies the tuner 2205c with the channel identifier "1," the tuner 2205c refers to row 2412 of FIG. 25 and obtains the corresponding tuning information "150 MHz." The tuner 2205c supplies the tuning information to the tuner 1601 through the library 2201b of the OS 2201. The tuner 1601 demodulates the signal sent from the broadcast station side system in accordance with the supplied tuning information, and passes the signal to the TS decoder 1602.

Next, the service manager 2204 requests a CA library 2206 to perform cryptograph removal. The CA library 2206 provides information necessary for cryptograph removal to the descrambler 2004 inside the TS decoder 1602, through the library 2201b of the OS 2201.

Next, the service manager 2204 provides the channel identifier to a JMF 2205a inside the Java library 2205, and requests reproduction of the video/audio.

First, the JMF 2205a acquires, from the PAT and PMT, the PID for isolating the video and audio to be reproduced. As the JMF 2205a acquires the PAT, the JMF 2005a prescribes the PID "0" and the CPU 1606 to the TS decoder 1602, through the library 2201b of the OS 2201. The TS decoder 1602 carries out filtering with the PID "0" and the table_id "0," and by passing this to the CPU 1606 via the primary memory unit 1608, the JMF 2205a collects the PAT. Here, FIG. 13 is given as an example of the PAT. At this time, when the channel identifier provided to the JMF 2205a is "1," the JMF2205a refers to row 2412 of FIG. 25, acquires the corresponding program number "101," and then refers to row 1211 of the PAT in FIG. 13, and acquires the PID "501" which corresponds to the program number "101." As the JMF 2205a acquires the PMT, the JMF 2205a prescribes the PID and table_id "2" acquired from the PAT to the TS decoder 1602, through the library 2201b of the OS 2201. Here, the prescribed PID is "501." The TS decoder 1602 carries out filtering with the PID "501" and the table_id "2," and by passing this to the CPU 1606 through the primary memory unit 1608, the JMF 2205a collects the PMT. Here, FIG. 12 is given as an example of the PMT. The JMF 2205a acquires, from the PMT, the PID of the video and audio to be reproduced. Referring to FIG. 12, the JMF 2205a acquires a audio PID "5011" from row 1111 and a video PID "5012" from row 1112.

Next, the JMF 2205a supplies the TS decoder 1602 with the PID of the acquired video/audio and the AV decoder 1603 as an output destination, through the library 2201b of the OS 2201. The TS decoder 1602 carries out filtering based on the provided PID. Here, TS packets with a PID of "5011" and "5012" are passed to the AV decoder 1603. The AV decoder 1603 carries out decoding of the provided PES packet and reproduces video/audio through the display 1605 and the speaker 1604.

Finally, the service manager 2204 provides a channel identifier to an AM 2205b in the Java library 2205, an requests data broadcast reproduction. Here, data broadcast reproduction refers to extracting a Java program included in the MPEG-2 transport stream and causing the Java VM 2203 to execute the program. A format called DSMCC, which is noted in the MPEG specifications ISO/IEC 13818-6, is used as the method to embed the Java program in the MPEG-2 transport stream. Here, detailed descriptions of DSMCC are omitted. The DSMCC format conforms to a method in which a file system configured of files and directories used by a computer uses an MPEG-2 section to encode, in the TS packet of the MPEG-2 transport stream. In addition, information of the Java program executed is in a format called AIT, is embedded within the TS packet of the MPEG-2 transport stream, and is sent as an MPEG-2 section with a table_id of "0x74." AIT is defined in chapter 10 of the DVB-MHP specifications (officially, ETSITS 101812 DVB-MHP specifications V1.0.2), and is short for Application Information Table.

First, as the AM 2205b acquires the AIT, the AM 2205b acquires the PAT and PMT identical to the JMF 2205a, and acquires the PID of the TS packet in which the AIT is stored. At this time, the provided channel identifier is "1," and when the PAT of FIG. 13 and the PMT of FIG. 12 are sent, the PMT of FIG. 12 is acquired with the same procedure as the JMF 2205a. The AM 2205b extracts a PID from the elementary stream which has "AIT" as supplementary information and "data" as a stream type from the PMT. Referring to FIG. 12, the elementary stream of row 1113 is applicable, and the PID "5013" is acquired.

Figures 27, 28:
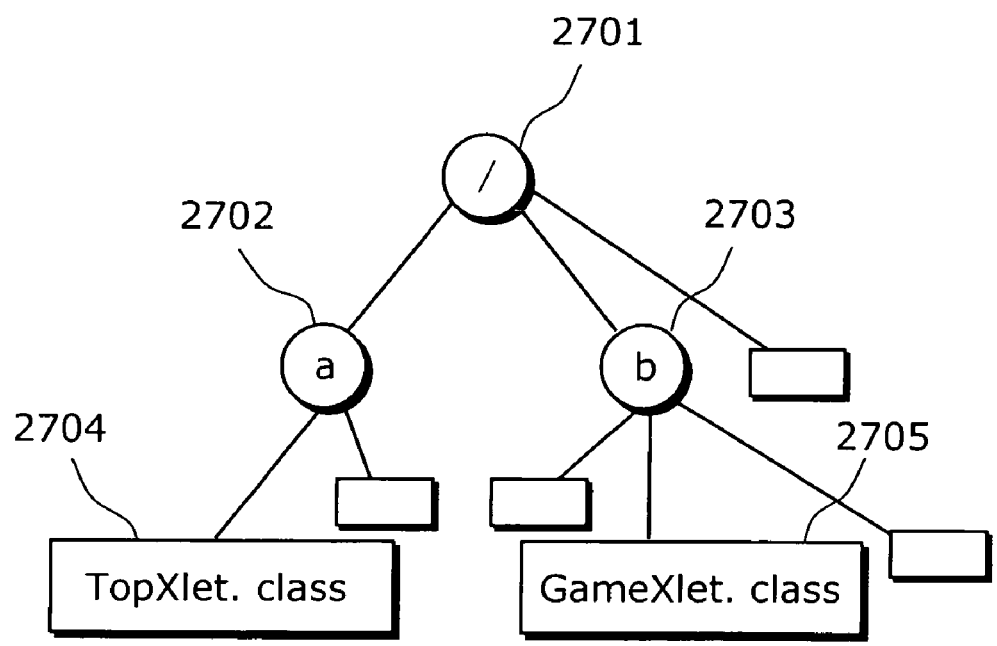
FIG. 27 is a schematic diagram showing a content of AIT prescribed by the DVB-MHP standard according to the present invention.
FIG. 28 is a schematic diagram showing a file system sent in DSMCC format according to the present invention.

The AM 2205b supplies the TS decoder 1602 with the PID of the AIT and the table_id "0x74," through the library 2201b of the OS 2201. The TS decoder 1602 carries out filtering with the supplied PID and table_id, and passes this to the CPU 1606 through the primary memory unit 1608. As a result, the AM 2205b can collect the AIT. FIG. 27 is a chart which schematically shows an example of information of the collected AIT. Column 2601 is a Java program identifier. Column 2602 is control information for the Java program. In the control information, there is "autostart," "present," and "kill"; "autostart" means that the terminal apparatus executes the Java program automatically in an instant, "present" means not performing automatic execution, and "kill" means stopping the Java program. Column 2603 is a DSMCC identifier for extracting the PID included in the Java program in the DSMCC format. Column 2604 is the program name of the Java program. Row 2611 and 2612 are groups of the Java program information. The Java program defined in row 2611 is a group including a Java program identifier "301," control information "autostart," a DSMCC identifier "1," and a program name "a/TopXlet." The Java program defined in row 2612 is a group including a Java program identifier "302," control information "present," a DSMCC identifier "1," and a program name "a/GameXlet." Here, the two Java programs have the same DSMCC identifier. This indicates that two Java programs are included in one file system encoded in the DSMCC format. Here, only four types of information are specified for the Java program, but in actuality, more information is defined. Details can be found in the DVB-MHP specifications.

The AM 2205b finds the Java program with "autostart" from the AIT, and extracts the corresponding DSMCC identifier and Java program name. Referring to FIG. 27, the AM 2205b extracts the Java program in row 2611, and acquires the DSMCC identifier "1" and the Java program name "a/TopXlet."

Next, the AM 2205b uses the DSMCC identifier acquired from the AIT, and acquires, from the PMT, the PID of the TS packet the Java program stored in DSMCC format. Specifically, the stream type inside the PMT is "data," and the PID of the elementary stream which conforms to the DSMCC identifier of the supplemental information is acquired.

At this time, the DSMCC identifier is "1," and when the PMT is as in FIG. 12, the elementary stream in row 1114 is in conformation, and the PID "5014" is retrieved.

The AM 2205b prescribes the section filter conditions, and the PID of the TS packet which sends the MPEG-2 section embedded with data in the DSMCC format to the TS decoder 1602, through the library 2201b of the OS2201. Here, the PID "5014" is supplied. The TS decoder 1602 uses the supplied PID and carries out filtering on the DSMCC MPEG-2 section, and passes the section to the CPU 1606 through the primary memory unit 1608. As a result, the AM 2205b can collect the necessary DSMCC MPEG-2 section. The AM 2205b reconstitutes the file system from the collected MPEG-2 section in accordance with the DSMCC format, and saves the file system in the primary memory unit. Taking data such as the file system from the TS packet within the MPEG-2 transport stream and saving the data in a memory unit such as the primary memory unit 1608 and the secondary memory unit 1607 is hereafter called downloading.

FIG. 28 is one example of a downloaded file system. In the diagram, a circle represents a directory and a square represents a file. 2701 is a root directory, 2702 is directory "a," 2703 is directory "b," 2704 is a file "TopXlet.class," and 2705 is a file "GameXlet.class."

Next, from among the downloaded file systems in the primary memory unit 1608, the AM 2205b passes the Java program to be executed to the Java VM 2203. At this time, when the Java program to be executed is named "a/TopXlet," the file which should be executed is the file "a/TopXlet.class" which has ".class" added to the end of the Java program name. "/" is a directory and file name division, and referring to FIG. 28, the file 2704 is the Java program which should be executed. Next, the AM 2205b passes the file 2704 to the Java VM 2203.

Note that the means for referring the Java program that should be executed by the AM 2205b is not only one which depends on the AIT. In OCAP, which is assumed to be used by the United States cable system, an XAIT, which has registered reference information of an application in the OOB denoted in FIG. 4, is used. In addition, methods such as starting a program pre-recorded in the ROM 1609, starting a program downloaded and recorded in the secondary memory unit 1607, and so on can be considered.

Note that the Java program does not only download a thing sent by the MPEG-2 transport stream in the DSMCC format. Methods such as downloading from a server connected to the terminal apparatus by a network, downloading from portable media such as a DVD, BD, DS card, and so on can be considered, and the present invention is applicable in such cases as well.

The Java VM 2203 executes the supplied Java program.

With a process such as that described above, the service manager 2204 accepts the channel identifier and executes tuning, cryptograph removal, video/audio reproduction, and Java program startup. This succession of processes is collectively called "service selection." It can be said that the video/audio reproduced through the service selection belongs to that service. In a like manner, it can be said that the Java program started through the service selection belongs to that service.

Upon accepting a different channel identifier, the service manager 2204 stops, through each library contained in the Java™ library 2205, the video/audio being reproduced through the same respective libraries included in the Java library 2205, and stops the executed Java program; then, based on the newly-accepted channel identifier, carries out video/audio reproduction and Java™ program execution.

In general terms, the channel identifier represents one service. In the present embodiment, the channel information, such as is shown in FIG. 25, is used when requesting the program number from the channel identifier. A method which uses Service Information (SI) is representative of a solution method of the program number from a channel identifier. The SI is TV show composition information used by the EPG and so on; the SI is specified depending on each broadcast environment, and transmitted. A representative example is the use of DVB-SI as specified by EN400-368 in the European broadcast environment. In addition, SI specified by ANSI/SCTE65 is used in the United States cable broadcast environment. In these SIs, some kind of identifier for isolating a service is already specified, and a mechanism for solving the program number from that identifier is already considered. The channel identifier uses the identifier specified by these SI. In that case, the broadcast receiving apparatus uses the SI, and carries out solving the program number used in acquiring the PMT form the channel identifier. In that case, as the present invention does not depend on the state of the SI, the present invention is applicable regardless of what kind of SI is used. The channel information in FIG. 25 is also acquired using the SI.

The Java library 2205 is a collection of a plurality of Java libraries stored in the ROM 1609. In the present embodiment, the Java library 2205 includes the JMF 2205a, the AM 2205b, the tuner 2205c, a DSM-CC2205d, a Section Filter (SF) 2205e, and a service manager administration library 2205f. The Java program implements the function of the Java program while using these libraries.

In addition, it is possible for the Java program to carry out service selection through the service manager by using the service manager administration library 2205f. Specifically, when the Java program passes the channel identifier to the service manager administration library 2205f, the service administration library passes the accepted channel identifier to the service manager 2204. After that, in the same manner as during channel selection using the EPG 2202, service selection is carried out by the service manager 2204, and based on the information denoted in the PMT identified by the program number corresponding to the channel identifier, the video/audio belonging to that service is reproduced, and the Java program belonging to that service is started.

In this manner, the Java program can carry out service selection by using the service manager administration library 2205 contained in the Java library.

Thus far, service selection by the service manager 2204; in other words, the operation of carrying out tuning, cryptograph removal, video/audio reproduction, and Java program startup, in accordance with the accepted channel identifier, has been described.

Next, a Record/Playback function of the service, which is the main function of the present invention, is described.

Here, the Record of the service refers to storing the video/audio included in the service and the Java program included in the service in a recording area of an HDD, BD, DVD, or a semiconductor memory such as an SD. The Playback of the service refers to reproducing the video/audio, and starting the Java program included in a service that is already stored in the recording area.

Note that here, the recording area may be a separate terminal connected through some kind of method, such as a TCP/IP connection, a USB connection, an IEEE1394 connection, an infrared connection, and so on.

Figure 37:
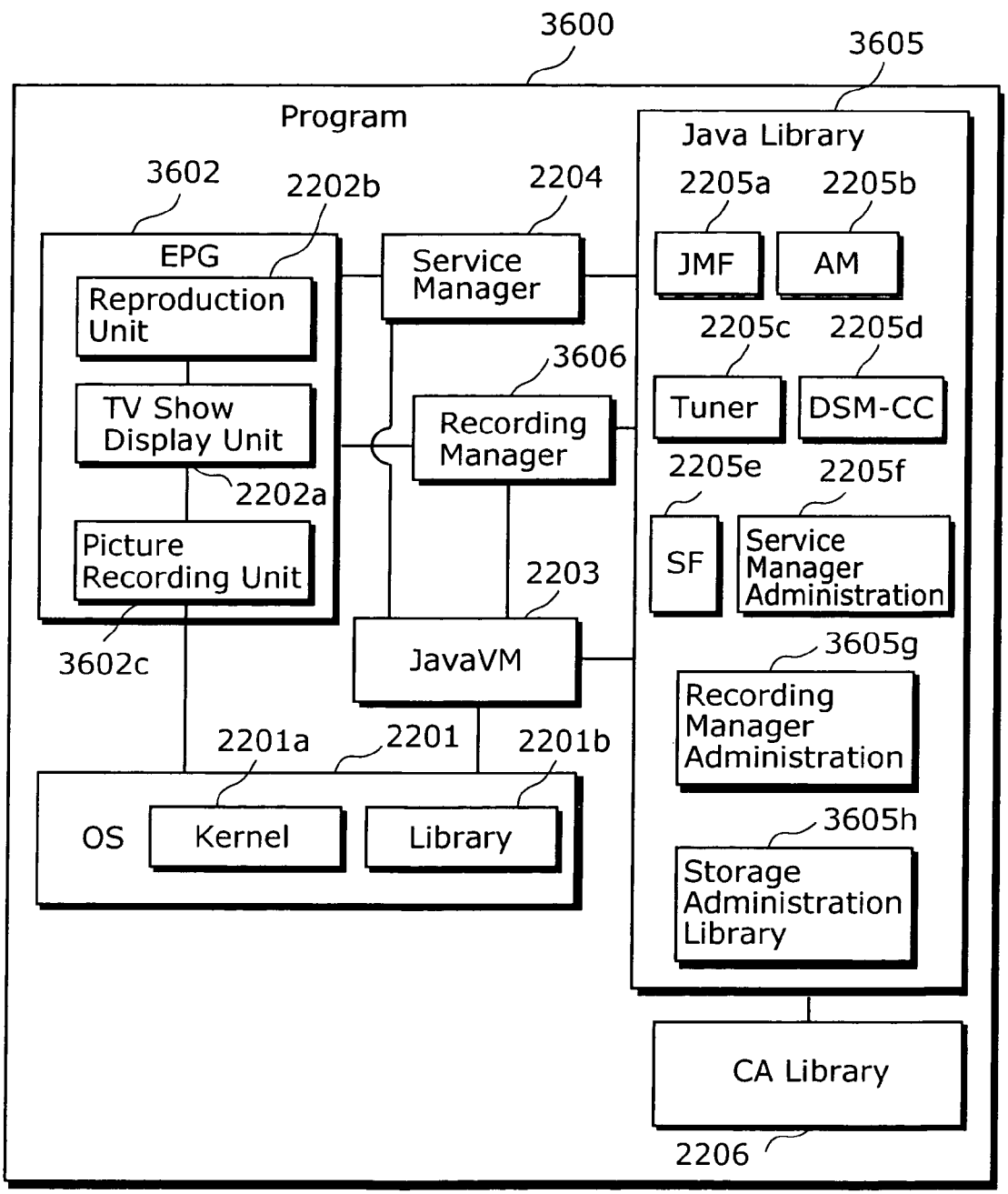
FIG. 37 is a diagram indicating one example of a configuration diagram of a program stored in a ROM and executed by a computer.

Hereafter, as indicated in FIG. 37, a recording manager 3606, which has a function for recording a service, is introduced. Also, the service manager 2204 is further given a function to playback the service.

Figure 29:
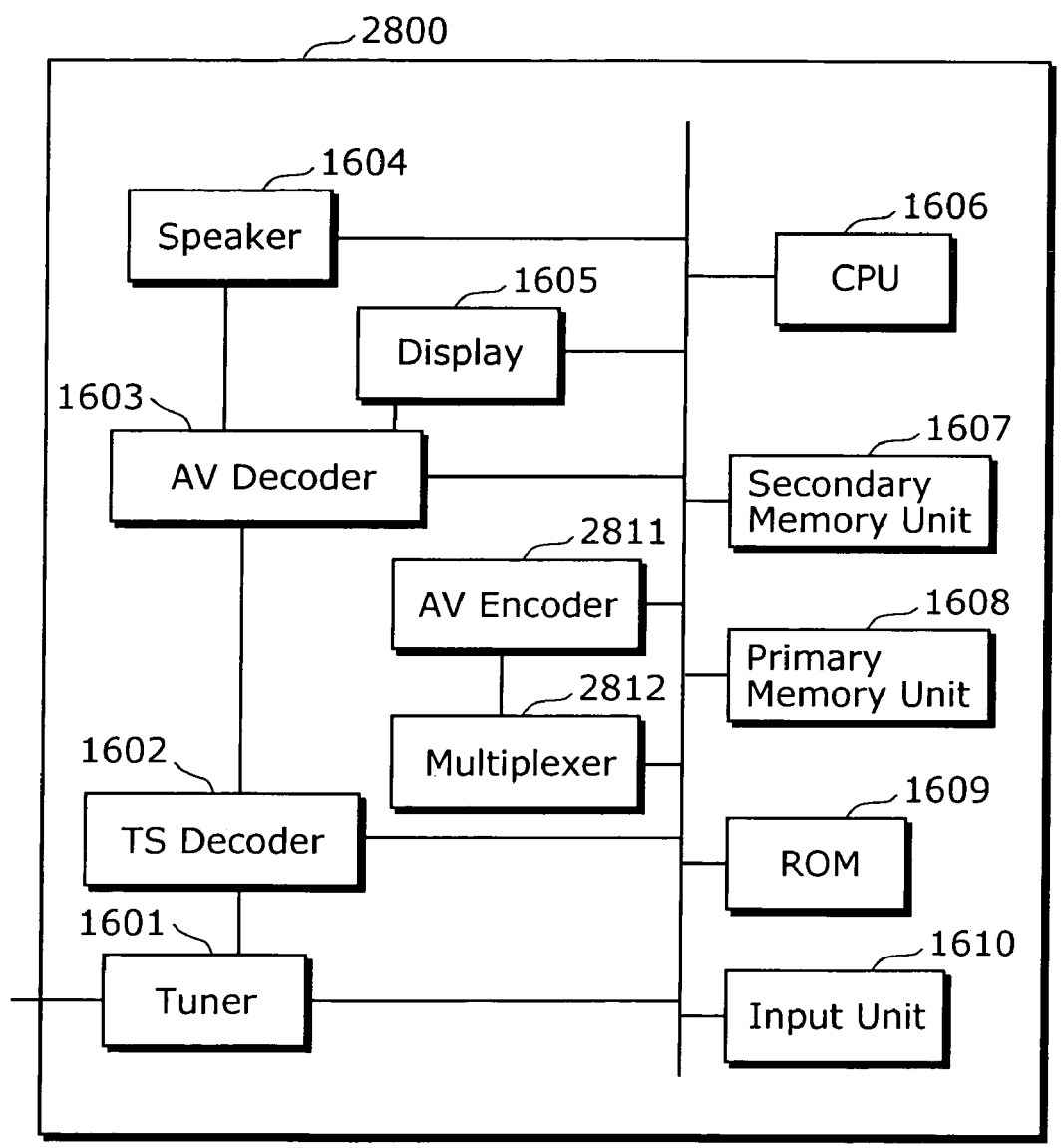
FIG. 29 is a block diagram showing a general hardware configuration of a digital broadcast receiving device which has service record/playback functions.

FIG. 29 is a block diagram showing a general hardware configuration of a digital broadcast receiving device that has a record/playback function of the service. In FIG. 29, the devices in a terminal apparatus 2800 that are identified with the same numbers as in FIG. 17 have the same function as in FIG. 17, and therefore descriptions are omitted. The terminal apparatus 2800 includes an AV encoder 2811 and a multiplexer (such as a TS multiplexer) 2812.

The AV decoder 1603 is a device with a function to decode encoded video and audio. The audio signal and video signal obtained through decoding carried out by the AV decoder 1603 is sent to the speaker 1604 and the display 1605 during service selection and service playback, but is sent to the AV encoder 2811 during service record.

The AV encoder 2811 is a device with a function to encode the audio signal and video signal decoded by the AV decoder 1603 during service record. The AV encoder 2811 sends the video and audio obtained after encoding to the multiplexer 2812. Here, a format for the audio signal and video signal encoded by the AV encoder is generally in the case of the audio signal, MPEG-2 audio format by an MPEG-2 audio encoder, and, in the case of the video signal, MPEG-2 video format by an MPEG-2 video encoder, but different formats are also acceptable.

The multiplexer 2812 is a device with a function to multiplex video and audio, sent from the AV encoder during the service record, into the MPEG-2 transport stream. Note that the format of the stream multiplexed by the multiplexer 2812 is not limited to the MPEG-2 transport stream, and may be a different format.

The CPU 1606 included in the terminal apparatus 2800 further controls the AV encoder 1811 and the multiplexer 1812 in accordance with an instruction of the executed program.

Note that the present invention is applicable even if the CPU 1606 itself included in the terminal apparatus 2800 is a system which carries out all the processes of TS decoding, AV decoding, AV encoding, and multiplexing; or, even if the CPU 1606 itself included in the terminal apparatus 2800 is a system which carries out a combination of those processes.

Figure 30:
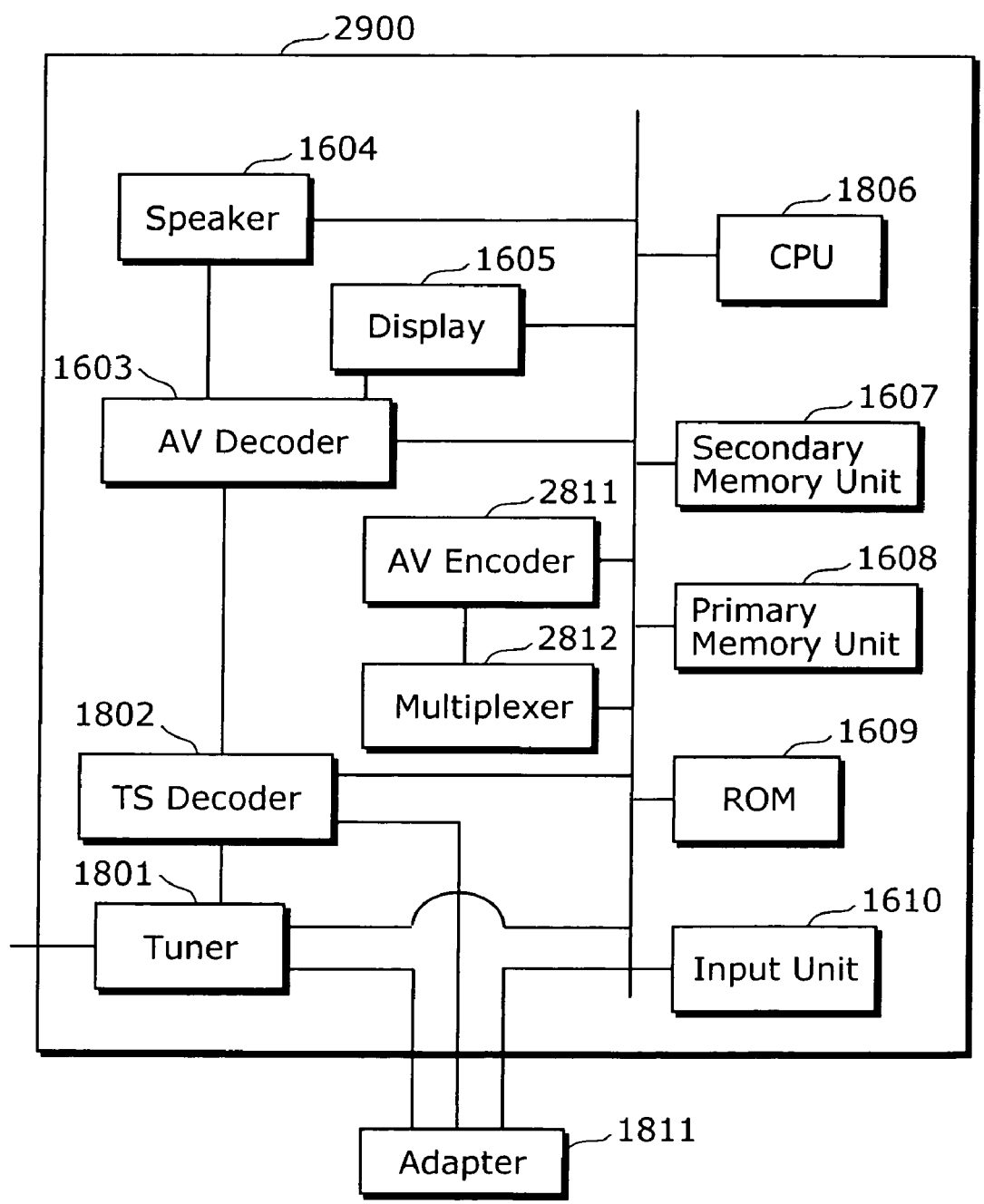
FIG. 30 is a diagram indicating a hardware configuration in which an adapter is physically connected.
Figure 31:
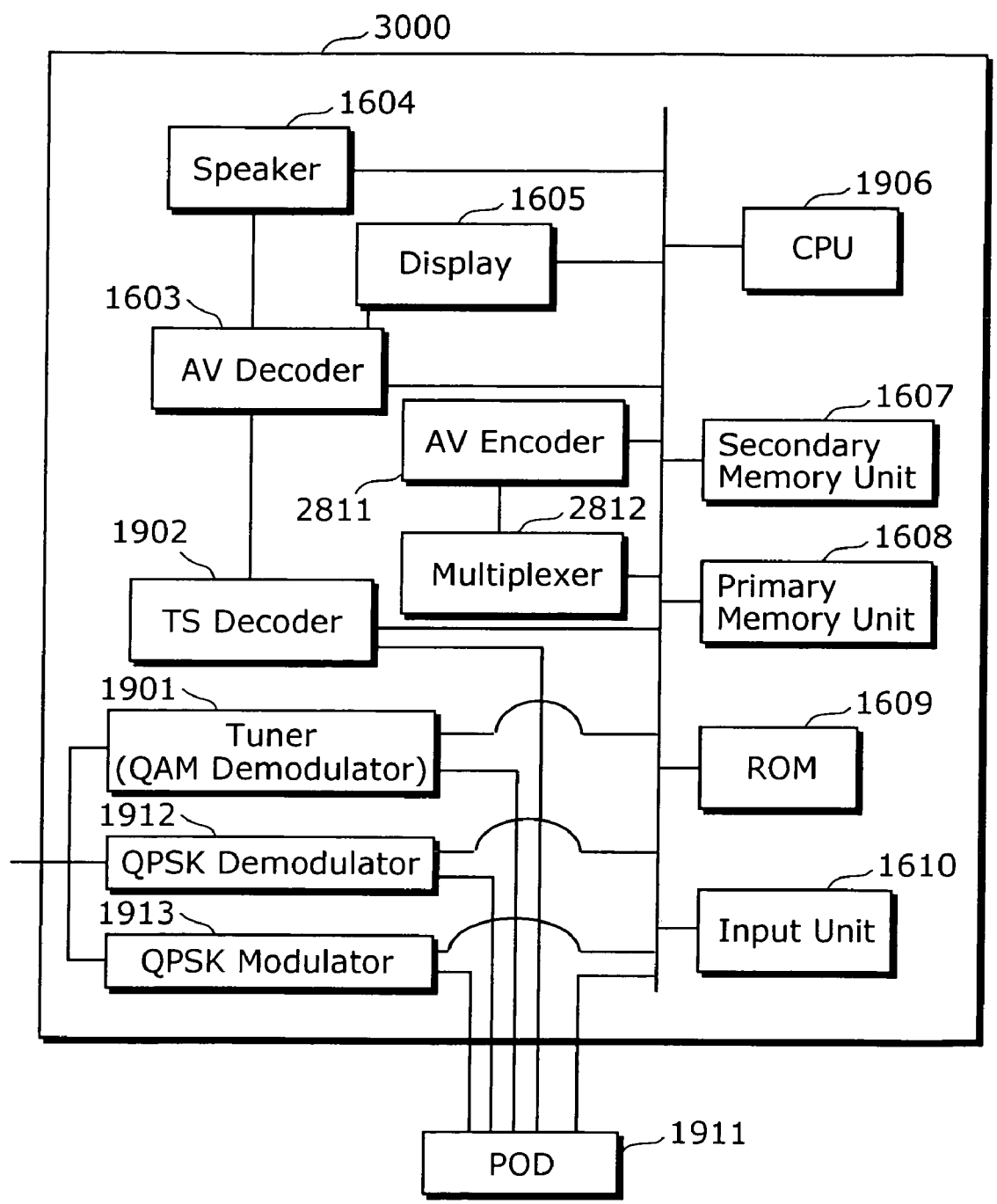
FIG. 31 is a diagram indicating a hardware configuration in which a POD is physically connected.

Note that in the hardware configuration shown in FIG. 29, each device is contained inside the terminal apparatus at the time of shipping as a default. However, as shown in FIG. 30 and FIG. 31, which are similar to FIG. 19 and FIG. 20, it is acceptable to further add an adapter which includes the device one wishes to add to the terminal apparatus, in order to add a device not included in the terminal apparatus and to improve the function of devices included in the terminal apparatus. In FIG. 30 and FIG. 31, devices identified with the same numbers as is FIG. 29, FIG. 19, and FIG. 20 have the same functions as in FIG. 29, FIG. 19, and FIG. 20, and therefore descriptions are omitted.

Using each device that appears in FIG. 29, FIG. 30, and FIG. 31, the broadcast receiving implements a function to output video/audio transmitted in a broadcast signal to a screen, a function to extract data such as the TV show constitution information included in the broadcast signal and present it to the user, and furthermore, implements a function to extract and store in a recording area the video/audio transmitted in the broadcast signal and each type of data in the broadcast signal, a function to output the video/audio and each type of data stored in the recording area to the screen, and so on.

Next, recording processing of the service by a recording manager 3606 in a digital broadcast receiving device that includes the record/playback function for the service, as shown in FIG. 29, is described.

Figure 32:
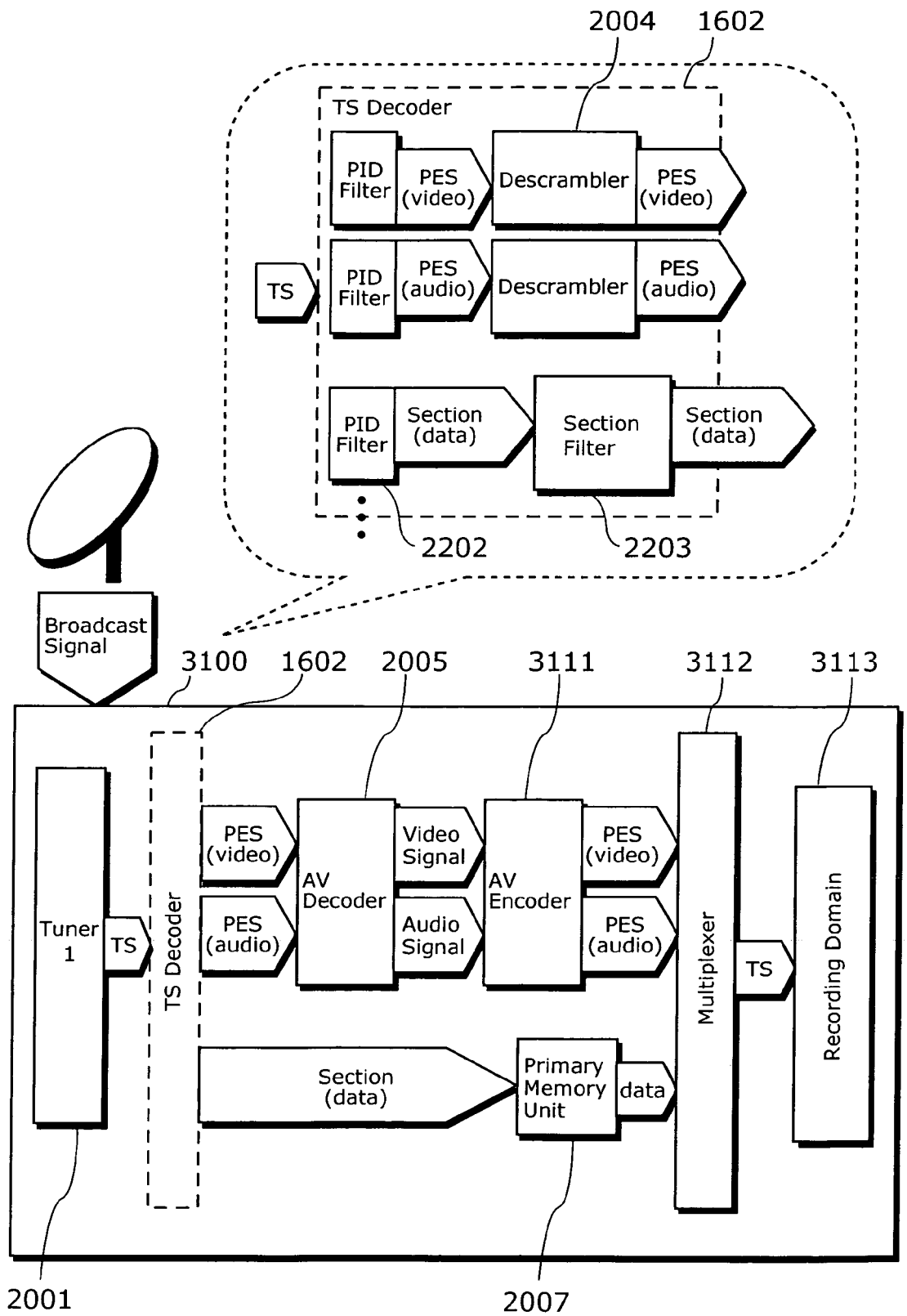
FIG. 32 shows a conceptual rendering which represents the physical connection sequence, processing content, and input/output data format of each device during service record.
Figure 33:
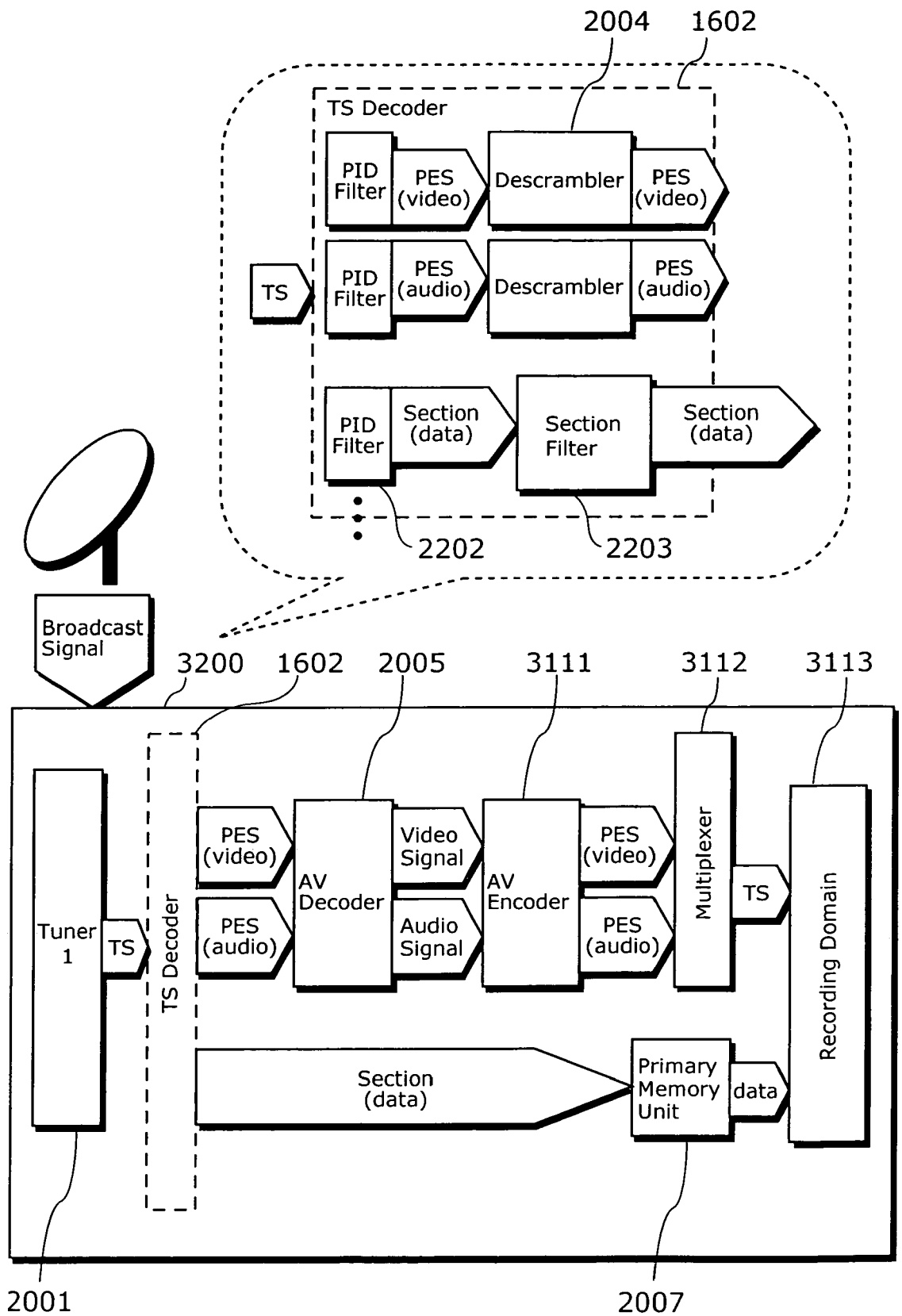
FIG. 33 shows a different conceptual rendering which represents the physical connection sequence, processing content, and input/output data format of each device during service record.

FIG. 32 and FIG. 33 indicate conceptual diagrams that represent a physical connection order and a data format of processing content and input/output occurring during service record. In FIG. 32 and FIG. 33, devices identified by the same numbers as in FIG. 21 have the same functions as in FIG. 21, and therefore descriptions are omitted.

In FIG. 32, a terminal apparatus 3100 has an AV encoder 3111, a multiplexer 3111, and a recording area 3113.

The AV encoder 3111 corresponds to the AV encoder 2811, and inputs an audio signal and a video signal, and outputs a PES packet of the video/audio.

The multiplexer 3111 corresponds to the multiplexer 2812, and inputs the PES packet of the video/audio and section data, and outputs a record MPEG-2 transport stream.

The recording area 3113 corresponds to all or part of the secondary memory area 1607, and inputs and stores the record MPEG-2 transport stream.

In FIG. 33, the terminal apparatus 3100 has the AV encoder 3111, the multiplexer 3111, and the recording area 3113.

The AV encoder 3111 corresponds to the AV encoder 2811, and inputs an audio signal and a video signal, and outputs a PES packet of the video/audio.

The multiplexer 3111 corresponds to the multiplexer 2812, and inputs the PES packet of the video/audio and section data, and outputs a record MPEG-2 transport stream.

The recording area 3113 corresponds to all or part of the secondary memory area 1607, and inputs and stores the record MPEG-2 transport stream.

Figure 35:
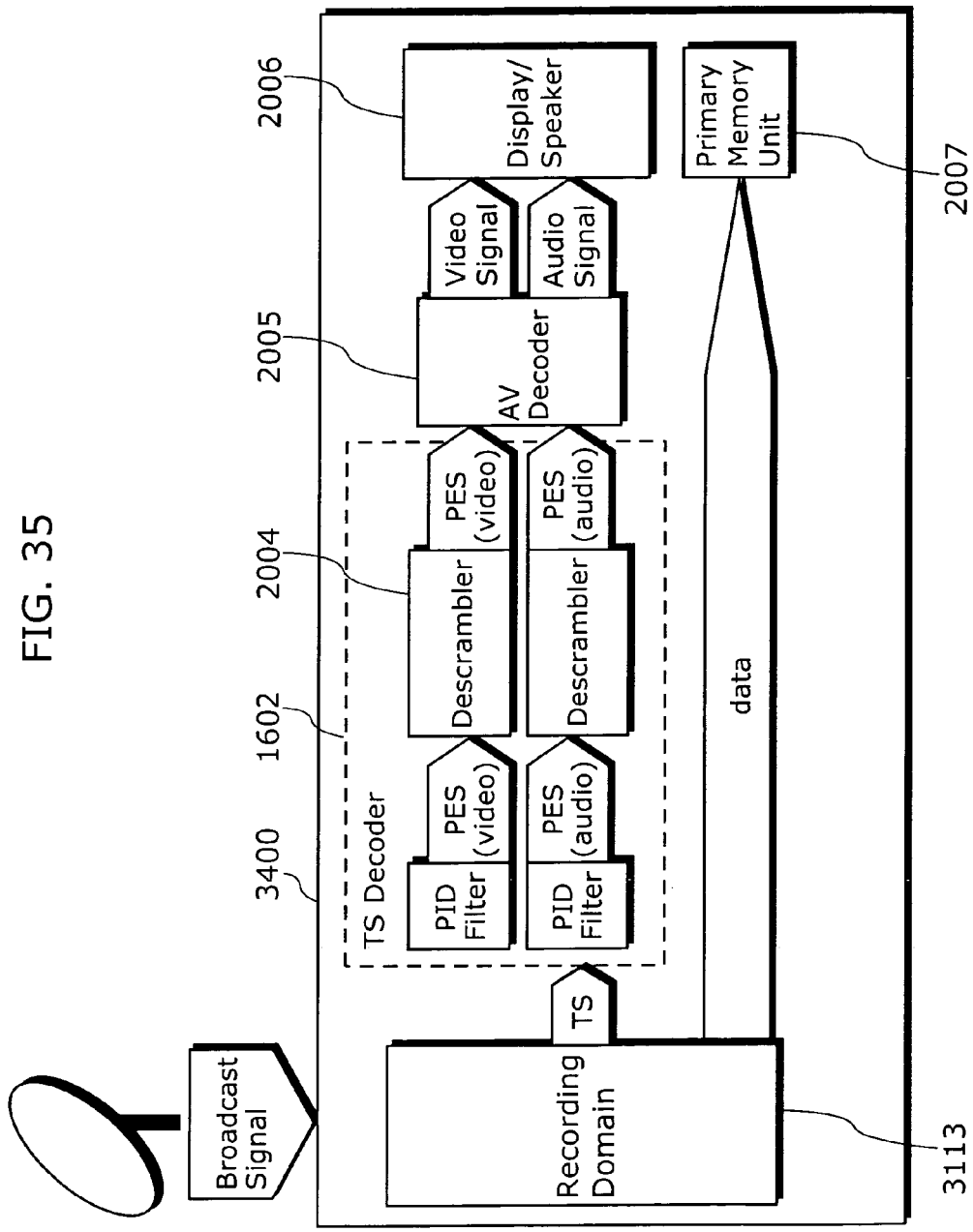
FIG. 35 shows a different conceptual rendering which represents the physical connection sequence, processing content, and input/output data format of each device during service playback.
Figure 36:
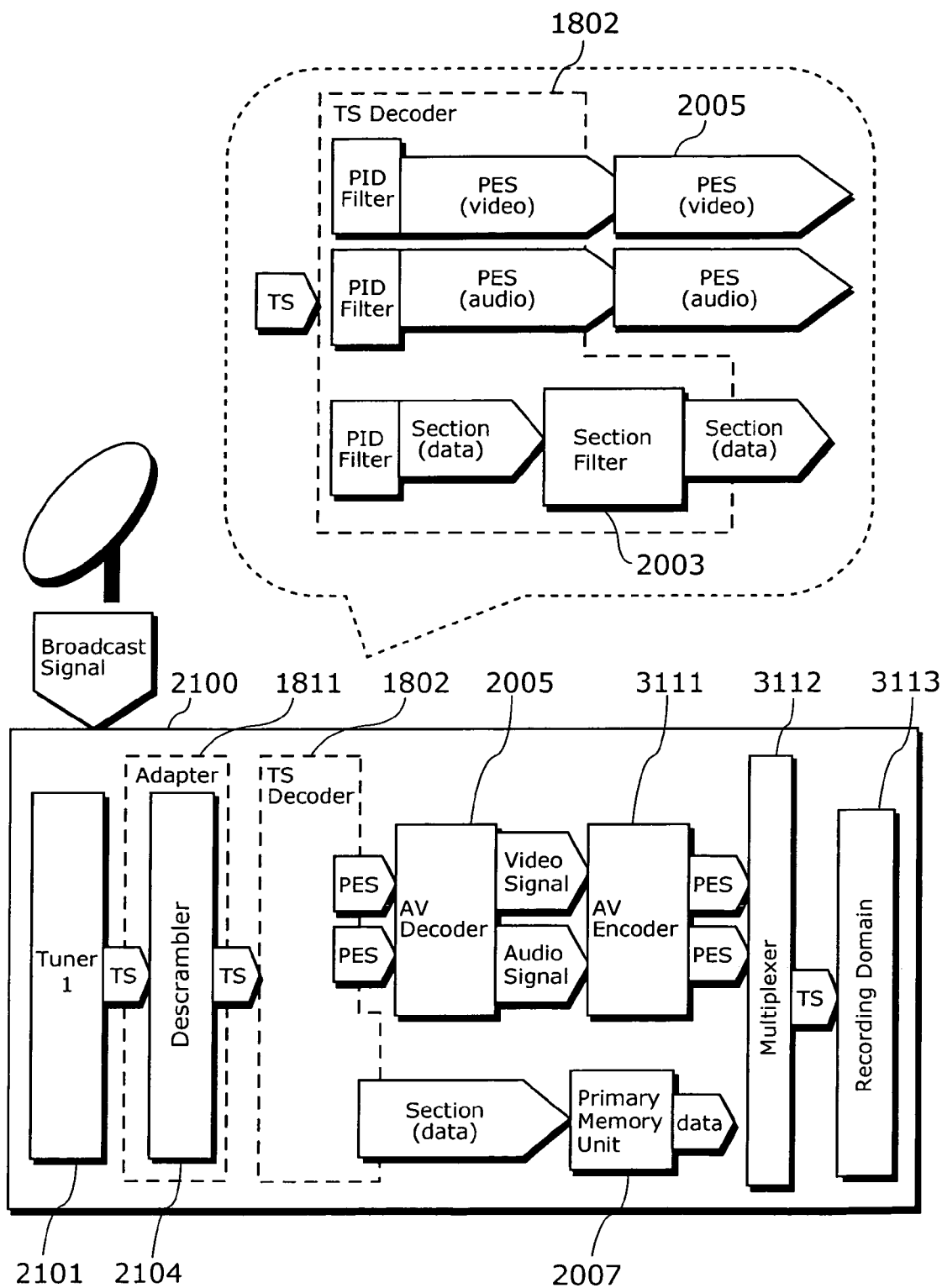
FIG. 36 is a conceptual diagram corresponding to a hardware configuration in which an adapter is physically connected, as shown in FIG. 30.

Next, a conceptual rendering that corresponds to the hardware configuration in which an adapter is physically connected, as shown in FIG. 30, is indicated in FIG. 35. In FIG. 36, devices identified by the same numbers as in FIG. 22 and FIG. 30 have the same functions as in FIG. 22 and FIG. 30, and therefore descriptions are omitted.

Here, descriptions of a program operation process in the terminal apparatus 3100 occurring during service record, as indicated in FIG. 32, are omitted. In the terminal apparatus indicated in FIG. 32, during service record, section data such as video/audio included in the service, a Java program included in the service, and so on, are all stored in the recording area 1331 as a record MPEG-2 transport stream outputted by the multiplexer.

Figure 38A:
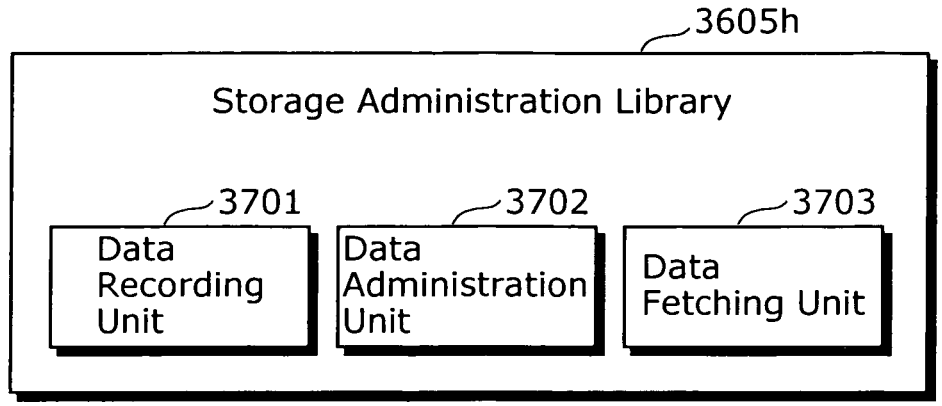
FIG. 38A is a configuration diagram of a storage management library.

Next, a program operation process in the terminal apparatus 3200 occurring during service record, as indicated in FIG. 33, is described. FIG. 37 is one example of a configuration diagram of a program stored in the ROM 1609 and executed by the CPU 1606. In FIG. 37, configuration elements identified by the same numbers as in FIG. 23 have the same function as in FIG. 23, and therefore descriptions are omitted. A program 3600 includes an EPG 3602, a Java library 3605, and a recording manager 3606. The EPG 3602 includes a picture recording unit 3602c, and the Java library 3605 includes a recording manager administration library 3605g and a storage administration library 3605h. Furthermore, the storage administration library 3605h includes a data recording unit 3701, a data administration unit 3702, and a data fetching unit 3703, as shown in FIG. 38A.

The data recording unit 3701 of the storage administration library 3605h has a function of adding necessary information, such as a timestamp, to data such as video/audio and a file system acquired from the transport stream, and storing the prescribed data in the recording area 3113.

The data administration unit 3702 of the storage administration library 3605h manages a storage place and necessary data per-data stored in the recording area 3113.

The data fetching unit 3703 of the storage administration library 3605h has a function of fetching data stored in the recording area 3113 in accordance with an instruction from the DSMCC identifier and so on.

Figure 38B:
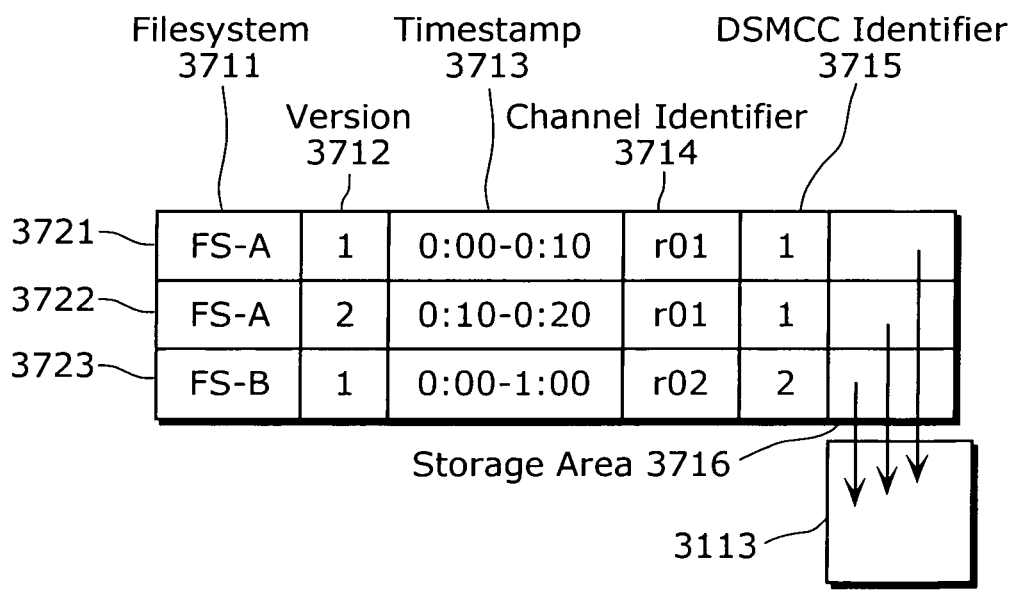
FIGS. 38B and 38C are diagrams indicating examples of a storage place and necessary data per stored data managed by a data management unit of a storage management library.
Figure 38C:
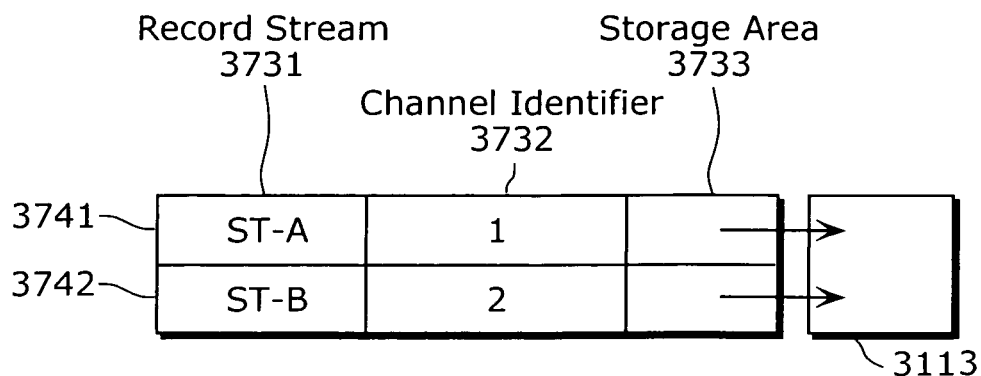

FIGS. 38B and 38C are examples of the storage place and necessary data, per data stored and managed by the data administration unit 3702 of the storage administration library 3605h. FIG. 38B is an example of the storage place and necessary data of a file system stored and managed by the data administration unit 3702 of the storage administration library 3605h, in the case where the storage administration library records, manages, and fetches the file system. In FIG. 38B, rows 3721 to 3723 indicate each version of each file system stored in the recording area 3113. Column 3711 is a name of the file system stored in the recording area 3113; column 3712 is the version of the file system; column 3713 is a timestamp per version of the file system; column 3714 is the channel identifier related to the file system; column 3715 is the DSMCC identifier of the file system; and column 3716 is the storage place in the recording area 3113 per version of the file system. FIG. 38C is one example of a storage place and necessary data of a record stream stored and managed by the data administration unit 3702 of the storage administration library 3605h, in the case where the record stream generated when the storage administration library multiplexes video/audio is recorded, managed, and fetched. In FIG. 38C, rows 3741 to 3742 indicate each record stream stored in the recording area 3113. Column 3731 is a name of the record stream stored in the recording area 3113; column 3732 is the channel identifier related to the record stream; and column 3733 is the storage place of the record stream in the recording area 3113.

Details of a recording method, management method, acquisition method, and necessary data such as a timestamp for each data by the storage administration library 3605h is described later.

Figure 39:
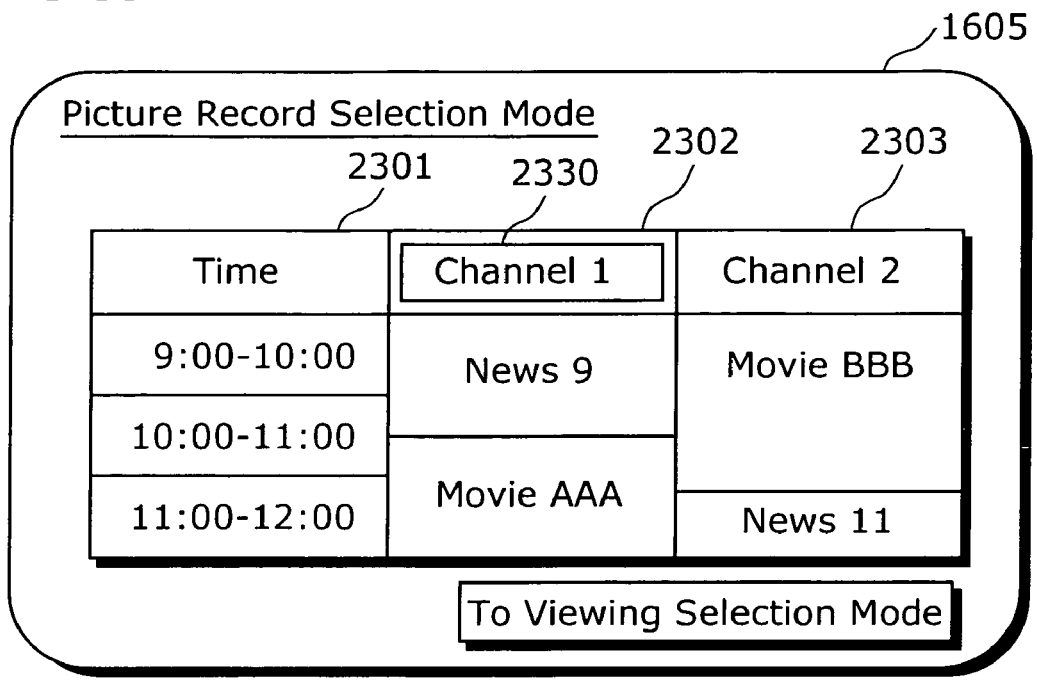
FIG. 39 is a diagram indicating one example of a TV show chart displayed in a display by a program display unit of an EPG.
Figure 40:
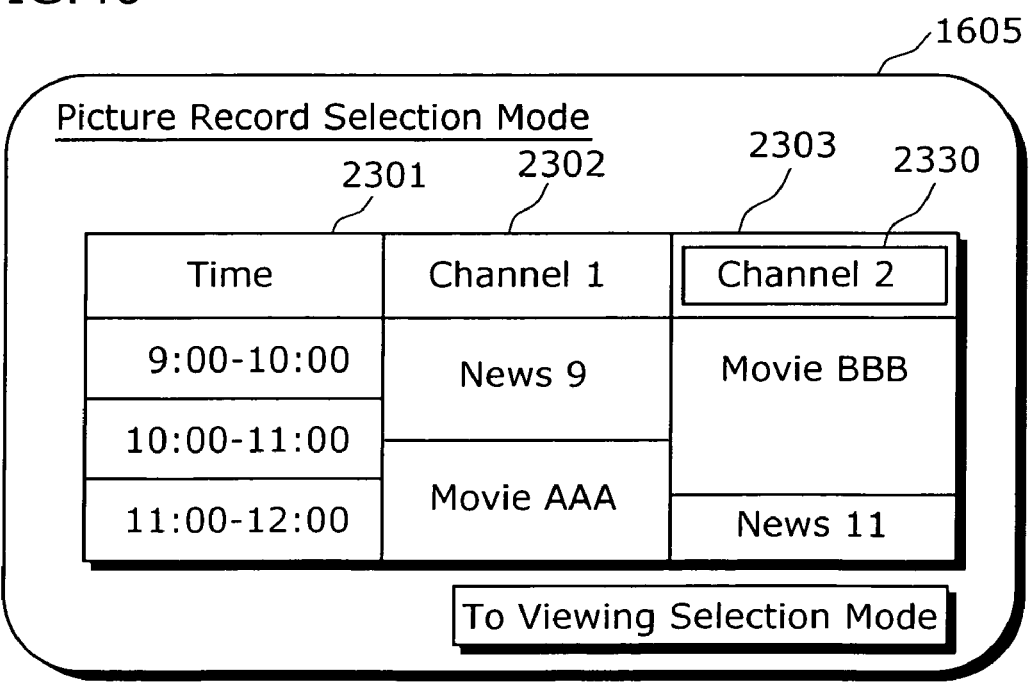
FIG. 40 is a diagram indicating one example of a TV show chart displayed in a display by a program display unit of an EPG.

An EPG 3602 adds to the configuration of the EPG 2202 a picture recording unit 3602c which executes picture recording (service record) of a prescribed channel in accordance with an input from the user that is accepted by the TV show display unit. FIG. 39 and FIG. 40 are examples of a TV show chart displayed in the display 1605 by the TV show display unit 2202a of the EPG 3602, which is a sub-program operated by the CPU 1606, when the user presses the EPG button 1707 of the input unit 1610. Because the EPG 3602 has a channel selection function and a channel picture recording function, the TV show display unit 2202*a* provides, for example, a picture recording selection mode and a viewing selection mode, and FIG. 39 and FIG. 40 are screens presenting the picture recording mode. In FIG. 39 and FIG. 40, the configurations with the same numbers as in FIGS. 24A and 24B have the same functions as in FIGS. 24A and 24B, and therefore descriptions are omitted.

In the state shown in FIG. 39, when the OK button 1705 of the front panel 1700 is pressed, the TV show display unit 2202*a* notifies the picture recording unit 3602*c* of the "channel 1" channel identifier. In the state shown in FIG. 40, when the OK button 1705 of the front panel 1700 is pressed, the TV show display unit 2202*a* notifies the picture recording unit 3602*c* of the "channel 2" channel identifier. Here, in the digital broadcast receiving device that has the service record/playback function, the channel identifier is an identifier that uniquely isolates 1 service from the services sent from the broadcast station and the services stored in the recording area 3113.

The picture recording unit 3602*c* uses the accepted channel identifier to picture-record the channel. The relationship between the channel identifier and the channel is as previously described with reference to FIG. 25. The picture recording unit 3602*c* passes the accepted channel identifier as-is to the recording manager 3606 in order to carry out picture recording on the channel.

The Java VM 2203 prescribes the recording manager 3606 as the Java program to be executed during service record (picture recording of the channel).

The recording manager 3606 is a Java program written in the Java language, and is sequentially executed by the Java VM 1603. The recording manager 3606 can call, or be called by, another sub-program that is not written in the Java language, through the Java Native Interface (JNI).

The recording manager 3606 accepts the channel identifier from the picture recording unit 3602*c* through the JNI.

The recording manager 3606 first passes the channel identifier to the tuner 2205*c* which is in the Java library 2205, and requests tuning. Here, a processing of the tuner 2205*c* in the case where tuning is requested from the recording manager 3606 during service record is the same as the processing in the case where tuning is requested from the service manager 2204 during service selection. Therefore, descriptions are omitted.

Next, the recording manager 3606 requests the CA library 2206 to perform cryptograph removal. Here, a processing of the CA library 2206 in the case where cryptograph removal is requested from the recording manager 3606 during service record is the same as the processing in the case where cryptograph removal is requested from the service manager 2204 during service selection. Therefore, descriptions are omitted.

Note that the CA library 2206, which has been requested by the recording manager 3606 to perform cryptograph removal, may use a method, such as applying a cryptograph in an original format, after cryptograph removal.

Note that in the case of cryptograph removal during service playback, the recording manager 3606 does not execute cryptograph removal during service record, and does not request the CA library 2206 to execute cryptograph removal.

Note that the present invention is applicable regardless of whether the recording manager 3606 does or does not request the CA library 2206 to perform cryptograph removal.

Next, the recording manager 3606 supplies the channel identifier to the JMF 2205*a* which is in the Java library 3605, and requests video/audio recording.

First, the JMF 2205*a* acquires, from the PAT and the PMT, the PID for isolating the video and audio to be recorded. Here, in order to acquire the PAT, the JMF2205*a* prescribes the CPU 1606 and the PID "0" to the TS decoder 1602, through the library 2201*b* of the OS 2201. The TS decoder carries out filtering with the PID "0" and the table_id "0," and by passing these to the CPU 1606 through the primary memory unit 1608, the JMF 2205*a* acquires the PAT. Here, FIG. 13 can be given as an example of the PAT. At this time, when the channel identifier supplied to the JMF 2205*a* is "1," the JMF 2205*a* refers to row 2412 of FIG. 25, acquires the corresponding program number "101," and then refers to row 1211 of the PAT in FIG. 13, and acquires the PID "501" which corresponds to the program number "101." In order to acquire the PMT, the JMF 2205*a* prescribes the PID acquired from the PAT and the table_id "2" to the TS decoder 1602 through the library 2201*b* of the OS 2201. Here, the prescribed PID is "501." The TS decoder carries out filtering with the PID "501" and the table_id "2," and by passing these to the CPU 1606 through the primary memory unit 1608, the JMF 2205*a* collects the PMT. Here, FIG. 41 can be given as an example of the PMT. Here, in FIG. 41, the configuration elements identical to those in FIG. 12 have the same numbers, and descriptions are omitted. In FIG. 41, the ES shown in row 1115 is an ES which transmits a data section, which has a PID of 5015, and has attached information configured of a TS packet with a DSMCC [2] (the DSMCC identifier is 2). The JMF 2205*a* acquires, from the PMT, the PID of the video and audio to be recorded. Referring to FIG. 41, the JMF 2205*a* acquires a audio PID "5011" from row 1111 and a video PID "5012" from row 1112.

Next, the JMF 2205*a* supplies, as the output destination of the acquired video/audio PIDs, the AV decoder 1603 to the TS decoder 1602 through the library 2201*b* of the OS 2201. The TS decoder 1602 carries out filtering based on the supplied PID. Here, the PES packets of the PIDs "5011" and "5012" are passed to the AV decoder 1603. The AV decoder 1603 carries out decoding on the supplied audio/video PES packets, and passes the decoded audio signal and video signal to the AV encoder 3111. The AV encoder 3111 encodes the audio signal and video signal into a PES packet, and passes the PES packet of the encoded audio/video to the multiplexer 3112. The multiplexer multiplexes the PES packet of the audio/video, and stores the generated Record MPEG-2 transport stream in the recording area 3113. Note that here, the present invention is applicable even when the following are true: i) the storage administration library 3605*h* includes a function for assigning a relationship between the Record MPEG-2 transport stream and the channel identifier and storing the transport stream in the recording area 3113; ii) the JMF 2205*a* passes the channel identifier prescribed by the recording manager 3606 and the Record MPEG-2 transport stream generated when multiplexed by the multiplexer 3112 to the data recording unit 3701 of the storage administration library 3605*h*, and by requesting storage of the Record MPEG-2 transport stream into the recording area 3113, stores the Record MPEG-2 transport stream in the recording area 3113.

In addition, here, the Record MPEG-2 transport stream multiplexed by the multiplexer 3112 not only includes video/audio, but also includes a table of PAT/PMT/AIT information, and so on, necessary during service playback. Note that the present invention is applicable even when the table of AIT information and so on is not multiplexed into the Record MPEG-2 transport stream, and is instead stored separate from the Record MPEG-2 transport stream in the recording area 3113.

Finally, the recording manager 3606 supplies the channel identifier to the data recording unit 3701 of the storage administration library 3605h which is inside the Java library 3605, and requests storage of the data broadcast. Here, storage of the data broadcast refers to extracting the Java program included in the MPEG-2 transport stream and storing the program in the recording area 3113.

As described previously, the format called DSMCC, as denoted in the MPEG specification ISO/IEC 13818-6, is used as a method for embedding the Java program into the MPEG-2 transport stream. Here, detailed descriptions of DSMCC are omitted. The DSMCC format provides a method for encoding a file system configured of a directory or file used by a computer and inside the TS packet of the MPEG-2 transport stream, using the MPEG-2 section. In particular, the DSMCC format takes on a carousel-form data format which repeatedly sends the encoded data at regular intervals. In addition, as mentioned previously, the information of the Java program to be executed is in a format called AIT, and is embedded inside a TS packet of the MPEG-2 transport stream and sent as an MPEG-2 section with a table_id "0x74." AIT is an abbreviation of Application Information Table, and is defined in chapter 10 of the DVB-MHP standards (officially, ETSITS 101812 DVB-MHP specifications V1.0.2).

First, in order to acquire the AIT, the data recording unit 3701 of the storage administration library 3605h acquires the PAT and PMT, in the same manner as the JMF 2205a, and acquires the PID of the TS packet which has the AIT stored. At this time, the supplied channel identifier is "1," the PAT in FIG. 13 and PMT in FIG. 41 are sent, and the data recording unit 3701 acquires the PMT of FIG. 41 with a process identical to the JMF 2205a. The data recording unit 3701 of the storage administration library 3605h extracts the PID from the elementary stream which has "AIT" as supplementary information and a stream type "data" from the PMT. Referring to FIG. 41, the elementary stream in row 1113 is in conformity, and the PID "5013" is acquired.

The data recording unit 3701 of the storage administration library 3605h supplies the PID of the AIT and the table_id "0x74" to the TS decoder, through the library 2201b of the OS 2201. The TS decoder 1602 carries out filtering with the supplied PID and table_id, and passes these to the CPU 1606 through the primary memory unit 1608. As a result, the storage administration library 3605h can collect the AIT. FIG. 42 is a chart showing, schematically, an example of information of the collected AIT. In FIG. 42, configuration elements that are the same as in FIG. 27 have the same numbers, and therefore descriptions are omitted. Rows 4111 to 4114 is a group of information of the Java program. The Java program defined in row 4111 is a group including a Java program identifier "301," control information "autostart," a DSMCC identifier "1," and a program name "a/TopXlet." The Java program defined in row 4112 is a group including a Java program identifier "302," control information "present," a DSMCC identifier "1," and a program name "b/GameXlet." The Java program defined in row 411s is a group including a Java program identifier "303," control information "kill," a DSMCC identifier "2," and a program name "z/StudyXlet." The Java program defined in row 4114 is a group including a Java program identifier "304," control information "destroy," a DSMCC identifier "1," and a program name "b/MusicXlet."

Next, the data recording unit 3701 of the storage administration library 3605h finds all the Java programs denoted in the AIT, and extracts the corresponding DSMCC identifiers and Java program names. Referring to FIG. 42, the storage administration library 3605h extracts the Java program of row 4111, the Java program of row 4111, the Java program of row 4113, and the Java program of row 4114, and acquires the DSMCC identifier "1" and the Java program "a/TopXlet," the DSMCC identifier "1" and the Java program "b/GameXlet," the DSMCC identifier "2" and the Java program "z/StudyXlet," and the DSMCC identifier "1" and the Java program "b/MusicXlet."

Next, the data recording unit 3701 of the storage administration library 3605h uses the DSMCC identifiers acquired from the AIT and acquires, from the PMT, the PID of the TS packet stored in the DSMCC format. Specifically, the PID of the elementary stream with a conforming DSMCC identifier in the supplementary information and which has a stream type of "data" among the PMTs is acquired.

At this time, when the DSMCC identifiers are "1" and "2" and the PMT is as in FIG. 41, the elementary streams of row 1114 and row 1115 match, and the PID "5014 and the PID "5015" are fetched.

The data recording unit 3701 of the storage administration library 3605h prescribes, to the TS decoder 1602, the PID of the TS packet and a section filter condition transmitted by the MPEG-2 section in which data in the DSMCC format has been embedded, through the library 2201b of the OS 2201. Here, a table_id=0x3B is supplied as the PID "5014" and "5015" and the section filter condition. The TS decoder 1602 carries out filtering on the DSMCC MPEG-2 section using the supplied PID, and passes the section to the CPU 1606 through the primary memory unit 1608. As a result, the data recording unit 3701 of the storage administration library 3605h can collect the necessary DSMCC MPEG-2 section. The data recording unit 3701 of the storage administration library 3605h reconstitutes the file system from the collected MPEG-2 section in accordance with the DSMCC format, and stores the file system in the recording area 3113. Detailed description of the recording of the file system by the storage administration library 3605h is given later.

Figure 44:
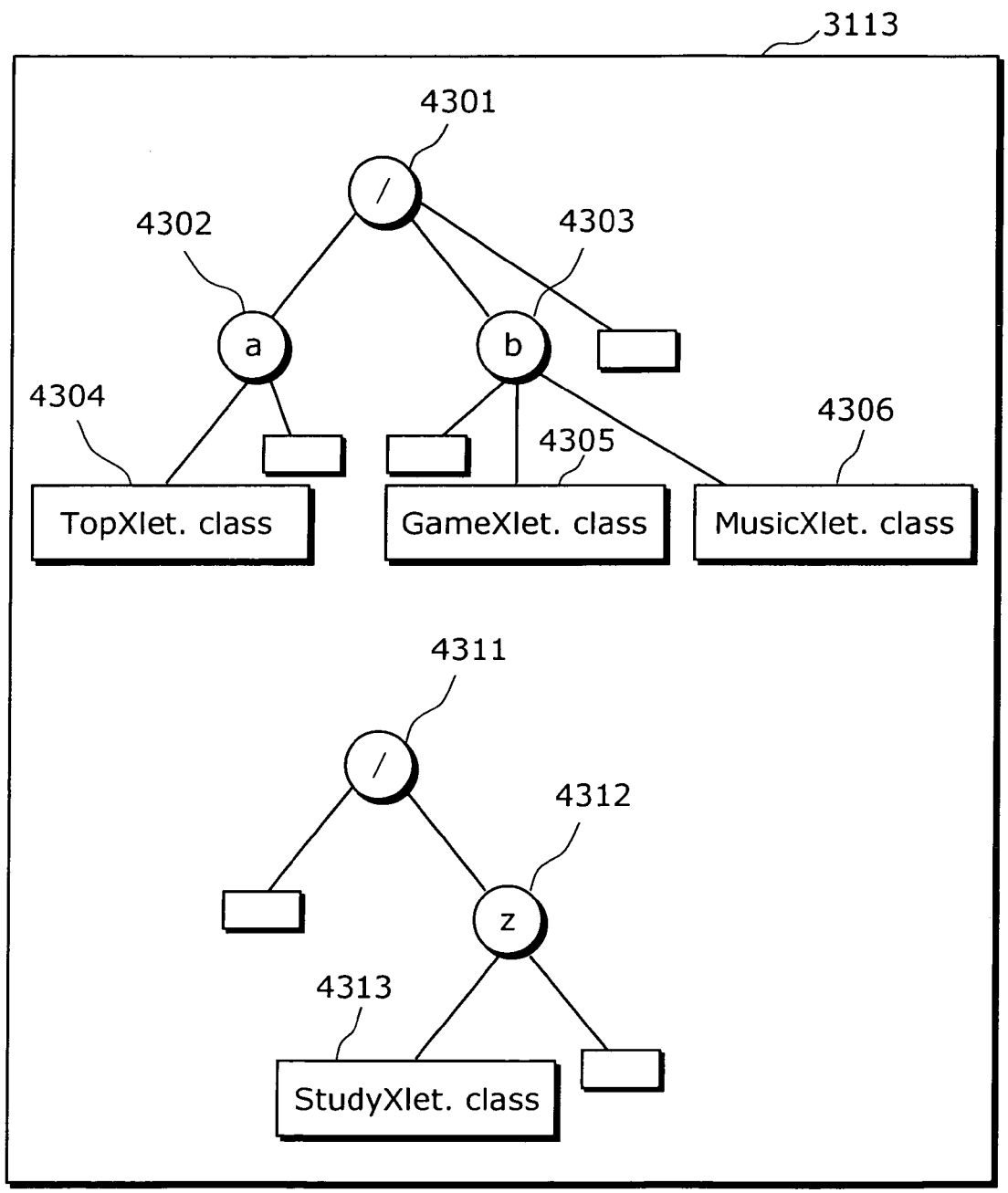
FIG. 44 is a diagram indicating one example of a file system stored in a recording area during service record.

FIG. 43 is an example of a file system encoded in a transport stream in the DSMCC format. In addition, FIG. 44 is an example of a file system stored in the recording area 3113 during service record, and here, two reconstituted file systems are stored. In FIG. 43 and FIG. 44, a circle represents a directory and a square represents a file; 4301 and 4311 are root directories of the respective file systems, 4302 is a directory "a," 4303 is a directory "b," 4312 is a directory "z," 4304 is a file "TopXlet.class," 4305 is a file "GameXlet.class," 4306 is a file "MusicXlet.class," and 4305 is a file "StudyXlet.class."

Here, the service record has a start time and an end time, and hereafter, the time from the start time to the end time is called a "service record period."

Here, as the file system encoded in the DSMCC format is repeatedly sent at a set interval, an identical file system is duplicated and sent during the service record period. Thus, the DSMCC MPEG-2 section, which is collected after the storage administration library 3605h during service record prescribes the PID and section filter condition to the TS decoder 1602 and causes selection, is repeatedly collected during the service record period, and the file systems reconstituted in the DSMCC format are repeatedly acquired in accordance with that.

Figure 45:
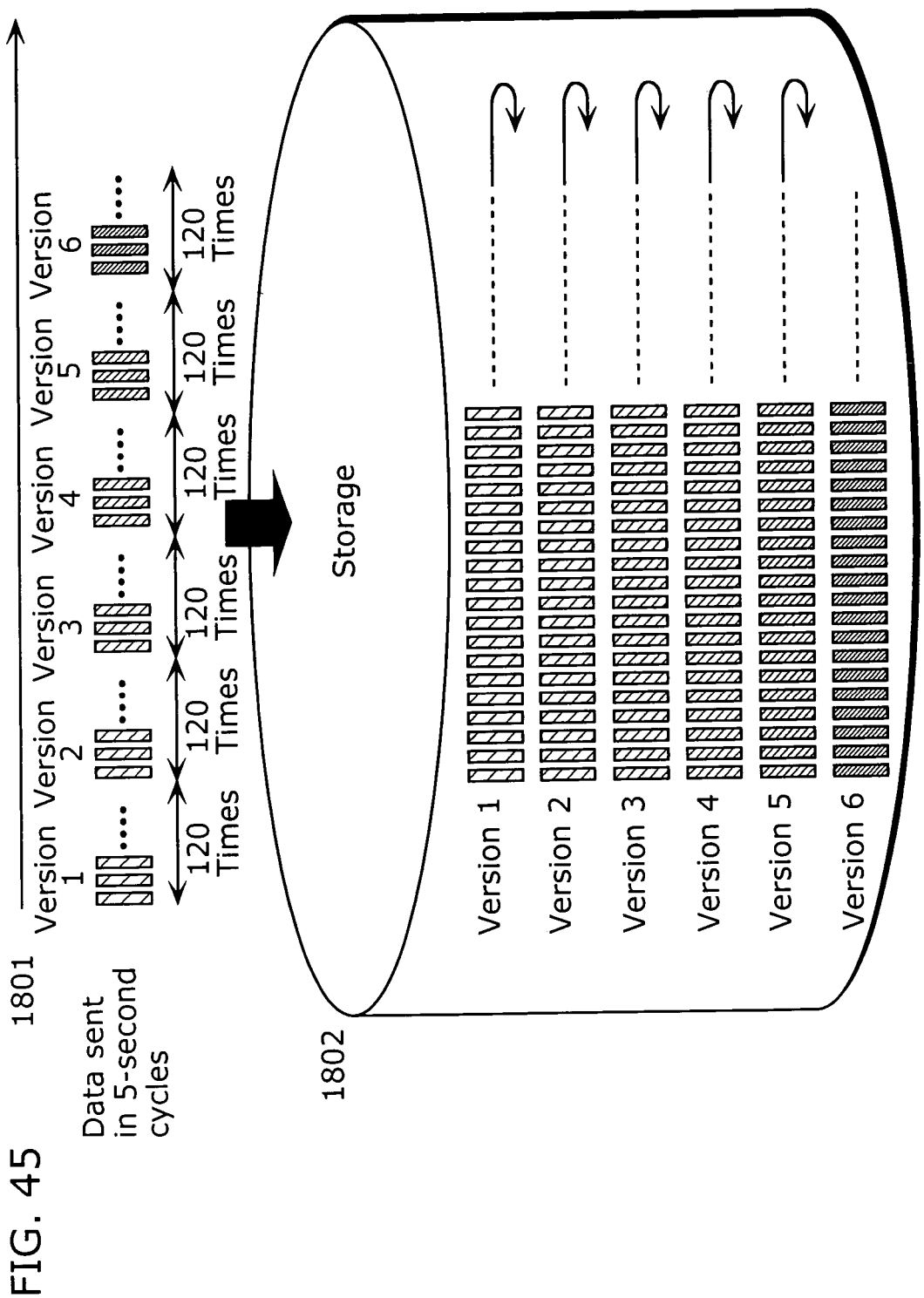
FIG. 45 is a diagram indicating one example of one file system repeatedly sent/acquired during a service record period.

FIG. 45 is a diagram that indicates an example of one file system that is repeatedly sent/acquired during the service record period.

The one file system repeatedly sent and acquired may, during service record, always be duplicated and sent/acquired with no change in content, or the content may be changed any number of times during service record. For example, as shown in FIG. 45, there is a case where a file system repeatedly sent in 5-second intervals during a 1-hour service record period carries out a content change (VersionUP) 10 minutes after record start.

Here, the data content in a file system is called a Version of that file system, and a change in the data content of one file system is called a VersionUP of that file system. In addition, here, an identical version means that the data content this time of the file system repeatedly sent is no different from the content of the previous time. A new version means that the data content this time of the file system repeatedly sent is different from the content of the previous time. Note that in the present invention, the file system data has a version, and confirmation of the VersionUP (change in the data content) of the file system data repeatedly sent is assumed as judging that the VersionUP has taken place when version values differ when compared. However, the present invention is also applicable even when a different method is used, as long as that method can detect a content change in the filesysten data itself.

As stated above, during the service record period, as one file system is repeatedly sent/acquired, storing file systems with identical versions in the recording area 3113 is wasteful for the recording area 3113. In addition, on the other hand, during the service record period, there is the case where one file system VersionUPs, and in order to carry out the VersionUP during service playback, it is necessary to store the file system with the new Version in the recording area 3113.

Figure 46:
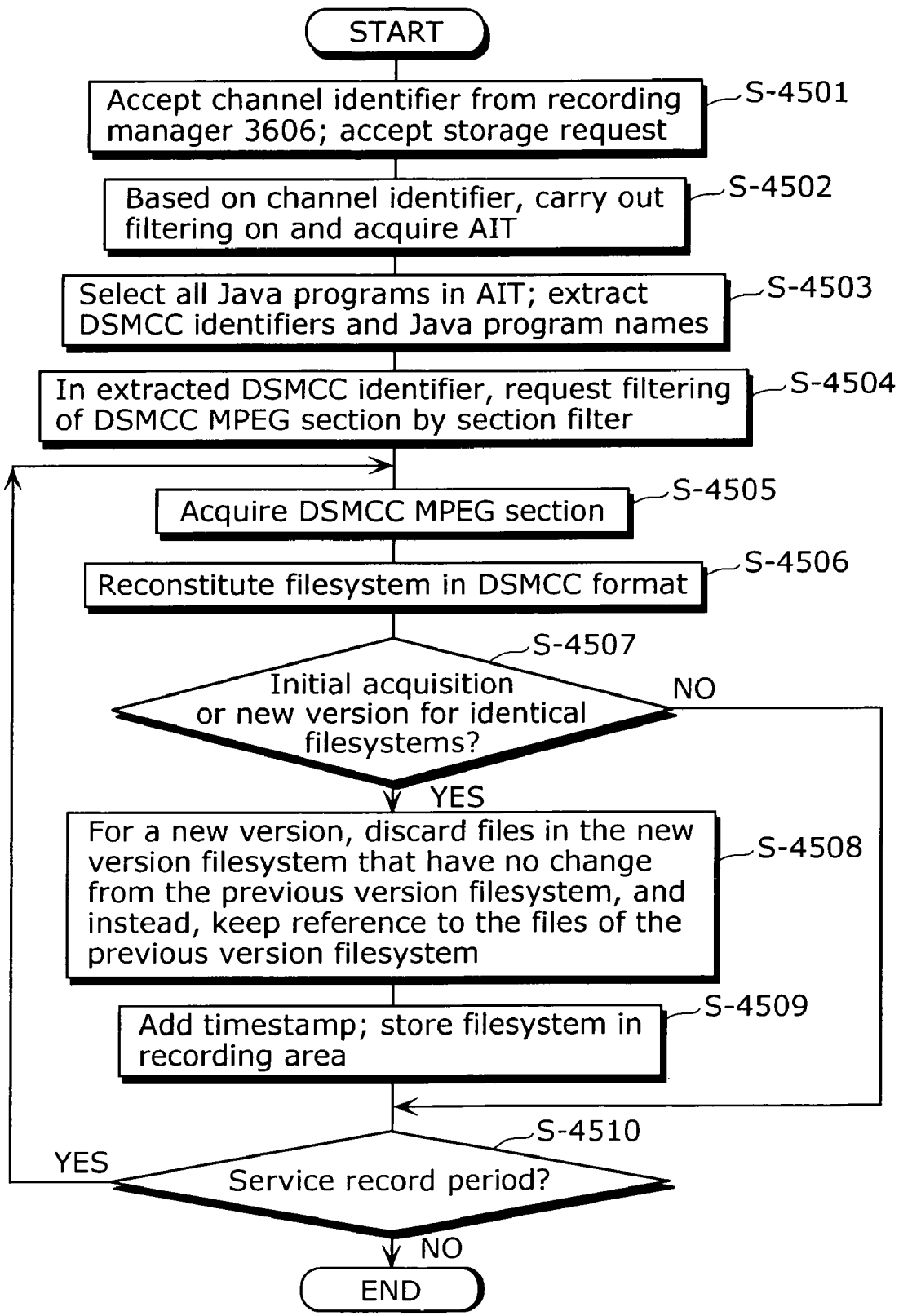
FIG. 46 is a flowchart indicating one example of recording processing of a file system by a data recording unit of a storage management library.

FIG. 46 is a flowchart indicating an example of recording processing of the file system by the data recording unit 3701 of the storage administration library 3605*h*, which has been requested to store the data broadcast when the channel identifier is supplied from the recording manager, during service record.

Accordingly, referring to the flowchart in FIG. 46, the data recording unit 3701 of the storage administration library 3605*h* is supplied with the channel identifier from the recording manager during the service record period, and is requested to store the data broadcast (S-4501). After that, acquisition through filtering of the AIT, and acquisition of the file system through filtering of the DSMCC MPEG-2 section and reconstitution of the file system, is continued in the order previously mentioned (S-4502 to S-4506, and S-4510).

Then, the version of the repeatedly sent file system is checked, and in the case of an identical file system, the file system newly-acquired stores the file system with the version acquired next in the recording area 3113 (yes of S-4507). Note that in the case where a file system with the same version is already stored during a previous service record despite the fact that the file system is newly acquired, the version of the file system acquired next does not have to be stored. In the case where the version of the file system acquired presently matches the version of the file system acquired previously, the file system acquired presently is not stored in the recording area 3113 (No of S-4507). On the other hand, in the case where the version of the file system acquired presently differs from the version of the file system acquired previously (the case where the version is new) (yes of S-4507), the file system with the new version, acquired presently, is stored in the recording area 3113. However, files included in the file system with the new version which have no changes from the files in the file system of the previous version are not newly acquired, and those files in the file system with the previous version have a reference such as a symbolic link (S-4508). Note that another method for dealing with files with no change between the file system with the new version and the file system with the previous version is acceptable, as long as it is a method which does not redundantly record those files.

In addition, it is also acceptable to assign a version to only the files which have been changed and store that version, rather than storing the file system with the new version as a file system unit.

In addition, each version of the file system to be stored is further given a timestamp which indicates a period from the time when that version of the file system is newly acquired (start time) to the time when the next VersionUP-ed file system is newly acquired (end time) and stored (S-4509). Here, a criteria for the time that divides up the timestamp is the time that divides up the Record MPEG-2 transport stream created when video/audio, specified in accordance with the prescribed channel identifier, is multiplexed. Note that another time division may be used as the criteria for the time that divides up the timestamp, as long as it is a time dividing method which allows for synchronous reproduction, in the same manner as when i) the Java program included in the service specified by the channel identifier prescribed during service playback, and ii) the video/audio multiplexed in the Record MPEG-2 transport stream which is included in the service specified by the same prescribed channel identifier, are synchronized and sent during service record.

Figure 47:
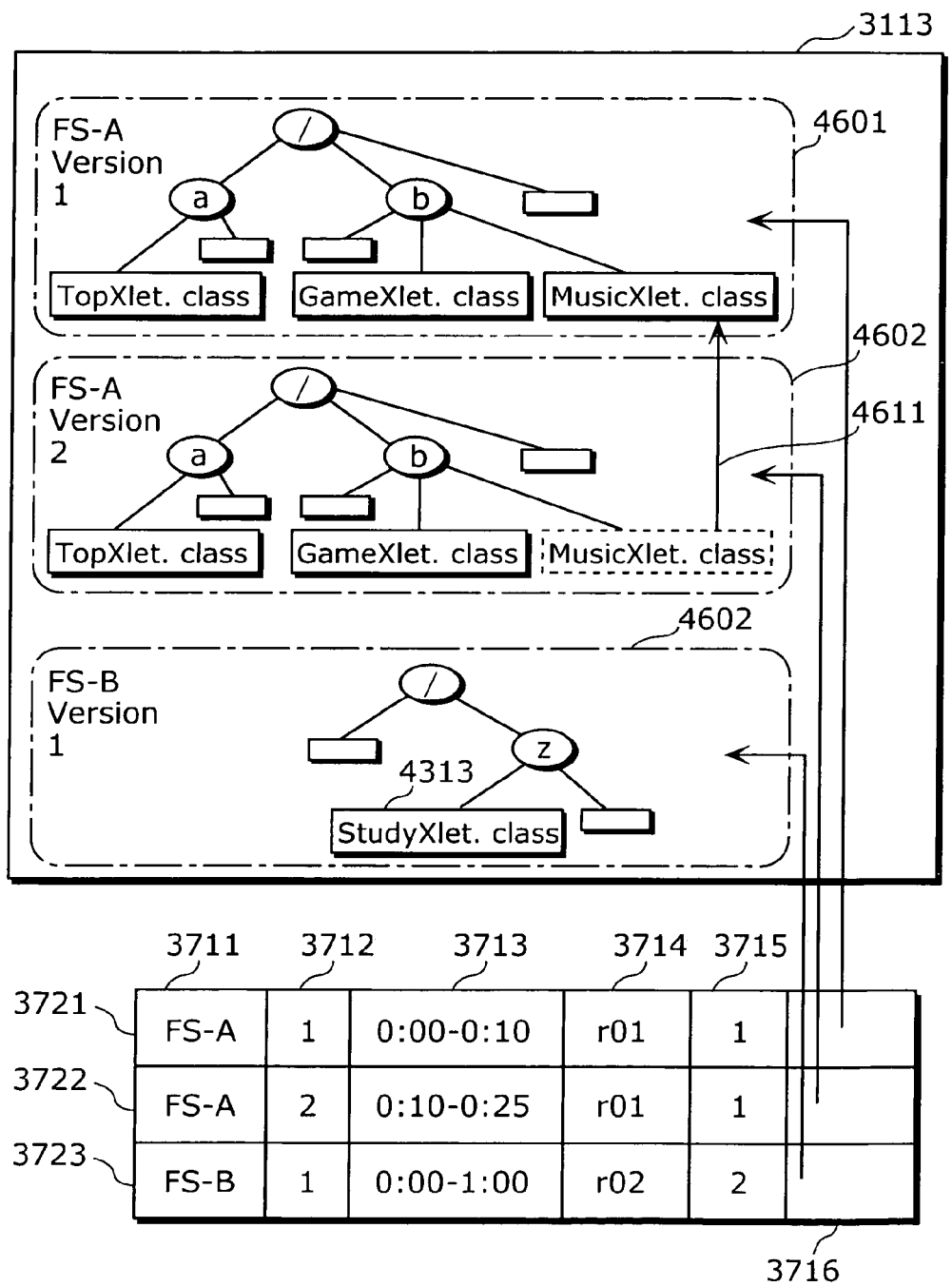
FIG. 47 is one example of a file system per version.

FIG. 47 is an example indicating the file system per version, each version being assigned, by the data recording unit 3701 of the storage administration library 3605*h*, with related information such as a timestamp and recorded in the recording area 3113; the file system being managed by the data administration unit 3702 of the storage administration library 3605*h*. In FIG. 47, configuration elements that are the same as in FIG. 37 are assigned with the same numbers, and descriptions are omitted. The file system with a file system name "FS-A" and a Version "1," as denoted in row 3721, has a timestamp of "0:00-0:10," and the storage location is 4601 inside the recording area 3113. The file system with a file system name "FS-A" and a Version "2," as denoted in row 3722, has a timestamp of "0:10-0:25," and the storage location is 4602 inside the recording area 3113. In addition, the file system with a file system name "FS-B" and a Version "1," as denoted in row 3723, has a timestamp of "0:00-1:00," and the storage location is 4603 inside the recording area 3113.

With the above process, the recording manager 3606 accepts the channel identifier and carries out tuning, cryptograph removal, video/audio recording, and Java program recording. This series of processes is collectively called "service record." A service record processing is basically the same as the service selection processing. However, the video/audio reproduction and execution of the Java program that occurs in the service selection processing is not carried out; rather, the service record processing is a processing which carries out storing of the video/audio and the Java program in the recording area 3113.

Next, a service playback processing by the service manager, which occurs in the digital broadcast receiving device that includes a service record/playback function as indicated in FIG. 29, is described.

Figure 34:
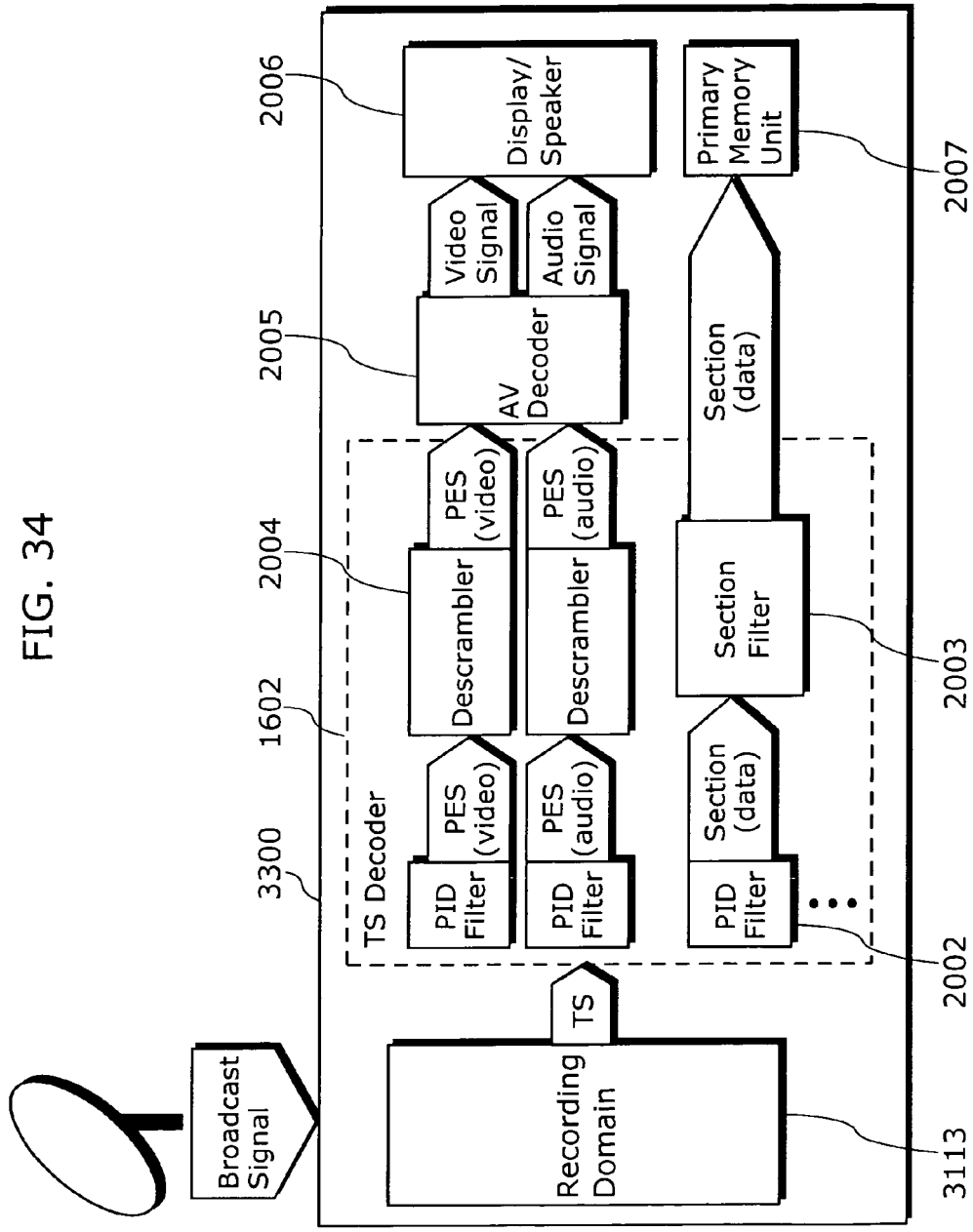
FIG. 34 shows a conceptual rendering which represents the physical connection sequence, processing content, and input/output data format of each device during service playback.

FIG. 34 and FIG. 35 indicate conceptual diagrams that represent a physical connection order and a data format of processing content and input/output occurring during service playback. In FIG. 34 and FIG. 35, devices identified by the same numbers as in FIG. 21 have the same functions as in FIG. 21, and therefore descriptions are omitted.

In FIG. 34, a terminal apparatus 3300 has a recording area 3113. The recording area 3113 corresponds to all or part of the secondary memory unit 1607, and, in the terminal apparatus which has device connections as shown in FIG. 32, outputs the Record MPEG-2 transport stream that is stored during service record.

In FIG. 35, a terminal apparatus 3400 has the recording area 3113. The recording area 3113 corresponds to all or part of the secondary memory unit 1607, and, in the terminal apparatus which has device connections as shown in FIG. 33, outputs the Record MPEG-2 transport stream that is stored during service record and the data recorded by the storage administration library 3605h.

Here, descriptions of a program operation process, in the terminal apparatus 3300 as shown in FIG. 34 during service playback, are omitted. In the terminal apparatus shown in FIG. 34, during service playback, the TS decoder inputs the Record MPEG-2 transport stream stored in the recording area 3113, and outputs the section data, such as video/audio included in the service and the Java program included in the service.

Next, descriptions of a program operation process, in the terminal apparatus 3400 as shown in FIG. 35 during service playback, are given.

Referring to FIG. 37, the TV show display unit 2202a of the EPG 3602 displays, in the display 1605, a TV show chart including both the service sent from the broadcast station and the service stored in the recording area 3113. Here, in the digital broadcast receiving device that includes a service record/playback function, the channel identifier is an identifier that uniquely specifies 1 service from i) the service sent from the broadcast station and ii) the service stored in the recording area 3113.

The Java VM 2203 is prescribed by the Java program executed in the kernel 2201a, and started. During service playback, the kernel 2201a prescribes the service manager 2204 as the Java program to be executed.

The service manager 2204 accepts the channel identifier from the reproduction unit 2202b, through the JNI.

The service manager 2204 first passes the channel identifier to a data fetching unit 3703 of a storage administration library 3605h that is inside the Java library 2205, and requests fetching of the Record MPEG-2 transport stream, which includes the service specified by the channel identifier from the recording area 3113. The data fetching unit 3703 of the storage administration library 3605h passes the fetched Record MPEG-2 transport stream to the TS decoder 1602.

Next, the service manager 2204 requests the CA library 2206 to perform cryptograph removal, in the case where cryptograph removal has not been carried out during service record. Here, the processing of the CA library 2206, in the case where cryptograph removal is requested by the service manager 2204 during service playback, is the same as the processing in the case where cryptograph removal is requested by the service manager 2204 during service selection, and therefore descriptions are omitted.

Note that after cryptograph removal has been executed during service record, there is a case where a cryptograph is applied in a unique format, and in such a case, it is acceptable to use a method in which the service manager 2204 requests the CA library 2206 to perform cryptograph removal and the CA library removes the cryptograph in the unique format.

Note that in the case where cryptograph removal is carried out during service record, the service manager 2204 does not request the CA library 2206 to perform cryptograph removal during service playback.

Note that the present invention is applicable regardless of whether or not the service manager 2204 requests the CA library 2206 to perform cryptograph removal.

Next, the service manager 2204 supplies the channel identifier to the JMF 2205a, which is in the Java library 2205, and requests reproduction of the video/audio.

First, the JMF 2205a fetches the Record MPEG-2 transport stream specified by the prescribed channel identifier from the recording area 3113. Note that here, the present invention is also applicable even when the following is true: the data fetching unit 3703 of the storage administration library 3605 further has a function to fetch, from the recording area 3113, the Record MPEG-2 transport stream specified by the prescribed channel identifier; the JMF 2205a passes the channel identifier prescribed by the service manager 2204 to the data fetching unit 3703 of the storage administration library 3605, and requests fetching of the Record MPEG-2 transport stream; the data fetching unit 3703 of the storage administration library 3605h fetches the Record MPEG-2 transport stream specified by the prescribed channel identifier from the record area 3113; and by passing the stream to the JMF 2205a, the JMF 2205a fetches, from the recording area 3113, the Record MPEG-2 transport stream specified by the prescribed channel identifier. Subsequently, the JMF 2205a acquires the PAT and PMT from the Record MPEG-2 transport stream, with the same method as when requesting reproduction of video/audio from the service manager 2204 during service selection. Then, the JMF 2205a acquires the PID of the video and audio to be reproduced from the PMT.

Next, the JMF 2205a supplies the acquired video/audio PID, and the AV decoder 1603 as the output destination, to the TS decoder 1602, through the library 2201b of the OS 2201. The TS decoder 1602 carries out filtering based on the supplied PID. Here, TS packets with a PID of "5011" and "5012" are passed to the AV decoder 1603. The AV decoder 1603 carries out decoding of the supplied PES packet, and reproduces the video/audio through the display 1605 and the speaker 1604.

Finally, the service manager 2204 supplies the channel identifier to the AM 2205b that is in the Java library 2205, and requests data broadcast reproduction. Here, data broadcast reproduction refers to acquiring a Java program configured of file systems recorded in the recording area 3113, and causing the program to be executed by the Java VM 2203.

The AM 2205b first acquires the AIT from the Record MPEG-2 transport stream, with the same method as when requesting data broadcast reproduction from the service manager 2204 during service selection. Note that here, the present invention is applicable even if the AIT is stored in the recording area 3113 separate from the Record MPEG-2 transport stream during service record, and an AIT included in the service that corresponds to the channel identifier is acquired form the recording area 3113.

The AM 2205b finds the Java program of "autostart" from among the AIT, and extracts the corresponding DSMCC identifier and Java program name. Referring to FIG. 42, the AM 2205b extracts the Java program from row 4111, and acquires the DSMCC identifier "1" and the Java program name "a/TopXlet."

Next, the AM 2205b passes the DSMCC identifier acquired from the AIT to the data fetching unit 3703 of the storage administration library 3605h, and requests fetching of the file system stored in the recording area 3113. The data fetching unit 3703 of the storage administration library 3605h further fetches, from the file system per version recorded in the recording area 3113 that is managed by a data administration unit 3702, the file system that is specified by the prescribed DSMCC identifier and also is a version with a valid timestamp, and passes the fetched file system to the AM 2205b. The AM 2205b saves the file system in the primary memory unit 1608 or the secondary memory unit 1607.

Figure 48:
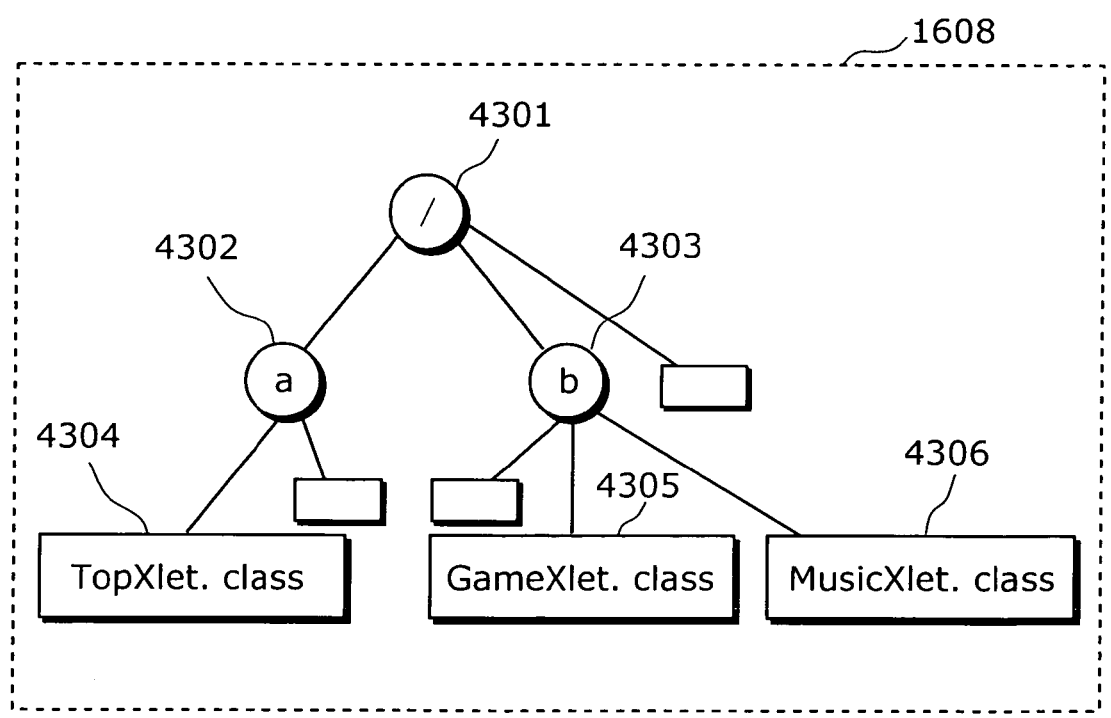
FIG. 48 is a diagram indicating one example of a file system saved in a primary memory or secondary memory unit.

FIG. 48 is one example of the file system saved in the primary memory unit 1608 or the secondary memory unit 1607. Here, in FIG. 48, configuration elements that are the same as in FIG. 43 are given the same numbers, and descriptions are omitted.

Next, the AM 2205b passes the Java program to be executed from the file system saved in the primary memory unit 1608 or the secondary memory unit 1607 to the Java VM 2203. At this time, when the name of the Java program to be executed is "a/TopXlet," the file "a/TopXlet.class," which has ".class" added to the end of the Java program name, is the file to be executed. "/" is a directory and file name division, and referring to FIG. 48, a file 4304 is the Java program which should be executed. Next, the AM 2205b passes the file 4304 to the Java VM 2203.

The Java VM 2203 executes the Java program it was passed. In addition, the Java VM 2203 generally reads out the file in the file system saved in the primary memory, in the case where reading out of a different file is requested by the Java program to be executed. However, in the case where the file requested to be read out exists in a file system different from the abovementioned Java program and is not saved in the primary memory, it is acceptable carry out processing in which a request is given to the storage administration library, the file included in the file system requested to be read out is fetched from the recording area, and saved in the primary memory.

Here, during service playback, it is necessary to execute the video/audio and Java program synchronously. Thus, during service playback, when acquisition of a file system is requested by the Java VM 2203, the data fetching unit 3703 of the storage administration library 3605h refers to the timestamp of the file system managed by the data administration unit 3702, and fetches the file system with a valid version. Here, a valid timestamp refers to, for example, the time in the Record MPEG-2 transport stream during service playback being above/equal to the start time and below/equal to the end time indicated by the timestamp. Here, the video/audio to be synchronized with the Java program is video/audio multiplexed into the Record MPEG-2 transport stream during service record, is continually synchronized with the Record MPEG-2 transport stream, and divides up the time. Thus, the Java program synchronizing with the time in the Record MPEG-2 transport stream is the same as the Java program synchronizing with the video/audio multiplexed into the Record MPEG-2 transport stream.

Figure 49:
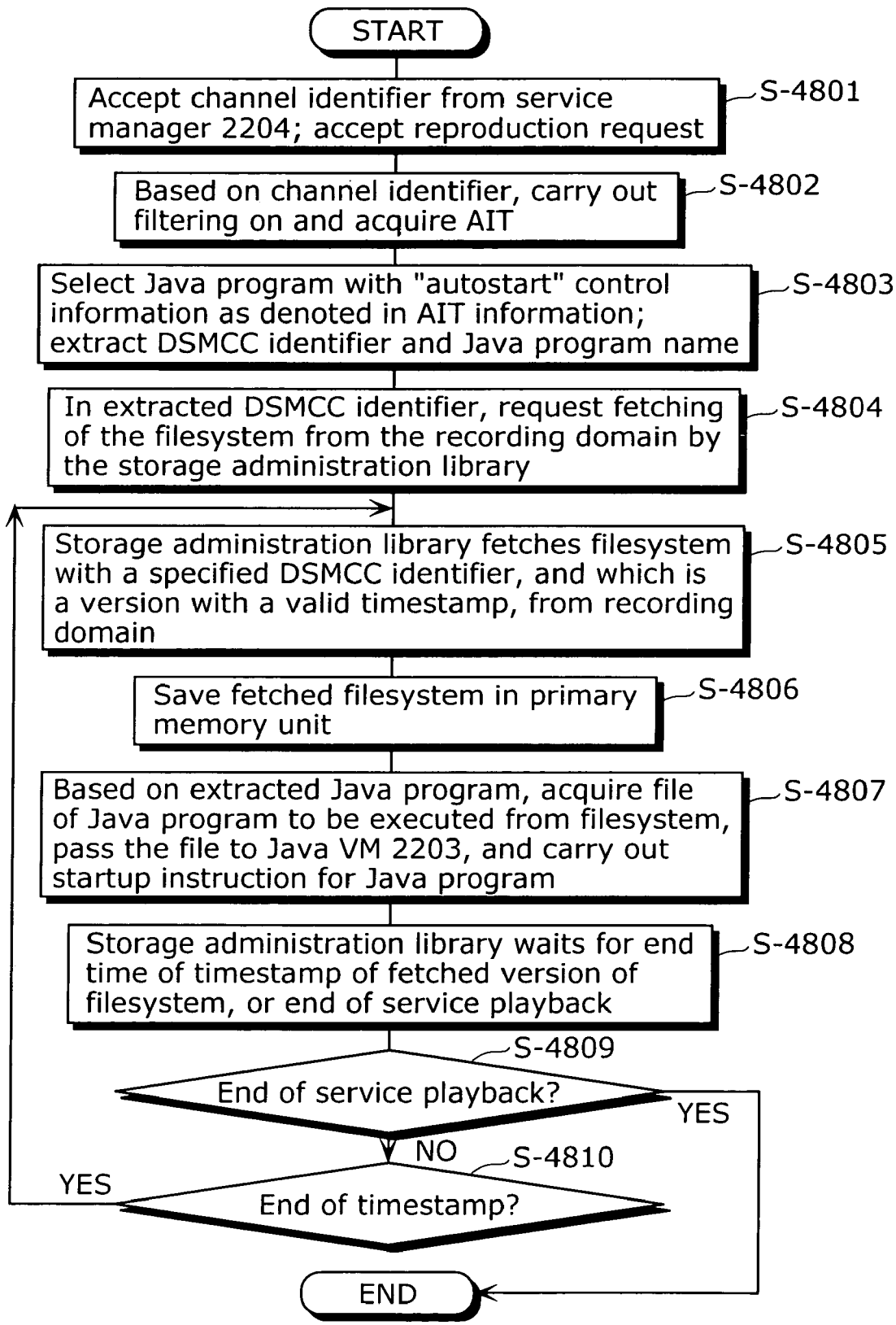
FIG. 49 is a flowchart indicating one example of Java™ program execution processing.

FIG. 49 is a flowchart showing an example of execution processing of the Java program stored in the recording area using the storage administration library 3605, through the AM 2205b which is supplied with the channel identifier from the service manager 2204 and requested to execute data broadcast reproduction, during service playback.

Referring to the flowchart in FIG. 49, after the AIT is supplied with the channel identifier from the service manager 2204 and requested to perform data broadcast reproduction during service playback (S-4801), acquisition through filtering of the AIT or acquisition from the recording area is executed in the order mentioned previously (S-4802); the Java program with control information of "autostart" as denoted in the acquired AIT information is selected, and the DSMCC identifier and Java program name are extracted (S-4803); and with the extracted DSMCC identifier, the data fetching unit 3703 of the storage administration library 3605 is requested to fetch the file system from the recording area. The data fetching unit 3703 of the storage administration library 3605 fetches, from the file systems recorded per-version in the recording area 3113 which is managed by the data administration unit 3702, the file system which is specified by the prescribed DSMCC identifier and whose version has a valid timestamp, and passes this file system to an AM (S-4805). The AM saves the file system fetched from the recording area 3113 in the primary memory area 1608 (S-4806). Next, the AM acquires, from the file system, the file of the Java program to be executed, based on the name of the extracted Java program, passes the file to the Java VM 2203, and carries out a startup instruction for the Java program (S-4807). Continuing further, during the period up until service playback ends, in regards to a version of the file system fetched from the recording area 3113, when the end time of that timestamp comes (S-4808 to S-4818), the processing, in which the data fetching unit 3703 of the storage administration library 3605 once again fetches, from the file systems recorded per-version in the recording area 3113 that is managed by the data administration unit 3702, the file system which is isolated by the prescribed DSMCC identifier and which is a version with a valid timestamp and passes the file system to the AM (S-4805), continues repeatedly. Therefore, fetching of the file system synchronized with the playback time from the recording area 3113 and saving of that file system in the primary memory is realized, and therefore, the Java VM 2203 always using the files of the file system synchronized with the playback time is realized.

Through the abovementioned process, the service manager 2204 accepts the channel identifier, and executes acquisition, cryptograph removal, video/audio reproduction, and Java program startup of the Record MPEG-2 transport stream stored in the recording area 3113. This series of processes is collectively called "service PlayBack."

The service PlayBack processing by the service manager 2204 is basically the same as the service selection processing. However, while during service selection, video/audio reproduction and Java program startup are executed based on the data acquired from the broadcast wave, during service Playback, video/audio reproduction and Java program startup are executed based on the data acquired from the recording area 3113. In addition, Record does not necessarily store all the data included in the service. Therefore, all data used during service selection and service playback is not necessarily the same.

In addition, in a receiving terminal that includes service record/playback functions, and referring to FIG. 37, the Java library 3605 includes a recording manager administration library 3604g. In addition, a service manager administration library 2205f in the Java library 3605 further provides, to the Java program, a function to playback the service. The Java program implements the functions of the Java program while using these libraries.

The Java program can carry out service record through the recording manager 3606 by using the recording manager administration library 3605g.

Specifically, when the Java program passes the channel identifier to the recording manager administration library 3605g, the recording manager administration library 3605g passes the accepted channel identifier to the recording manager 3606. After that, service record is carried out by the recording manager 3606, in the same manner as channel record using the EPG 3602, and based on information denoted in the PMT identified by a program number corresponding to the channel identifier, the video/audio belonging to that service is recorded in the recording area 3113, and the Java program belonging to that service is recorded in the recording area 3113.

In addition, by using the service manager administration library 2205f, the Java program can carry out service playback through the service manager 2204.

Specifically, when the Java program passes the channel identifier, which indicates the service stored in the recording area 3113 during service record, to the service manager administration library 2205*f*, the service manager administration library passes the accepted channel identifier to the service manager 2204. After that, service playback is carried out by the service manager 2204, in the same manner as during channel reproduction using the EPG 3602; the video/audio belonging to that service is reproduced, and the Java program belonging to that service is started, from the recording area 3113, based on the information denoted in the PMT that is identified by the program number corresponding to the channel identifier.

In this manner, it is possible for the Java program to carry out service record by using the recording manager administration library 3605*g* included in the Java library, and carry out service playback by using the service manager administration library 2205*f*.

Note that in the present embodiment, as shown in S-4503 of FIG. 46, all Java programs (application programs) denoted in the AIT are targets for recording, but it is also acceptable for all Java programs corresponding to a stream type "data" and supplementary information "DSMCC" denoted in the PMT to be targets for recording.

The broadcast recording apparatus according to this present embodiment includes: a tuner 1601, which is the receiving unit that receives the broadcast wave; a TS decoder 1602 which extracts, from the broadcast wave received by the tuner 1601, video/audio data indicating the content to be viewed, as well as extracting, from the broadcast wave received by the tuner 1601, a Java program repeatedly included in the broadcast wave and an AIT indicating a list of the Java programs present in the broadcast wave and repeatedly included in the broadcast wave; a recording area 3113 for recording the video/audio data, the Java program, and the AIT; a JMF 2205*a* which records the video/audio data extracted by the TS decoder 1602 into the recording area 3113; a storage administration library 3605*h* which attaches a timestamp to the extracted Java program in the case where the Java program extracted by the TS decoder 1602 differs from a Java program already recorded in the recording area 3113, and records the Java program attached with the timestamp in the recording area 3113, and attaches a timestamp to the extracted AIT in the case where the AIT extracted by the TS decoder 1602 differs from AIT already recorded in the recording area 3113, and records the AIT attached with the timestamp in the recording area 3113, and, furthermore, creates storage administration information indicating a recording place for the Java program in the recording area 3113 each time the Java program is recorded in the recording area 3113; an AV decoder 1603 which reproduces the video/audio data recorded in the recording area 3113; and a service manager 2204 and a Java VM 2203 which read out, from the recording place indicated by the storage administration information, and execute the Java program with a timestamp corresponding to a reproduction time of the video/audio data, the Java program being indicated by the AIT with a timestamp corresponding to the reproduction time.

The effects of the service record/playback processing as noted in the present embodiment are indicated below. As a first effect, in regards to one file system, one of each file system with an identical version is stored, and duplicate storage disappears and thus it is possible to reduce the storage area in the recording area 3113. In addition, even when the file system is of a new version, in the case where there files included in that file system do not differ from the file system of the previous version, by not storing duplicates, a storage area in file units can be implemented. As a second effect, by assigning and storing each version of the file systems with a timestamp during service record, and by multiplexing the video/audio, which is synchronized and sent in the same channel, into a record stream and storing the stream, it is possible to synchronize and reproduce the video/audio data, synchronized and sent, with the Java program. In addition, as a third effect, a module unit (Modules of Data Carousels) and an object unit (U-U Object in an Object Carousel) are stipulated in the DSMCC specifications as units of repeatedly-sent data; the object is a data unit included in the module and that is smaller than the module, and is the actual data of the directory, file, and so on. Detailed descriptions of the module and the object are given in the DSMCC specifications (ISO/IEC 13818-6), and as this is a publicly-known technology, descriptions are omitted here. The reconstitution and storage of the file system in the present invention is a setup that caries out storage so that files in the file system are not duplicated, and is equivalent to reconstitution and storage of data in object units; it is possible to implement reduction of the storage area more effectively than prior art that reconstitutes and stores data in module units. As a fourth effect, because all Java programs included in the service are stored, during service record, in the recording area 3113 as data reconstituted as a file system, it is possible to, during service playback, skip filtering of the DSMCC MPEG-2 section and reconstitution processing of the file system again, and reduce the use of filter resources while also shortening the startup time of the Java program.

As a fifth effect, by recording, per version and without duplication, one file system that corresponds to a certain Java program denoted in the AIT, and by starting/terminating the Java program from the recorded corresponding file system in accordance with control information denoted in the AIT ("autostart," "kill," and so on), in the case where that Java program is repeatedly started/terminated, it is not necessary to acquire the file system each time, and the recording area can be reduced. Or, by recording, per version and without duplication, the file system denoted in the PMT, and by starting/terminating the Java program from the recorded corresponding file system in accordance with control information denoted in the AIT ("autostart," "kill," and so on), in the case where that Java.program is repeatedly started/terminated, it is not necessary to acquire the file system each time, and the recording area can be reduced.

Second Embodiment

In the first embodiment, storage is implemented which makes possible reduction of the recording area 3113 and synchronized playback of the video/audio, by checking the version of the file system during service record, adding a timestamp to each version of the file system, and storing the file system in the recording area 3113.

However, in addition to the file system encoded in the DSMCC format, a TV show configuration in the transport stream, a table of the PAT, PMT, and AIT, which represent control information of the Java program included in the service, an NPT coefficient indicating reproduction position information for video/audio (NPT Reference Descriptor), a stream event (Stream Event Descriptor), and so on, exist as data repeatedly sent over a fixed interval in the transport stream. For a detailed description of the NPT coefficient and the stream event, refer to ISO/ICE 13818-1, "MPEG2 Systems" specifications. Here, because the NPT coefficient (NPT Reference Descriptor) is information which holds a table, the NPT coefficient is hereafter described as the table. For example, the DSMCC identifier, file name, VersionNo, control information, and so on of a Java program included in a service is denoted in the AIT included in that service. Thus, during service playback, information denoted in the AIT is necessary.

In the present embodiment, the information denoted in the AIT is stored in the recording area 3113 during service record. In addition, because the AIT is data sent repeatedly, all of this repeatedly-sent data is not stored; rather, only the AIT with a new version is given a timestamp and stored.

Next, a service record processing by a recording manager 3606, occurring in a digital broadcast receiving device with a service record/playback function as shown in FIG. 29 of the present invention, is described. The service record processing by the recording manager 3606 in the present invention is nearly the same as the service record processing by the recording manager 3606 in the first embodiment, aside from the processing regarding acquisition of the AIT. Therefore, here, descriptions of the same processing are omitted, and only the different point, which is a processing of a storage administration library that is supplied with a channel identifier from the recording manager 3606 and requested to store a data broadcast, is mentioned.

When a data recording unit 3701 of the storage administration library 3605h is supplied with the channel identifier from the recording manager 3606 and requested to store the data broadcast, the data recording unit 3701 first acquires a PAT and a PMT, and further acquires the AIT, by a method similar to that during service record processing in the first embodiment.

Next, the data recording unit 3701 of the storage administration library 3605h finds all Java programs denoted in the AIT and extracts the corresponding DSMCC identifier and Java program name, by a method similar to that during service record processing in the first embodiment.

Next, the data recording unit 3701 of the storage administration library 3605h uses the DSMCC identifier acquired from the AIT to collect a necessary DSMCC MPEG-2 section, reconstitutes a file system according to the DSMCC format, and stores the file system in the recording area 3113, by a method similar to that during service record processing in the first embodiment.

Figure 50:
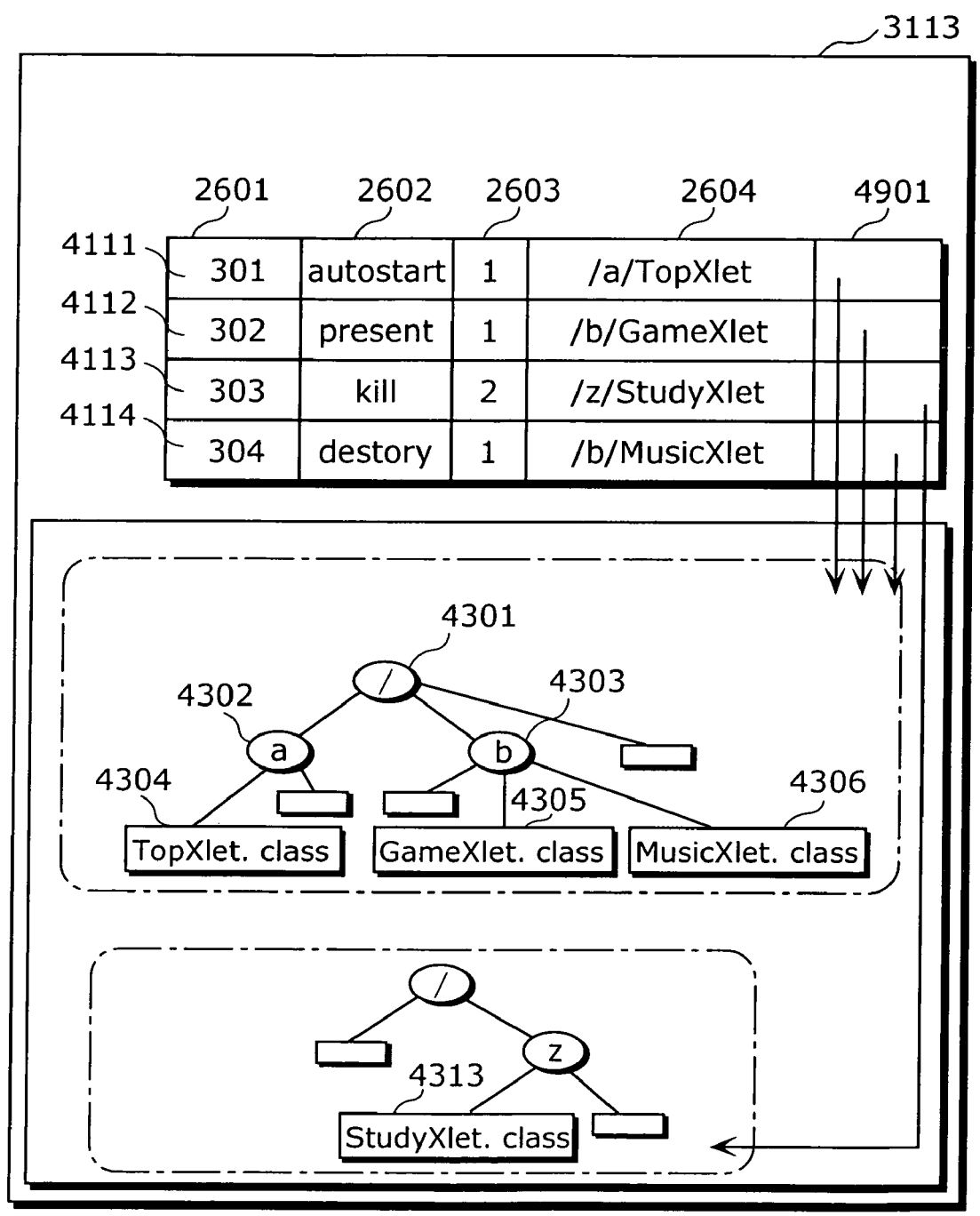
FIG. 50 is a diagram showing one example where AIT information and a stored file system are caused to correspond and are stored in a recording area.

Next, the data recording unit 3701 of the storage administration library 3605h stores the AIT information in the recording area 3113. Here, a storage position for the stored file system is set to correspond to information of each Java program in the AIT information, and is stored in the recording area 3113. FIG. 50 is a diagram showing one example of a stored file system set to correspond to the AIT information and stored in the recording area 3113. In FIG. 50, elements with the same numbers as in FIG. 42 and FIG. 44 are the same as in FIG. 42 and FIG. 44, and descriptions are omitted. Column 4901 stores the storage position of the stored file system corresponding to each Java program. Note that the storage position of the file system may be in a format that refers a storage position that does not depend on the Version; however, in the former case, during service playback, extraction of the file system with a valid version at a certain time is requested of the data fetching unit 3703 of the storage administration library 3605h, based on the system storage position which the AIT information. In the latter case, because a reference to a version of the file system with a valid timestamp from the recording area 3113 during service playback is denoted in the AIT, there is no need to request extraction of the file system with a valid version by data fetching unit 3703 of storage administration library 3605h, and it is possible for the file system acquisition processing to be carried out easily.

Note that it is also acceptable to cause only the DSMCC identifier to correspond to the information of each Java program of the AIT, without causing the storage position of the accumulated file system to correspond. In this case, during service playback, the data fetching unit 3703 of the storage administration library 3605h is requested to perform extraction of a file system that is a valid version in a certain time based on the DSMCC identifier held by the AIT information. For example, the DSMCC identifier identical to the DSMCC identifier of the Java program denoted in the AIT is retrieved from row 3715 of the data (storage administration information) shown in FIG. 47, and the Java program is read out from the storage place (recording place) corresponding to that DSMCC identifier and is executed.

Here, when the AIT information includes enough information to start/control the Java program included in the service during service playback, the present invention is applicable even when it is all or part of information regarding all Java programs denoted in the AIT, and even if it is information with a format completely different from the AIT.

Here, as the table of the PAT, PMT, AIT, NPT coefficient indicating reproduction position information of video/audio (NPT Reference Descriptor), and so on are sent repeatedly over a constant interval, the table of the PAT, PMT, AIT, NPT coefficient, and so on are duplicated and sent during the service record period. Therefore, the table of the PAT, PMT, AIT, NPT coefficient, and so on, selected and collected when the data recording unit 3701 of the storage administration library 3605h prescribes the PID and section filter condition to the TS decoder during service record, is repeatedly acquired during the service record period.

There are cases in which one table of the PAT, PMT, AIT, NPT coefficient, and so on repeatedly sent/acquired is always duplicated and sent/acquired with no change in content during service record, and cases in which there are any number of changes in the content during service record.

Here, data content of one table is called a version of that table, and a change in the data content of one table is called a versionUP of that table. In addition, here, an identical version refers to when there is no change in the present data content from the previous data content, in a repeatedly-sent table, and a new version refers to when there is a change in the present repeatedly-sent data content from the previous data content.

Note that in the present invention, the table of the AIT has a version, and confirmation of the VersionUP (change in the data content) of the table of the AIT repeatedly sent is assumed as judging that the VersionUP has taken place when version values differ when compared. However, the present invention is also applicable even when a different method is used, as long as that method can detect a content change in the table of the AIT itself.

As stated above, during the service record period, as one table is repeatedly sent/acquired, storing tables with identical versions in the recording area 3113 is wasteful for the recording area 3113. In addition, on the other hand, during the service record period, there is the case where one table VersionUPs, and in order to carry out the VersionUP during service playback, it is necessary to store the table with the new Version in the recording area 3113.

Figure 51:
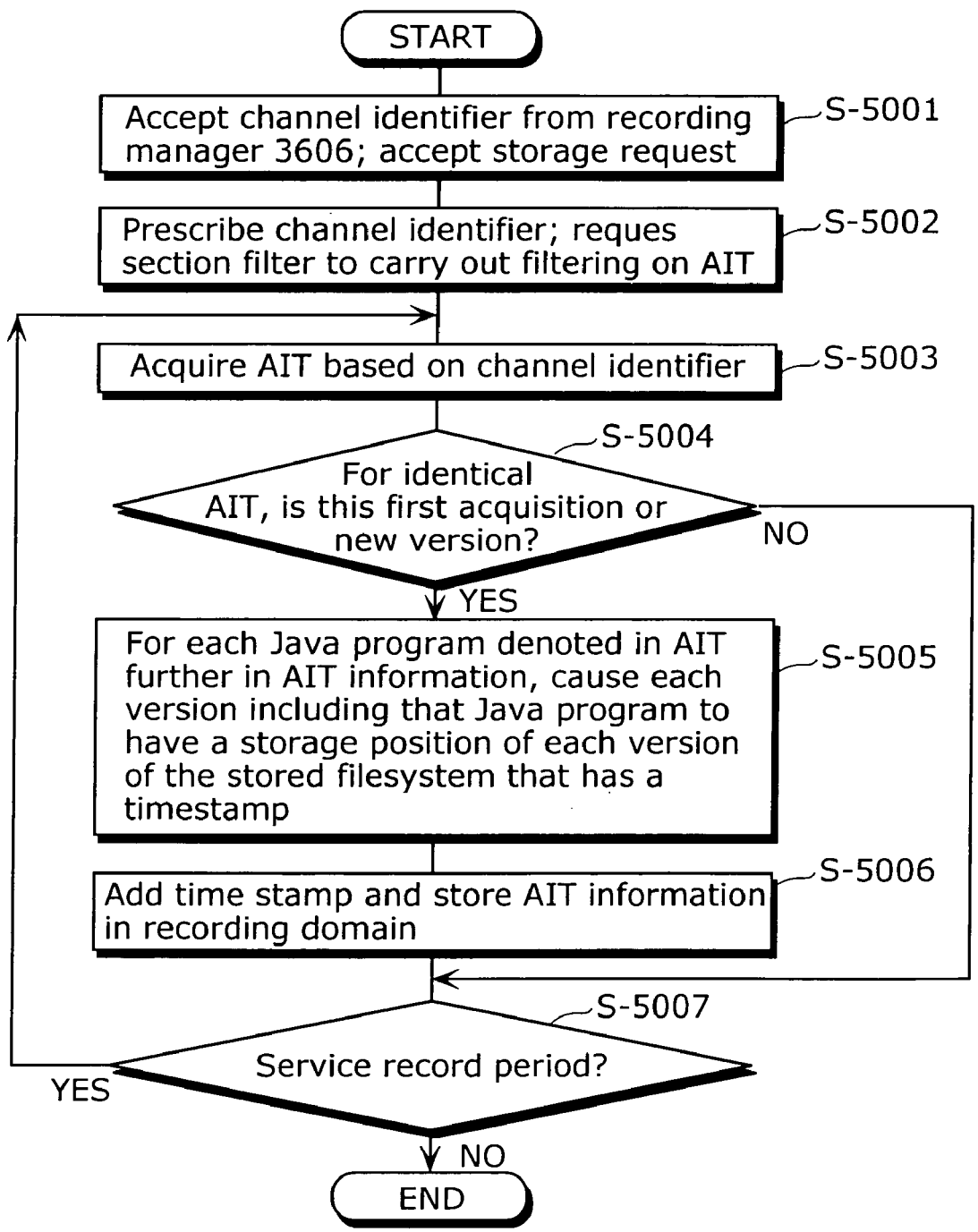
FIG. 51 is a flowchart indicating one example of recording processing of AIT information by a data recording unit of a storage management library.

FIG. 51 is a flowchart indicating an example of recording processing of the AIT information by the data recording unit 3701 of the storage administration library 3605h, which has been requested to store the data broadcast when the channel identifier is supplied from the recording manager.

Accordingly, referring to FIG. 51, the data recording unit 3701 of the storage administration library 3605h is supplied with the channel identifier from the recording manager during the service record period, and is requested to store the data broadcast (S-5001). After that, acquisition through filtering of the AIT is continued in the order previously mentioned (S-5002 to S-5003, S-5007), and along with this, referring to FIG. 46, acquisition of the file system through filtering of the DSMCC MPEG-2 section and reconstitution of the file system is continued in the order previously mentioned.

Then, regarding identical tables, the version of the repeatedly sent table is checked, and in the case where the version of the table presently acquired matches the version of the table previously acquired, the table presently acquired is not stored in the recording area 3113 (no of S-5004). On the other hand, in the case where the table acquired first or the presently acquired version of the table differs from the previously acquired version of the table (the case of a new version), the presently acquired table with a new version is stored in the recording area 3113. (yes of S-5004) In addition, each version of the table to be stored is further given a timestamp which indicates a period from the time when that version of the table is newly acquired (start time) to the time when the next VersionUP-ed table is newly acquired (end time) and stored (S-5006).

In addition, further referring to FIG. 50, there are cases in which the version of the file system held by that storage position is changed by the stored AIT information, during the service record period. In preparation for such a case, the AIT information has the storage position of each version of stored file system that has a timestamp per-version included in the Java program, for each Java program denoted in the AIT (S-5005). A method for having the storage position of the file system of each version is mentioned later in FIG. 53.

Figure 52:
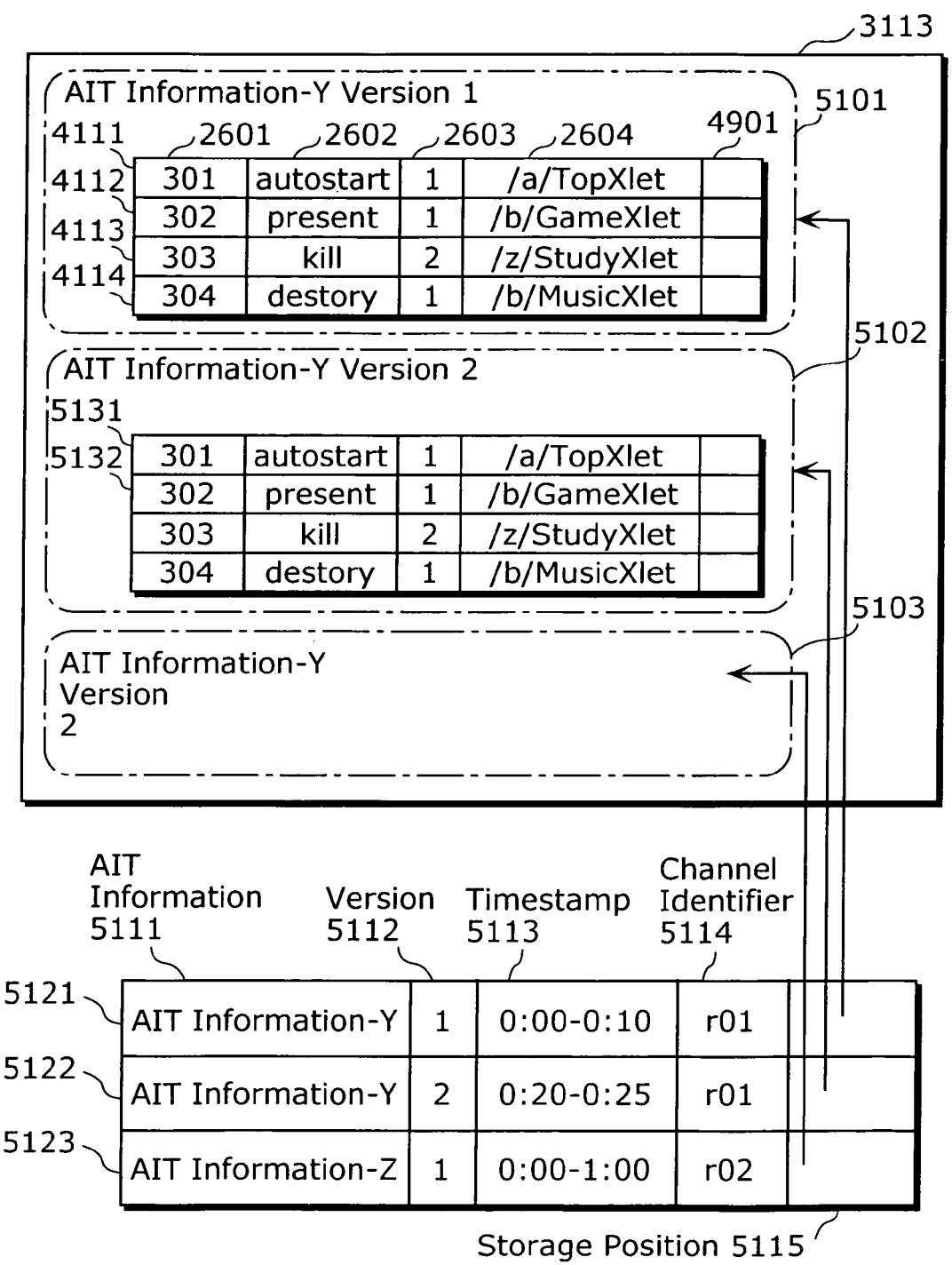
FIG. 52 is one example indicating AIT information per version.

FIG. 52 is an example indicating the information of the AIT per version, each version being assigned, by the data recording unit 3701 of the storage administration library 3605h, with related information such as a timestamp and recorded in the recording area 3113; the file system being managed by the data administration unit 3702 of the storage administration library 3605h. In FIG. 52, configuration elements the same as in FIG. 42 are given the same numbers, and descriptions are omitted. In FIG. 52, row 5121 to row 5123 indicate each version of each AIT information stored in the recording area 3113. Column 5111 is a name of the AIT information stored in the recording area 3113; column 5112 is the version of the AIT information; column 5113 is the timestamp per version of the AIT information; column 5114 is the channel identifier related to the AIT information; and column 5115 is the storage position per version of the AIT information inside the recording area 3113. The AIT information with a version "1" and an AIT information name "AIT information—Y" denoted in row 5121 has a timestamp of "0:00-0:20," and the storage position is 5101 inside the recording area 3113. The AIT information with a version "2" and an AIT information name "AIT information—Y" denoted in row 5122 has a timestamp of "0:20-0:25," and the storage position is 5102 inside the recording area 3113. Here, the version 2 AIT information "AIT information—Y" stored in 5102 of the recording area 3113 is compared with the version 1 AIT information "AIT information—Y" stored in 5101, and as is indicated in row 5131, the control information of the Java program with a Java program identifier of "301" is changed to "destroy"; as is indicated in row 5132, the control information of the Java program with a Java program identifier of "302" is changed to "autostart." In addition, the AIT information with a version "1" and an IT information name "AIT information—Z" denoted in row 5123 has a timestamp of "0:00-1:00," and the storage position is 5103 inside the recording area 3113.

Figure 53:
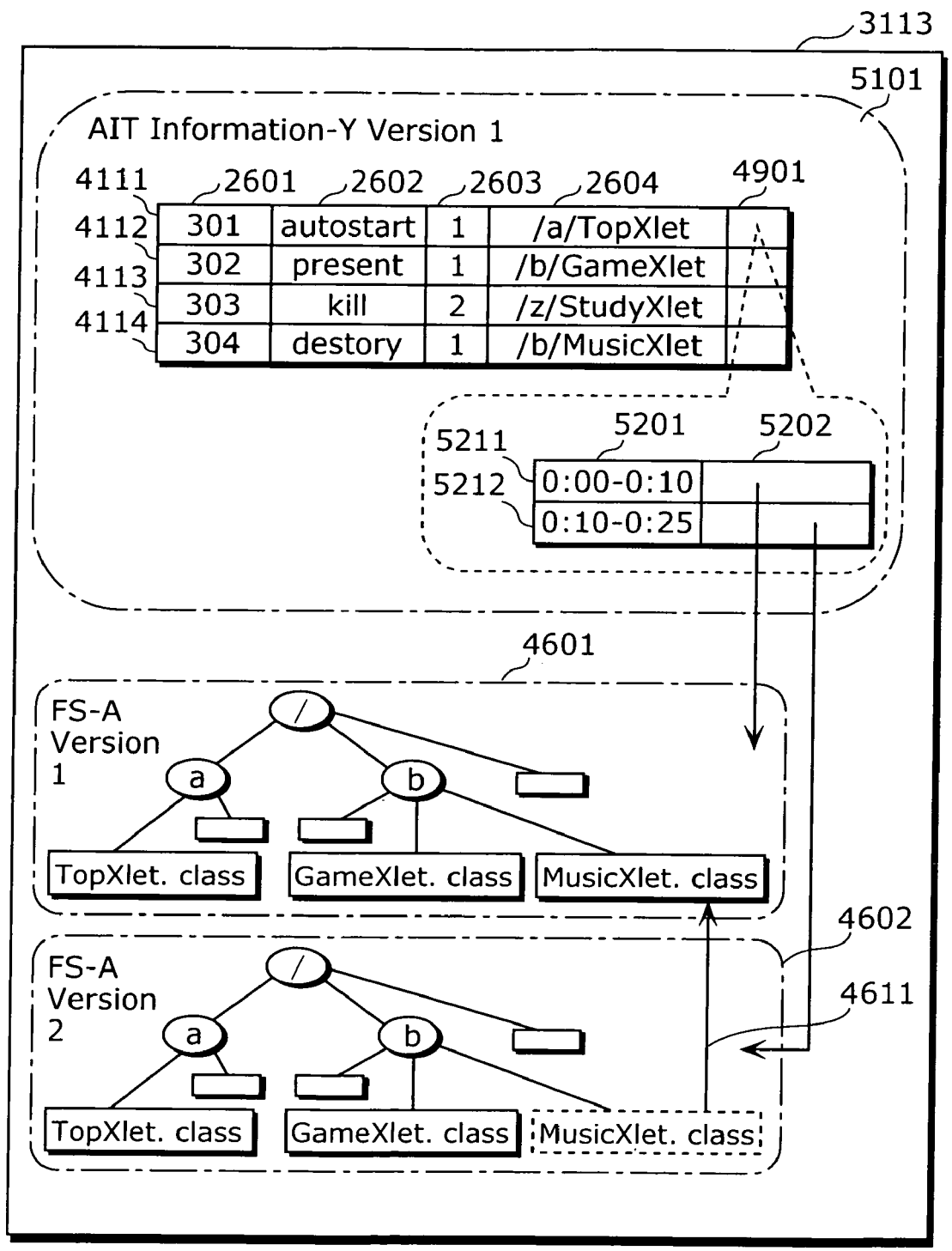
FIG. 53 is a diagram indicating one example which indicates AIT information that holds a storage position in a file system of each version which has a timestamp per version.

FIG. 53 is a further example indicating AIT information, where the AIT information which the data administration unit 3702 of the storage administration library 3605h manages and stores has, for each Java program denoted in the AIT, a storage position of the version of the file system with a valid timestamp, per version, including that Java program. In FIG. 53, configuration elements identical to those in FIG. 52 and FIG. 47 are given the same numbers, and descriptions are omitted. In FIG. 53, row 5211 to row 5221 indicate the file system included in the Java program denoted in row 4111 in more detail, denoting the file systems with a valid version per timestamp; column 5201 is the timestamp, and column 5202 is the storage position of the file system per version. The storage position 4901 of the file system that includes the Java program with a Java program identifier of "301" as denoted in row 4111, of the version 1 AIT information "AIT information—Y" stored in 5101 of the recording area 3113, further has i) the storage position of a version "1" file system "FS-A" that has a timestamp of "0:00-0:10," as indicated in row 5211, column 5201, and ii) the storage position of a version "2" file system "FS-A" that has a timestamp of "0:10-0:25," as indicated in row 5212, column 5201.

In this manner, in the present embodiment, the storage administration library 3605h associates the storage administration information with the Java program, and stores the storage administration information in the AIT recorded in the recording area 3113, and the service manager 2204 and the Java VM 2203 read out the Java program with the timestamp corresponding to the reproduction time from the storage place indicated by the storage administration information stored in the AIT, and execute the Java program.

Next, descriptions are given regarding a service playback processing by the service manager, in a digital broadcast receiving device with a service record/playback function, as shown in FIG. 29, in the present embodiment. The service playback processing by the service manager in the present embodiment is nearly the same as the service playback processing by the service manager 2204 in the first embodiment, aside from the processing regarding acquisition of the AIT. Therefore, here, descriptions of the same processing are omitted, and only the different points, which is a processing of a storage administration library and a processing of the AM 2205b which is requested to carry out data broadcast reproduction by the service manager 2204, are mentioned.

When the AM 2205b is supplied with the channel identifier from the service manager 2204 and requested to carry out data broadcast reproduction, the AM 2205b first passes the prescribed channel identifier to the storage administration library, and requests fetching of the AIT information stored in the recording area 3113. The storage administration library 3605h further fetches the AIT information included in the service that corresponds to the prescribed channel identifier and the AIT information that has a version with a valid timestamp, and passes the fetched AIT information to the AM 2205b. The AM acquires the AIM information that is stored in the recording area 3113 during service record included in the service corresponding to the channel identifier and which has a valid timestamp.

The AM 2205b, referring to FIG. 50, finds the Java program of "autostart" from the AIT information, and extracts the corresponding Java program name. Referring to FIG. 50, the AM 2205b extracts the Java program in row 4111, and acquires the Java program name "a/TopXlet" and the storage position of the file system with a version that has a valid timestamp. The AM 2205b saves the acquired file system in the primary memory unit 1608 or the secondary memory unit 1607. Here, the storage position of the file system with a valid timestamp is easily acquired, and therefore it is possible to omit processing such as inquiring with the storage administration library after acquiring the DSMCC identifier.

Note that here, in the case where the storage position of the file system does not have the storage position of each version of the file system with a timestamp, and simply has the storage position of the file system, the following processing may be carried out: the AM 2205*b* passes the acquired file system storage position to the storage administration library and requests fetching of the file system stored in the recording area 3113, and the storage administration library 3605*h* fetches a version of the file system with a valid timestamp and passes the version to the AM 2205*b*.

In addition, note that here, the present embodiment is applicable even when the same method as in the first embodiment is taken as a method for the AM 2205*b* to acquire the file system of the Java program to be executed and save the file system to the primary memory unit 1608 or the secondary memory unit 1607. Specifically, the Java program of "autostart" is found from the AIT information, and the corresponding DSMCC identifier and Java program name are extracted. Referring to FIG. 50, the AM 2205*b* extracts the Java program of row 4111, acquires the DSMCC identifier "1" and the Java program name "a/TopXlet," passes the DSMCC identifier acquired from the AIT information to the storage administration library, and requests fetching of the file system stored in the recording area 3113. The storage administration library 3605*h* fetches the file system which is specified by the prescribed DSMCC identifier and which is of a version with a valid timestamp, and passes the fetched file system to the AM 2205*b*. The AM 2205*b* saves the file system in the primary memory unit 1608 or the secondary memory unit 1607. The present embodiment is applicable even if such a method is used.

FIG. 48 is one example of a file system saved in the primary memory unit 1608 or the secondary memory unit 1607. Here, in FIG. 48, configuration elements that are the same as in FIG. 43 are given the same numbers, and descriptions are omitted.

Next, the AM 2205*b* passes the Java program to be executed from the file system saved in the primary memory unit 1608 or the secondary memory unit 1607 to the Java VM 2203. At this time, when the name of the Java program to be executed is "a/TopXlet," the file to be executed is the file "a/TopXlet.class," which is the Java program name with ".class" added. "/" is a directory and file name division, and referring to FIG. 48, a file 4304 is the Java program which should be executed. Next, the AM 2205*b* passes the file 4304 to the Java VM 2203.

The Java VM 2203 executes the passed Java program.

Here, during service playback, it is necessary to synchronously execute the video/audio and Java program. Therefore, during service playback, the storage administration library 3605*h* refers to the timestamp of the file system and fetches the file system of a valid version, when requested to acquire a file system by the Java VM 2203. Here, timestamp validity refers to, for example, when the time of the MPEG-2 transport stream during service playback is past the start time as well as before the end time indicated by the timestamp.

Figure 54:
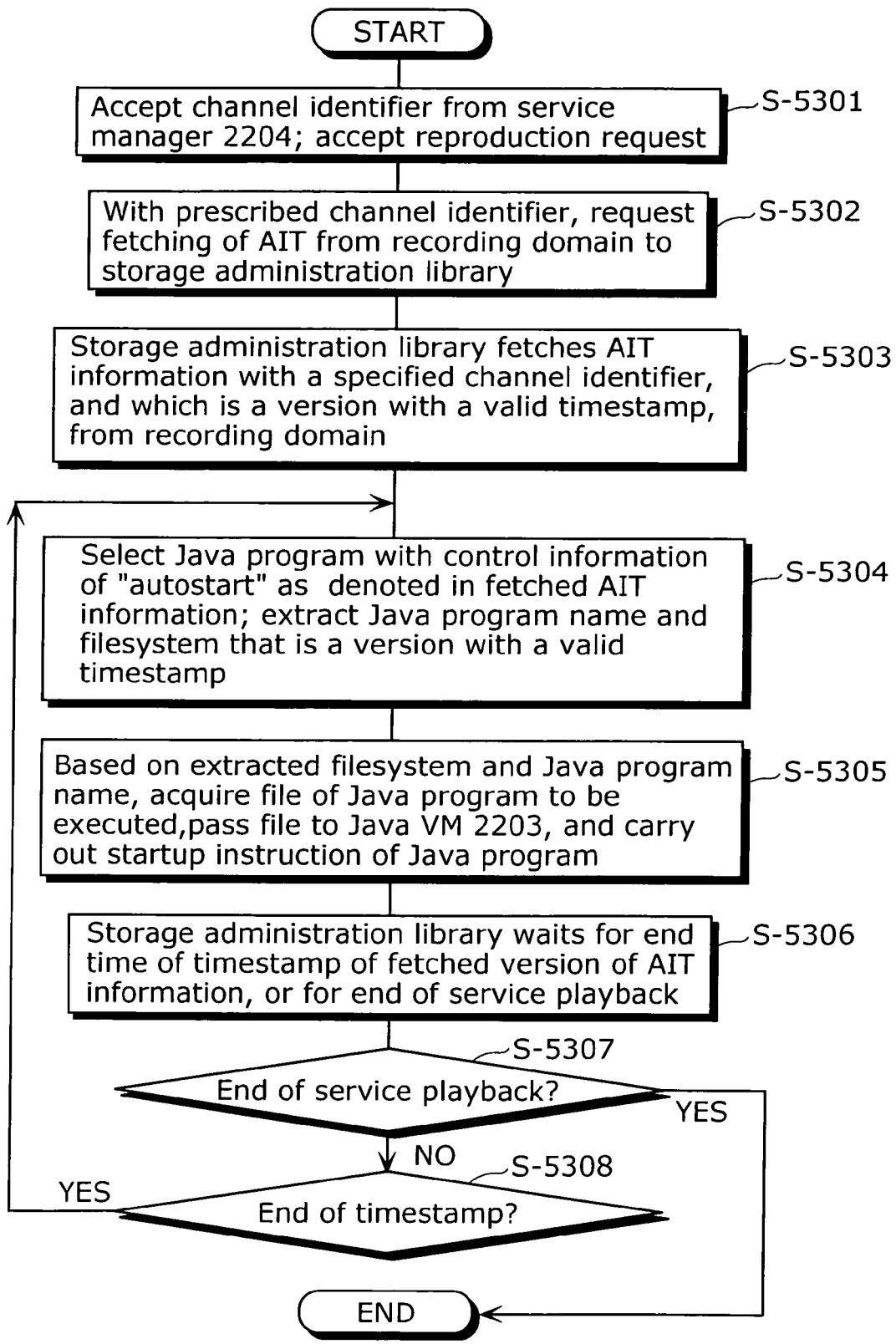
FIG. 54 is a flowchart indicating one example of a Java program execution processing.

FIG. 54 is a flowchart indicating an example of an execution processing of a Java program stored in the recording area using the storage administration library, by the AM 2205*b* which is supplied with a channel identifier from the service manager 2204 and requested to carry out data broadcast reproduction, during service playback.

Referring to the flowchart in FIG. 54, after the AIT is supplied with the channel identifier from the service manager 2204 and requested to perform data broadcast reproduction during service playback (S-5301), in the prescribed channel identifier, fetching of the AIT information from the storage administration library to the recording area is requested (S-5302); the storage administration library fetches the AIT information that has an isolated channel identifier and that is a version with a valid timestamp. Next, the Java program with control information "autostart" as denoted in the fetched AIT information is selected, and the Java program name and the file system of a valid version is extracted (S-5304). Based on the extracted file system and Java program name, the files of the Java program to be executed are acquired, passed to the Java VM 2203, and startup instruction for the Java program is carried out (S-5305). Continuing further, during the period up until service playback ends, in regards to a version of the AIT information fetched from the recording area, when the end time of that timestamp comes (S-5306 to S-5308), the processing, in which the storage administration library once again fetches, from the recording area, the AIT information which is isolated by the prescribed channel identifier and which is a version with a valid timestamp and passes the AIT information to the AM (S-4805), continues repeatedly. Therefore, fetching of the AIT information synchronized with the playback time from the recording area is realized, and therefore, the Java VM 2203 always using the files of the file system synchronized with the playback time that is included in the Java program denoted in the AIT information which is synchronized with the Playback time, in realized.

In this manner, by storing, during service record, each version of the AIT information with a timestamp added, processing in which the AM acquires the AIT during service playback is unnecessary. Furthermore, the stored AIT information is a file system configured of the Java program denoted in that AIT, and by holding the storage position of the version of the file system with a valid timestamp, acquisition of the file system from the recording area 3113 during service playback becomes easier.

Note that in the present embodiment, AIT is described as an example of a storage method for repeatedly-sent data. However, as previously mentioned, in addition to the file system encoded in the DSMCC format, a table of the PAT, PMT, AIT, and NPT coefficient, and a stream event, exist as data repeatedly sent over a fixed interval in the transport stream. The method in the present embodiment, in which the data repeatedly sent during service record is given a timestamp and stored, and the data necessary during service playback is acquired from the recording area 3113, after referring to that timestamp, and used, is also applicable to data such as the table of the PAT, PMT, AIT, NPT coefficient, and so on, and the stream event.

Effects of the present embodiment are as follows.

A first effect is, as described in the first embodiment, that the TS decoder 1602 is a device that has a function for selecting the PES packet and MPEG-2 section that conform to instructed conditions from the MPEG-2 transport stream, which in turn are based on instructions such as PID and section filter conditions prescribed by the CPU 1606. In the TS decoder 1602, one or more of the PID filter 2002, one or more of the section filter 2003, and one or more of the descrambler 2004 exist. Here, the section filter 2003 in particular is described, and during consecutive filtering of the PAT, PMT, AIT, and NPT coefficient, the TS decoder is prescribed with each different section filter condition, a table_id "0," a table_id "2," a table_id "0x74," and a table_id "0x3D"; however, because one section filter cannot simultaneously carry out filtering on a plurality of tables (PAT, PMT, AIT, NPT coefficient, and so on), the section filter is used per table requiring filtering. The section filter is a finite number of resources, but during service selection/service playback, it is necessary to continue to carry out filtering on the PAT, PMT, and AIT in order to detect a change in information regarding the program existing within the transport stream. Therefore, each section filter for filtering these tables is used exclusively.

However, in the present embodiment, processing in which the AM acquires the AIT is unnecessary during service playback. Therefore, consecutive filtering of the AIT from the transport stream by the TS decoder, or consecutive filtering of the PAT, PMT, AIT, and NPT coefficient is unnecessary. Through this, wasteful use of the section filter for filtering the PAT, PMT, AIT, and NPT coefficient can be reduced.

In addition, as a second effect, through the stored AIT information holding the storage position of the version of the file system with a valid timestamp, acquisition of the file system from the recording area 3113 during service playback becomes easier.

In addition, as a third effect, during service playback, and particularly during trick play (high-speed reproduction, skip reproduction), it is difficult to carry out filtering on a the tables such as PAT, PMT, AIT, and NPT coefficient in real-time using the section filter from the transport stream that is stored in the recording area 3113. In particular, regarding filtering of the NPT coefficient during skip reproduction, it is necessary to acquire the NPT coefficient in which a time of reproducing the video/audio is multiplexed with a different previous/next time, but depending on a general section filter, it is impossible to carry out filtering on such an NPT coefficient in which the time of reproducing the video/audio is multiplexed with the different previous/next time, and impossible to acquire this NPT coefficient. In the present embodiment, the table filtered during service record is stored in a form different from that of the transport stream. It is therefore possible to omit processing in which filtering is carried out on the table from the transport stream during service playback, and possible to easily acquire information of the table during trick play.

In addition, in reproduction of a received broadcast wave as prescribed in MHP/OCAP, from among the data within the broadcast wave, only real-time data is necessary, and separately extracting and recording the data is not required. Even in the case of recording the broadcast wave, reduction of recording area is realized by recording carousel-form data sent in carousel format, as shown in Patent References 1 and 2. However, even when recording data of a small size (the table) aside from the carousel-form data, the effect of reducing the recording area is not obtained, and the data is not recorded separately.

However, in reproduction of the recorded broadcast wave as prescribed in OCAP-DVR, various effects can be obtained, including reduction of filter resources during reproduction of the recorded broadcast wave, by separately recording data (the table) different from the carousel-form data included in the broadcast wave.

For example, in OCAP-DVR, a skip function, which uses the abovementioned position information of a skip destination (NPT coefficient), is provided as a function for viewing the recorded broadcast wave as package media. In the case where the position information of the skip destination is multiplexed within the broadcast wave, it is necessary to extract the position information of the skip destination at the time of reproduction; instant skip reproduction cannot be realized, and thus highly-responsive viewing is impossible. By attaching a timestamp and recording the position information of the skip destination separately, it is possible to provide highly-responsive viewing of the recorded broadcast wave.

In other words, in the present embodiment, the TS decoder 1602 further extracts, from the broadcast wave received by the tuner 1601, reproduction position information (NPT coefficient) that indicates a reproduction position of the video/audio data and is repeatedly included in the broadcast wave; the storage administration library 3605*h* attaches a timestamp to the reproduction position information extracted by the TS decoder 1602 and records the reproduction position information that has been attached with the timestamp into the recording area 3113, in the case where the extracted recording position information differs from reproduction position information already recorded in the recording area 3113; and the AV decoder 1603 isolates, when a reproduction start time is indicated by the video/audio data, the reproduction position corresponding to the indicated reproduction start time based on the reproduction position information attached with the timestamp, and starts reproduction of the video/audio data from the indicated reproduction position.

Third Embodiment

In the first and second embodiments, all Java programs, which include a file system and which are included in a service in which Record is prescribed, are stored. However, in the present embodiment, recording the file system that includes which of the Java programs included in the service in which record is prescribed is determined in accordance with control information 2602 held by each Java program denoted in the AIT. In the control information denoted in the AIT, the following exist: "autostart," which automatically causes the Java program to execute; "present," which does not execute automatically, but is executed by another Java program; and "kill" and "destroy," which automatically cause termination. However, in the control information, Java programs prescribed as "kill" and "destroy" are no longer necessary. Therefore, only a file system that includes a Java program which is denoted in the AIT, as well as which has control information of "autostart" or "present," is stored in the recording area. It is acceptable not to store a file system including the Java program with control information 2602 of "kill" or "destroy," even if that Java program is denoted in the AIT.

In this manner, an object of the present embodiment is to implement more effective reduction of the recording area 3113, through storage of the file system that includes a Java program in accordance with the control information of the AIT.

Next, a service record processing by the recording manager 3606, occurring in a digital broadcast receiving device with a service record/playback function as indicated in FIG. 29 in the present embodiment, is described. The service record processing by a recording manager 3606 in the present embodiment is essentially the same as the service record processing by a recording manager 3606 in the first embodiment or the second embodiment, with the exception of the processing regarding acquisition of the AIT. Therefore, here, description of identical processing is omitted, and only the differing point, which is the processing of the storage administration library that is supplied with the channel identifier from the recording manager 3606 and requested to store the data broadcast, is described.

When the storage administration library 3605*h* is supplied with the channel identifier from the recording manager 3606 and requested to store the data broadcast, first, in accordance with the channel identifier, and with a method identical to that used during service record processing in the first embodiment, acquires the PAT and PMT, and further acquires the AIT.

Here, the acquired AIT information is the information indicated in FIG. 42. FIG. 43 is a file system that includes all Java programs denoted in the AIT. Then, referring to the AIT, the Java program of "autostart" or "present" is found from among the AIT, and all the corresponding DSMCC identifiers and Java program names are extracted. Referring to FIG. 42, the storage administration library extracts the Java programs from row 4111 and row 4112, and acquires the DSMCC identifier "1" and Java program name "a/TopXlet," and the DSMCC identifier "1" and Java program name "b/GameXlet."

Next, the storage administration library uses the DSMCC identifier acquired from the AIT, and acquires the PID of a TS packet stored in DSMCC format from the PMT. Specifically, the PID of the elementary stream with a conforming DSMCC identifier in the supplementary information and which has a stream type of "data" among the PMTs is acquired.

At this time, when the DSMCC identifier is "1" and the PMT is as in FIG. 41, the elementary streams of row 1114 conforms, and the PID "5014" is fetched.

The storage administration library 3605h prescribes, to the TS decoder 1602, the PID of the TS packet and a section filter condition transmitted by the MPEG-2 section in which data in the DSMCC format has been embedded, through the library 2201b of the OS 2201. Here, the PID "5014" is supplied. The TS decoder 1602 carries out filtering on the DSMCC MPEG-2 section using the supplied PID, and passes the section to the CPU 1606 through the primary memory unit 1608. As a result, the storage administration library 3605h can collect a necessary DSMCC MPEG-2 section. The storage administration library 3605h reconstitutes the file system from the collected MPEG-2 section in accordance with the DSMCC format, and stores that file system in the recording area 3113.

Figure 55:
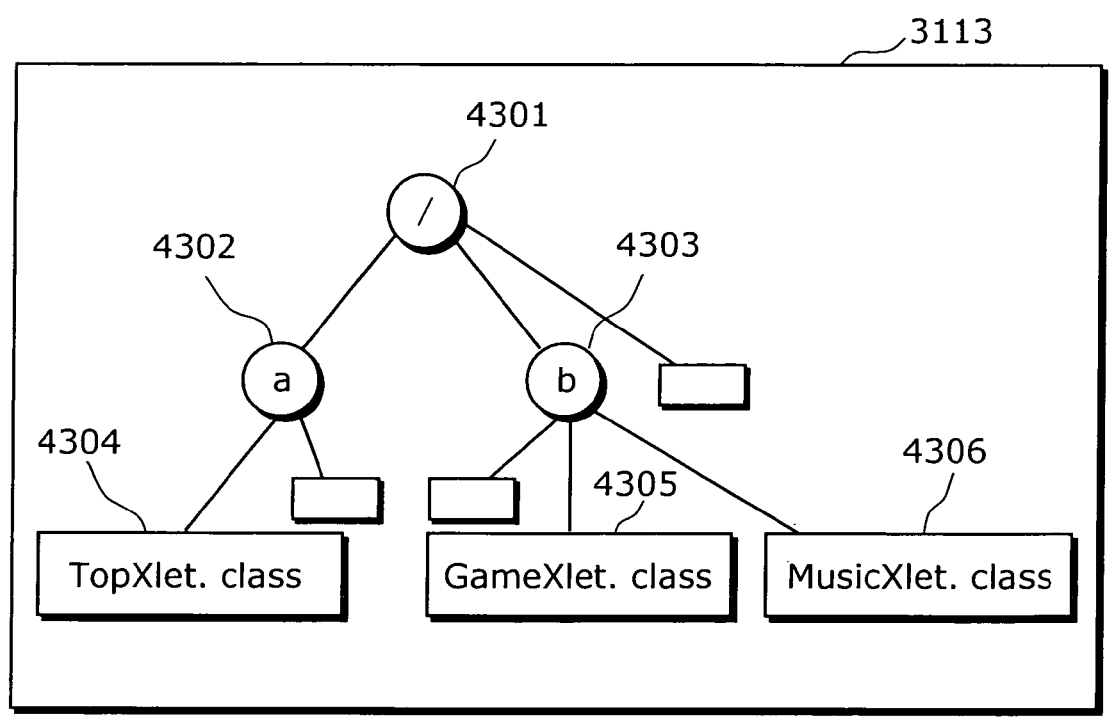
FIG. 55 is a diagram indicating one example of a file system stored in a recording area during service record.

FIG. 55 is an example of a file system stored in the recording area 3113 during service record. In FIG. 48, configuration elements that are the same as in FIG. 44 are given the same numbers, and descriptions are omitted.

Then, the storage administration library 3605h continues acquiring file systems through filtering of the AIT and DSMCC MPEG-2 section, and through reconstitution of the file system, during the service record period, in the same manner as in the first and second embodiments; each version of the file system is given a timestamp and stored.

Note that here, the Java programs to be executed have identical DSMCC identifiers and therefore exist in file systems reconstituted from DSMCC MPEG-2 sections in the same elementary stream. However, the present invention is also applicable even in other cases, such as the case where the Java programs to be stored have differing DSMCC identifiers and exist inside differing elementary streams.

Here, service playback processing by the service manager, in a digital broadcast receiving device including a service record/playback function as shown in FIG. 21 in the present embodiment, is a processing identical to that in the first and second embodiments, and therefore descriptions are omitted.

Figure 56:
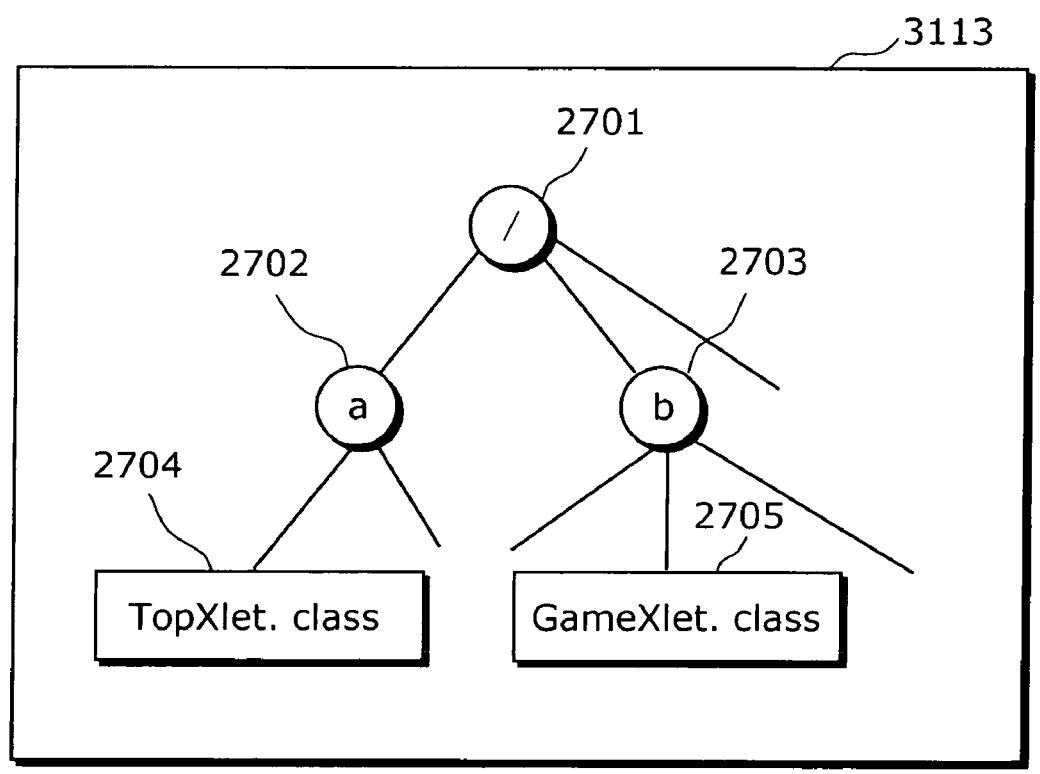
FIG. 56 is a diagram indicating one example of a file system stored in a recording area during service record.

Note that in the first and second embodiments, and during service selection or service playback, the file that is passed to the Java VM 2203 by the AM 2205b and that requests execution is a Java program denoted in the AIT, and in the present embodiment, is "a/TopXlet.class" and "b/GameXlet.class." However, these files passed to the Java VM 2203 and executed from the Java VM 2203 can use all files in the file system, further including themselves, during that execution time. Therefore, during service record, because it is possible that those Java programs passed to the Java VM 2203 may be used during that time of execution, the method that stores all the files in the file system that includes the Java program denoted in the AIT is taken. However, a system not limited to MHP/OCAP/OCAP-DVR is assumed, and in the case where only the Java program denoted in the AIT is used during service selection/playback, it is acceptable to store only the Java program denoted in the AIT, as indicated in FIG. 56. In this case, the storage administration library 3605h uses the DSMCC identifier acquired from the AIT, reconstitutes the file system from the MPEG-2 section in accordance with the DSMCC format, and furthermore, from inside the reconstituted file system, acquires only the Java programs with a Java program name "a/TopXlet" and a Java program name "b/GameXlet", and stores the Java programs in the recording area 3113. FIG. 56 in one example of a file system stored in the recording area 3113 during service record in such a case. In the diagram, a circle represents a directory; 4301 is a root directory, 4302 is a directory "a," 4303 is a directory "b," 4304 is a file "TopXlet.class," and 4305 is a file "GameXlet.class."

In this manner, through the method indicated in the present embodiment, the file system or file that includes the Java program in accordance with the control information of the AIT is stored, and through that, it is possible to more effectively reduce the recording area of the recording area 3113.

Fourth Embodiment

In the embodiments of the present invention, referring to FIG. 32 and FIG. 33, the present invention is applicable even if all or one of the TS decoder 1602, the AV decoder 2005, the AV encoder 3111, and the multiplexer 3112 are configured of a single device.

Note that in the present invention, data outputted from the TS decoder 1602 and inputted to the AV decoder 2005 is described as being a PES packet as a prerequisite; however, the present invention is also applicable even if the output from the TS decoder 1602 or the input to the AV decoder is data in a different format, such as ES.

Note that the encoding format of the audio signal and video signal through the AV encoder is assumed as being MPEG-2 audio format through MPEG-2 audio encoding, in the case of the audio signal, and as being MPEG-2 video format through MPEG-2 video encoding, in the case of the video signal, and the AV encoder has been denoted as inputting the audio signal and video signal and outputting the video/audio PES packets. However, the encoding format of the AV encoder is not limited to the abovementioned MPEG-2 audio and MPEG-2 video formats, and the outputted video/audio format is not limited to the PES packet.

Note that in the embodiments of the present invention, the recording area 3113 is denoted as inputting and storing the Record MPEG-2 transport stream generated by the multiplexer 2812. However, the format of the stream stored in the recording area 3113 is not limited to the MPEG-2 transport stream, and the present invention is applicable even when the format is different, such as an MPEG-2 program stream.

In addition, in the embodiments of the present invention, the multiplexer generates the MPEG-2 transport stream as a prerequisite. However, the multiplexer is not limited to a TS Multiplexer, and another device, such as a PS multiplexer, may carry out; therefore, the format of the Record stream multiplexed by the multiplexer is not limited to the MPEG-2 transport stream, and the present invention is applicable even when the format is different, such as an MPEG-2 program stream.

In addition, note that in the present invention, the storage administration library 3605h is denoted as fetching the MPEG-2 transport stream from the recording area 3113 and passing the stream to the TS decoder 1602 during service playback. However, the format of the stream fetched from the recording area is the same as the format stored during service record, and may be another format without being limited to the MPEG-2 transport stream. Also, going along with this, in the embodiments of the present invention, during service playback, the TS decoder 1602 is denoted as decoding the MPEG-2 transport stream, and the AV decoder as decoding the PES packet. However, the present invention is applicable even when using another device that corresponds to another decode format, as long the device can decode a stream of a format identical to the stream stored in the recording area 3113.

Note that in the present invention, the recording area 3113 is denoted as corresponding to all or part of the secondary memory area 1607. However, the recording area 3113 may be: the primary memory 1608; HDD, BD, DVD, and a semiconductor memory such as SD; or a separate terminal connected by some means, such as a TCP/IP connection, a USB connection, an IEEE 1394 connection, an infrared connection, and so on. In addition, the format of the stream stored by the recording area 3113 is not limited to the MPEG-2 transport stream, and the present invention is applicable even when a different format is used.

In addition, in the present invention, it is also possible to delete the ROM 1609 by saving, in the secondary memory unit 1607, the content saved by the ROM 1609. In addition, it is also possible to configure the secondary memory unit 1607 of a plurality of sub-secondary memory units, with each sub-secondary memory unit saving differing information. It is possible to precisely divide the sub-secondary memory units; for example, only tuning information is saved in one of the sub-secondary memory units, the library 2201b of the OS 2201 is saved in another sub-secondary memory unit, downloaded Java programs are saved in yet another sub-secondary memory unit, and so on.

In addition, in the present invention, downloaded Java programs are saved in the primary memory unit 1607, but it is also possible to save the downloaded Java programs in the secondary memory unit 1608. In the case where the downloaded Java programs are saved in the primary memory unit 1608, all saved information disappears when the power is turned off.

In addition, in the present invention, parts not clearly specified are indicated by the reference hardware configuration example in FIG. 17, but the present invention is of course applicable even with a hardware configuration that uses an adapter, as in FIG. 19. In such a case, identical devices identified by different numbers in FIG. 17 and FIG. 19 are described as in FIG. 19, by using expressions which substitute identification numbers. For example, the CPU 1606 is interpreted as the CPU 1806. Such is the case with FIG. 21 and FIG. 22. FIG. 21 is used as a basic reference hardware configuration, but the present invention is of course applicable with FIG. 22 as well.

In addition, with the aforementioned OCAP environment, two types of services exist. One is a normal service existing in association with the PMT, and the other is an abstract service existing without association with the PMT. The normal service is identical to the service described thus far in the present invention, and when the normal service is selected, tuning, cryptograph removal, video/audio reproduction, and Java program startup are executed by the service manager 2204. On the other hand, the abstract service exists containing only the Java program, and when the abstract service is selected, video/audio reproduction is not carried out. In addition, the Java program contained in the abstract service is downloaded and started up when the abstract service is selected, but there are cases in which the Java program is recorded in the secondary memory unit 1607 at that time. When the Java program is recorded in the secondary memory unit 1607 once, unless a Java program newer than the recorded Java program is not downloadable, the Java program is loaded and started up from the secondary memory unit during service selection.

In addition, in the embodiments of the present invention, the service manager 2204 and the recording manager 3606 are denoted as bring Java programs written in the Java language, sequentially executed by the Java VM 1603, and which call, through the Java Native Interface (JNI), other sub-programs not written in the Java language, or are callable. However, the present invention is applicable even when the service manager 2204 and the recording manager 3606 are programs written in a language other than the Java language, such as the C language, and executed in the CPU 1606 in the same manner as other sub-programs.

In addition, in the embodiments of the present invention, the storage administration library 3605h is denoted as being included in the Java library 3605h. However, the present invention is applicable even when the storage administration library 3605h is not included in the Java library 3605h, is a sub-program written in a language aside from the Java language, such as C language, and is called by or calls other sub-programs in a language aside from Java. In addition, in the present invention, the "Java program" included in the service is denoted as being a program written in the Java language and executed by the Java VM. However, the present invention is applicable even when the "Java program" included in the service is a program written in a different language.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is based on a broadcast receiving apparatus, but is applicable in another information device, such as a cellular phone, as long as the device has a function for receiving a broadcast.

What is claimed is:

1. A broadcast recording apparatus that records and reproduces a broadcast wave, comprising:
   a receiver operable to receive the broadcast wave;
   a viewing data extractor operable to extract, from the broadcast wave received by said receiver, viewing data which indicates a content to be viewed;
   a repeat data extractor operable to extract, from the broadcast wave received by said receiver, an application program and a program table which are repeatedly included in the broadcast wave, the program table indicating a list of application programs present in the broadcast wave;
   a recording medium having an area for recording the viewing data, the application program, and the program table;
   a viewing data recording administrator operable to record the viewing data extracted by said viewing data extractor in said recording medium;
   a program recording administrator operable to attach a timestamp to the application program extracted by said repeat data extractor in the case where the application program extracted is different from the application program already recorded in said recording medium, and operable to record the application program attached with the timestamp into said recording medium;

a table recording administrator operable to attach a timestamp to the program table extracted by said repeat data extractor in the case where the program table extracted is different from the program table already recorded in said recording medium, and operable to record the program table attached with the timestamp in said recording medium;

an information creator operable to create storage administration information indicating a recording place for the application program in said recording medium each time said program recording administrator records the application program into said recording medium;

a viewing data reproducer operable to reproduce the viewing data recorded in said recording medium; and a program extractor operable to read out, from the recording place indicated by said storage administration information, and to execute the application program with a timestamp corresponding to a reproduction time of the viewing data, the application program being indicated by the program table with a timestamp corresponding to the reproduction time.

2. The broadcast recording apparatus according to claim 1, wherein the program table indicates the application program to be controlled at a time the program table is received by said receeiver, and a control content for the application program.

3. The broadcast recording apparatus according to claim 2, wherein said information creation unit is operable to associate the storage administration information with the application program, and store the storage administration information in the program table recorded in said recording medium, each time said program recording administrator records the application program in said recording medium, and said program executor is operable to read out the application program with the timestamp corresponding to the reproduction time from the storage place indicated by the storage administration information stored in the program table, and to execute the application program.

4. The broadcast recording apparatus according to claim 2, wherein the program table further indicates a position the application program to be controlled is present in the broadcast wave;

said information creator is operable to create the storage administration information associated with the position in the broadcast wave in which the application program is present, per time said program recording administrator records the application program into said recording medium; and said program executor is operable to specify the position of the application program to be controlled that is indicated by the program table, to read out the application program with the timestamp corresponding to the reproduction time from a recording place indicated by the storage administration information associated with the specified position, and to execute the application program.

5. The broadcast recording apparatus according to claim 2, wherein said repeat data extractor is operable to extract, from the broadcast wave received by said receiver, the application program associated with a control content required for reproduction from among the application programs indicated in the program table, and said program executor is operable to read out, from a recording position indicated by the storage administration information, the application program associated with the control content required for reproduction from among the application programs with a timestamp corresponding to the reproduction time, and to execute the application program.

6. The broadcast recording apparatus according to claim 1, wherein each application program repeatedly included in the broadcast wave has identifier information that identifies a use of the application program, and has a version of the application program, and said program recording administrator is operable to compare the identifier information and version of the application program extracted by said repeat data extractor with the identifier information and version of an application program already recorded in said recording medium, and upon judging the respective identifier information and versions to be different, to judge that the extracted application program and the recorded application program are different.

7. The broadcast recording apparatus according to claim 1, wherein said viewing data reproducer is operable to output at least one of video and audio by reproducing the viewing data, and said program executor is operable to execute the application program in synchronization with at least one of the outputted video and audio.

8. The broadcast recording apparatus according to claim 1, wherein the program table indicates all application programs included in a service of the broadcast wave.

9. The broadcast recording apparatus according to claim 1, wherein said repeat data extractor is further operable to extract, from the broadcast wave received by said receiver, reproduction position information that indicates a reproduction position of the viewing data and is repeatedly included in the broadcast wave; and said broadcast recording apparatus further comprises:

a reproduction position recording administrator operable to attach a timestamp to the extracted reproduction position information and record the reproduction position information that has been attached with the timestamp into said recording medium, in the case where the recording position information extracted by said repeat data extractor differs from reproduction position information already recorded in said recording medium, wherein said viewing data reproducer is, when a reproduction start time is indicated by the viewing data, operable to isolate the reproduction position corresponding to the indicated reproduction start time based on the reproduction position information attached with the timestamp, and operable to start reproduction of the viewing data from the indicated reproduction position.

10. The broadcast recording apparatus according to claim 1, wherein the application program includes plural data files, said program recording administrator is operable to record the application program extracted by said repeat data extractor in the case where at least one of data files included in the extracted application program is different from any data files already recorded in said recording medium, and said program recording administrator is operable to record a first data file included in the application program extracted from said repeat data extractor in said recording medium, the first data file being different from any data file included in the application program already recorded in said recording medium, and operable to record reference information for identifying a data file included in the application program already recorded in said recording medium in said recording medium, the data file being the same as a second data file included in the application program extracted by said repeat data extractor.

11. A broadcast recording method for recording and reproducing a broadcast wave, said method comprising:

receiving the broadcast wave;

extracting, from the received broadcast wave, viewing data which indicates a content to be viewed;

repeatedly extracting, from the received broadcast wave, an application program and a program table which are repeatedly included in the broadcast wave, the program table indicating a list of application programs present in the broadcast wave;

recording the viewing data to a recording medium;

attaching a timestamp to the application program in the case where the application program extracted is different from the application program already recorded in said recording medium, and recording the application program attached with the timestamp to said recording medium;

attaching a timestamp to the extracted program table in the case where the program table extracted is different from the program table already recorded in said recording medium, and recording the program table attached with the timestamp to said recording medium;

creating storage administration information indicating a recording place for the application program in said recording medium each time the application program is recorded to said recording medium;

reproducing the viewing data recorded to said recording medium; and reading out, from the recording place indicated by said storage administration information, and executing the application program with a timestamp corresponding to a reproduction time of the viewing data, the application program being indicated by the program table with a timestamp corresponding to the reproduction time.

* * * * *

UNITED STATES PATENT AND TRADEMARK OFFICE
CERTIFICATE OF CORRECTION

PATENT NO. : 7,590,331 B2
APPLICATION NO. : 11/349955
DATED : September 15, 2009
INVENTOR(S) : Yuki Horii et al.

It is certified that error appears in the above-identified patent and that said Letters Patent is hereby corrected as shown below:

Title Page
      At item (56) "Other Publications", on page 2, the following publications should be listed:

OpenCable Application Platform Specification, OCAP 1.0 Profile, OC-SP-OCAP 1.0-I14-050119, pages 47-51, 57-73, 75-86, and 187-193.

OpenCable Application Platform Specification, OCAP Digital Video Recorder (DVR), OC-SP-OCAP-DVR-I01-040524, pages 11-20.

Signed and Sealed this

Eighth Day of June, 2010

David J. Kappos
*Director of the United States Patent and Trademark Office*